United States Patent [19]

Cann

[11] Patent Number: 4,825,647

[45] Date of Patent: May 2, 1989

[54] PERFORMANCE IMPROVEMENTS IN THRUSTER ASSEMBLY

[75] Inventor: Gordon L. Cann, Irvine, Calif.

[73] Assignee: Technion, Inc., Irvine, Calif.

[21] Appl. No.: 694,669

[22] Filed: Jan. 24, 1985

Related U.S. Application Data

[63] Continuation-in-part of Ser. No. 517,265, Jul. 26, 1983, abandoned, which is a continuation-in-part of Ser. No. 359,776, Mar. 19, 1982, abandoned.

[51] Int. Cl.$^4$ ............................................. G21D 1/00
[52] U.S. Cl. .................................................. 60/203.1
[58] Field of Search ....................... 60/203.1, 39.462; 313/42, 43, 45, 362.1; 219/121 PQ

[56] References Cited

U.S. PATENT DOCUMENTS

| | | | |
|---|---|---|---|
| 3,149,460 | 9/1964 | La Rocca | 60/39.462 |
| 3,359,734 | 12/1967 | Ferrie et al. | 60/203.1 |
| 3,533,233 | 10/1970 | Fiedler et al. | 60/39.462 |
| 4,162,292 | 7/1979 | Speeds et al. | 60/39.462 |
| 4,288,982 | 9/1981 | Kuenzlv et al. | 60/39.462 |
| 4,523,429 | 6/1985 | Bingley | 60/39.462 |

FOREIGN PATENT DOCUMENTS 2010406A 6/1979 United Kingdom ............... 60/203.1

OTHER PUBLICATIONS

Dressler et al., "Flight Qualification of the Augmented Electrothermal Hydrazine Thruster", AIAA Propulsion Conf., Jul., 1981, Paper No. 81-1410.
Bruun, E. R., "Monopropellant Thruster Performance Augmentation Heater Development Program", 1980 Joint Army/Navy/NASA/Air Force (JANNAF) Propulsion Meeting, Monterey, Calif., Mar., 1980, vol. IV, DTIC #ADA 131716.
Bruun, E. R. et al., "Final Report—Monopropellant Thruster Performance Augmentation Heater Development Program", AFRPL-TR-80-73, Feb. 1981, DTIC #ADB 057191.
"Electron-Magnetic-Field Interactions in the Electron Bombardment Heated Thruster," K. E. Starner et al., AIAA Journal, vol. 4, No. 6, pp. 1090-1093, 1965.
"Electron Bombardment Heating for Electrothermal Propulsion," K. E. Starner et al., AIAA Journal, vol. 3, No. 1, Jan., 1965.

*Primary Examiner*—Louis J. Casaregola
*Assistant Examiner*—Donald E. Stout
*Attorney, Agent, or Firm*—Sherman and Shalloway

[57] ABSTRACT

A thruster assembly is disclosed which includes a removable filament mounted in a heat exchange cavity which isolates propellant from the filament and transfers energy from the filament to the propellant. The filament may comprise a single winding of wire or may, if desired, comprise a bifilar wound helix. Also disclosed are a number of ways of powering the filament including a plurality of power supplies provided for redundancy as well as variability of operation. The thruster assembly housing includes sophisticated heat conduction structure including a tortuous internal heat conduction path which minimizes heat loss from the thruster for a variety of disclosed purposes. Also disclosed is structure for providing energy transfer to propellant both through radiation and emission. Several techniques for improving the performance of the thruster assembly and particularly related to the nozzle structure as well as to the fuel supply structure and heat exchange structure form the main basis for this disclosure. Further, a test bed facility for testing the inventive thruster assembly is set forth.

42 Claims, 29 Drawing Sheets

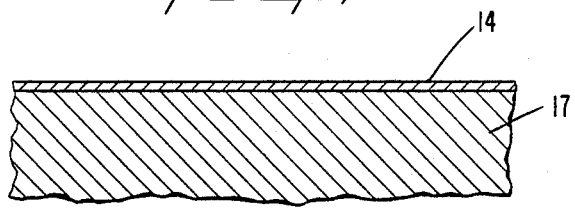
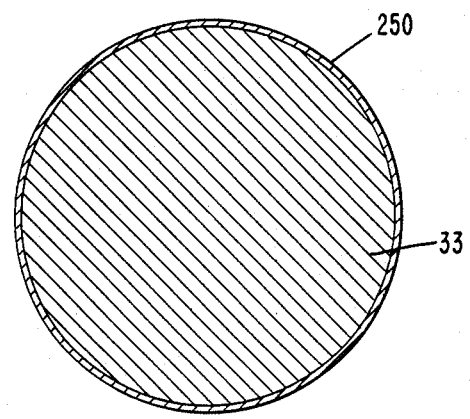
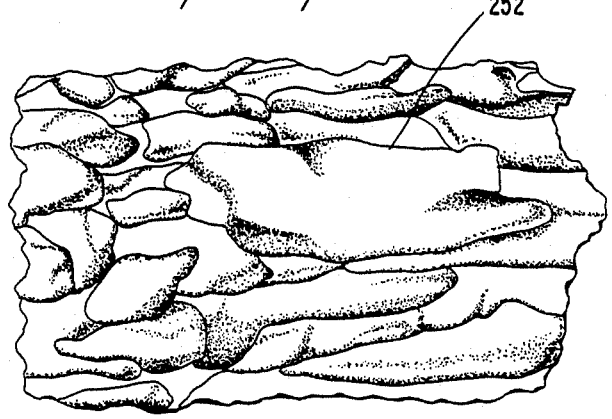
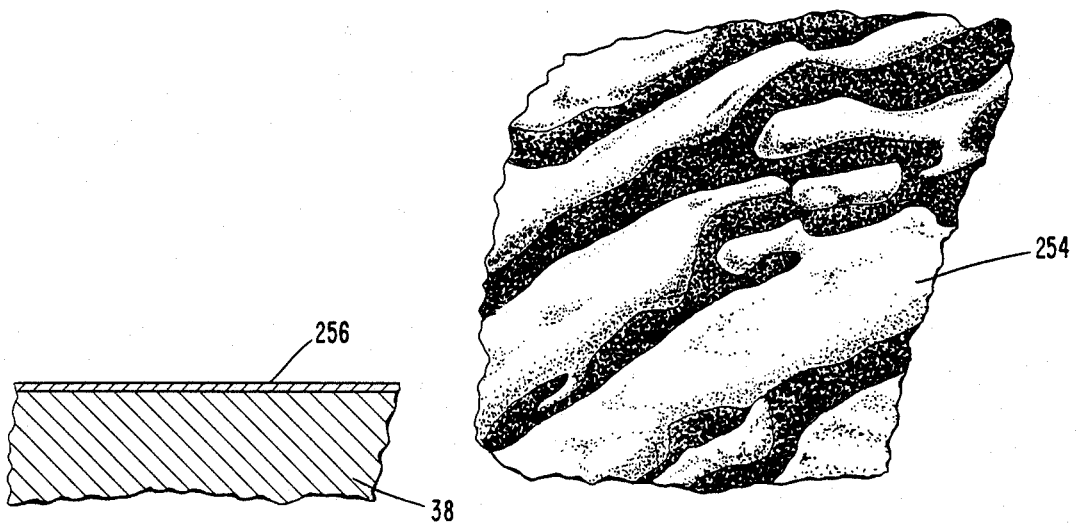

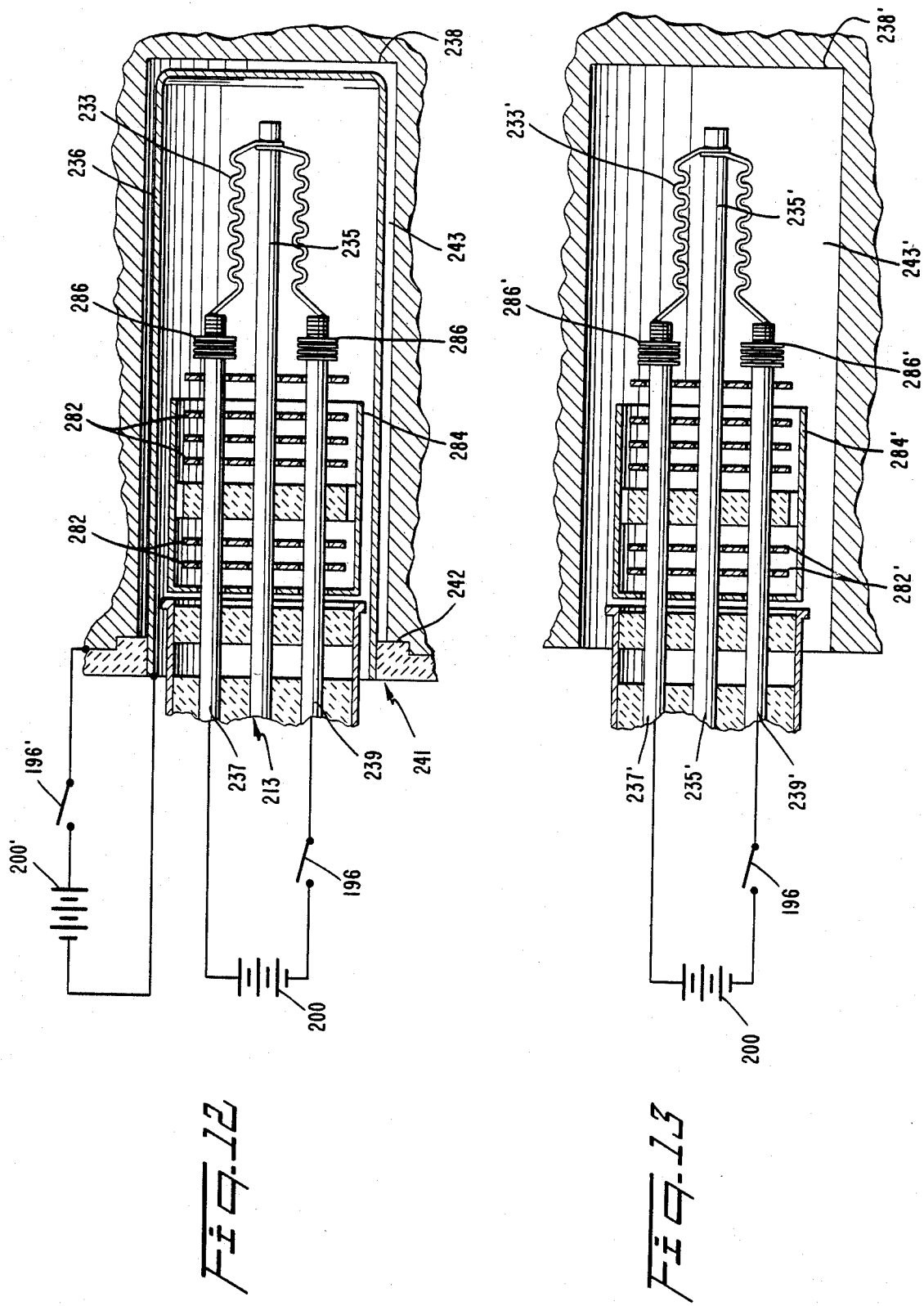

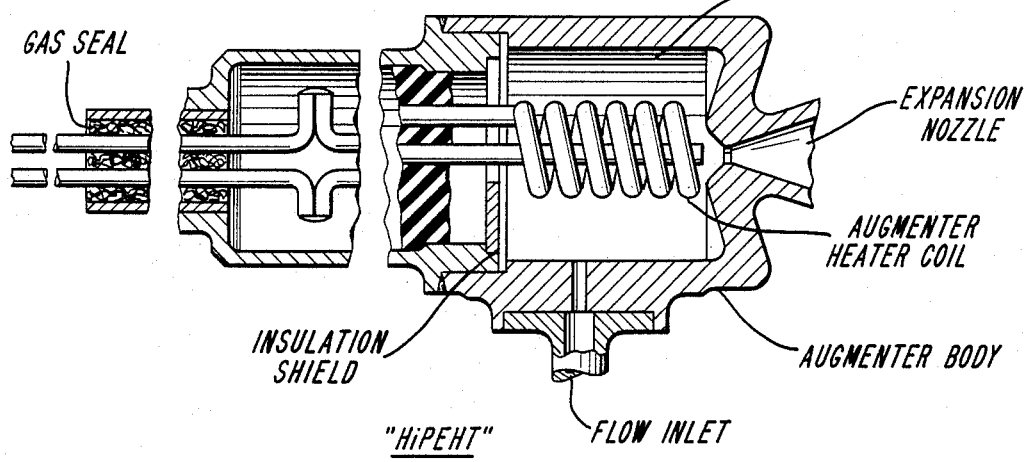
Fig. 14 PRIOR ART "HiPEHT"
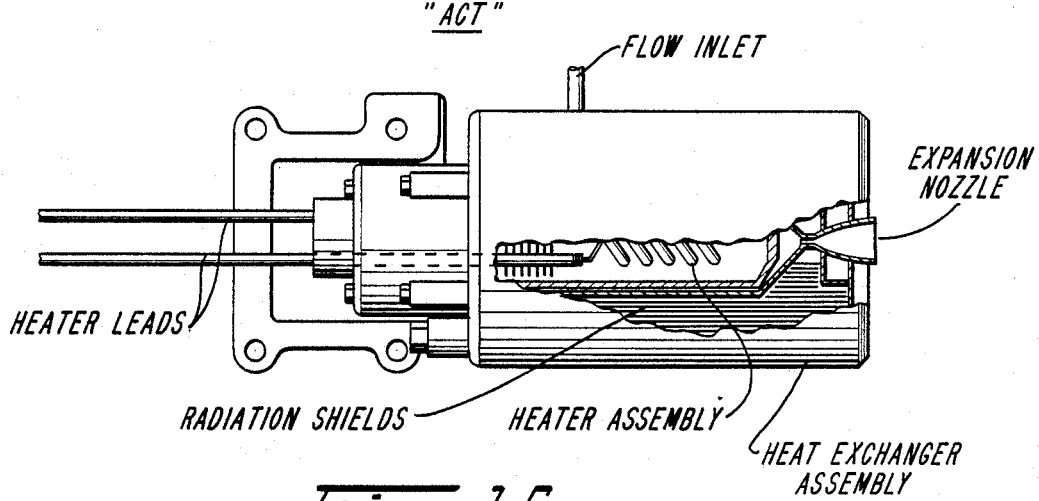
Fig. 15 PRIOR ART "ACT"

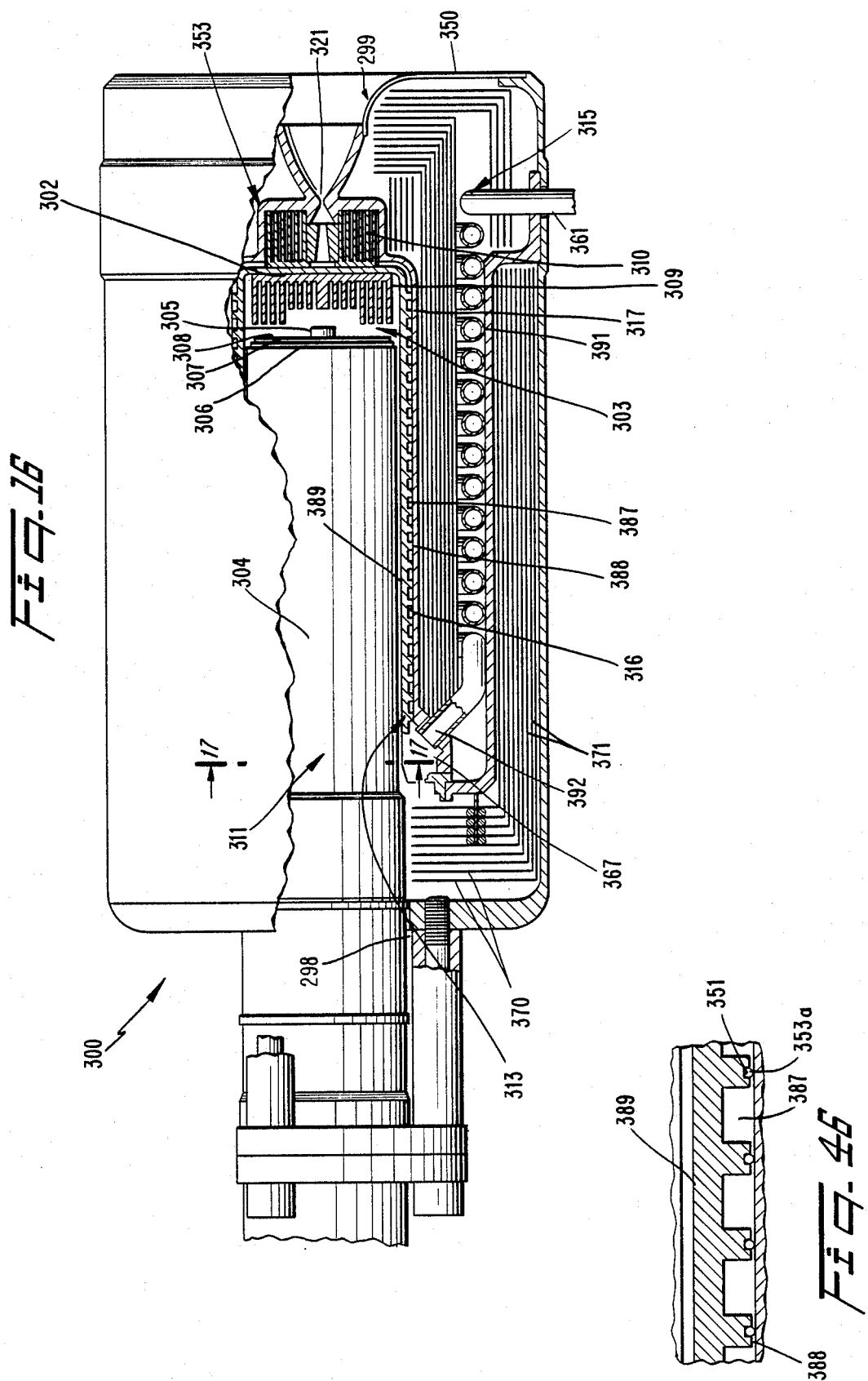

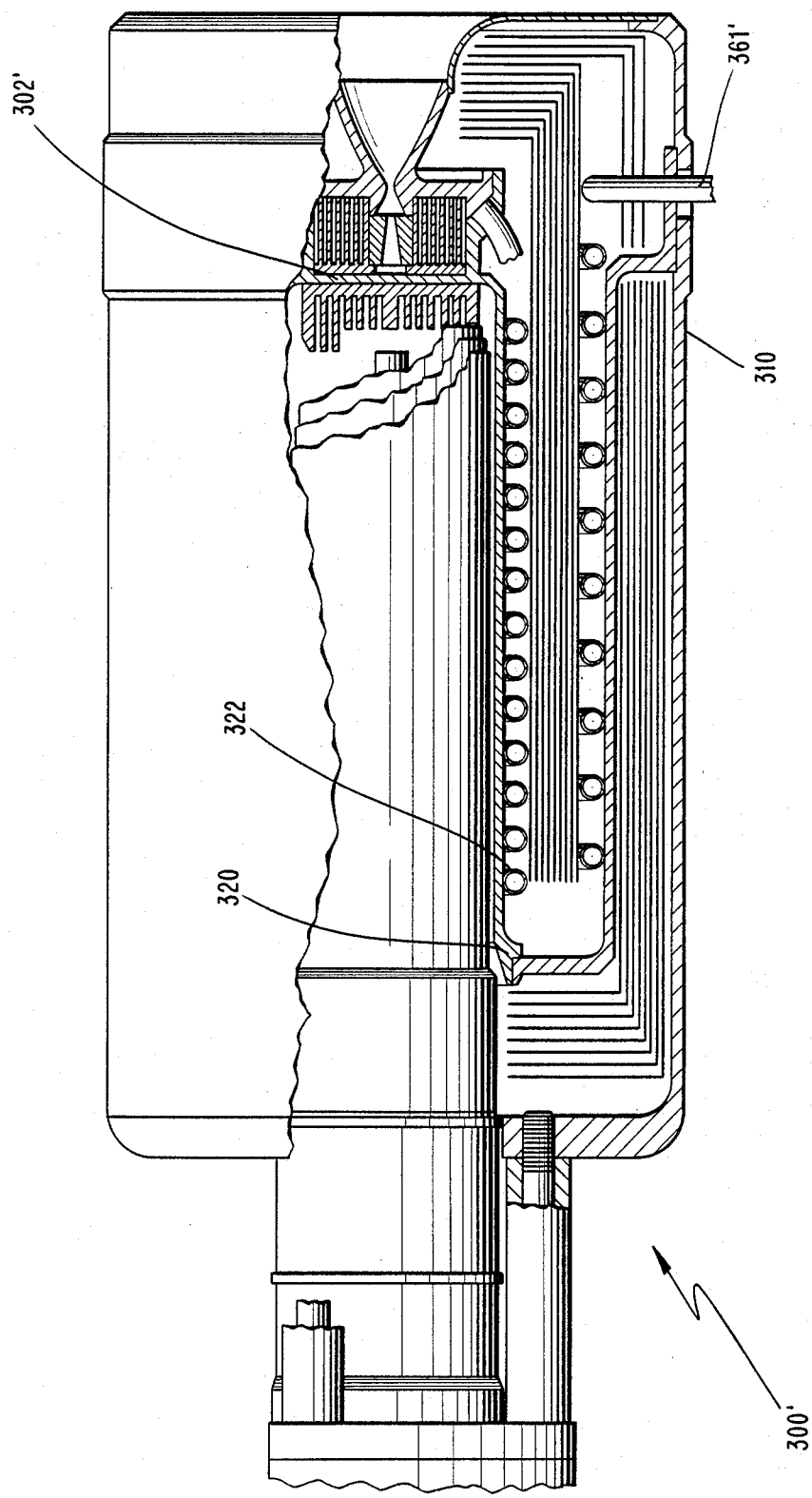

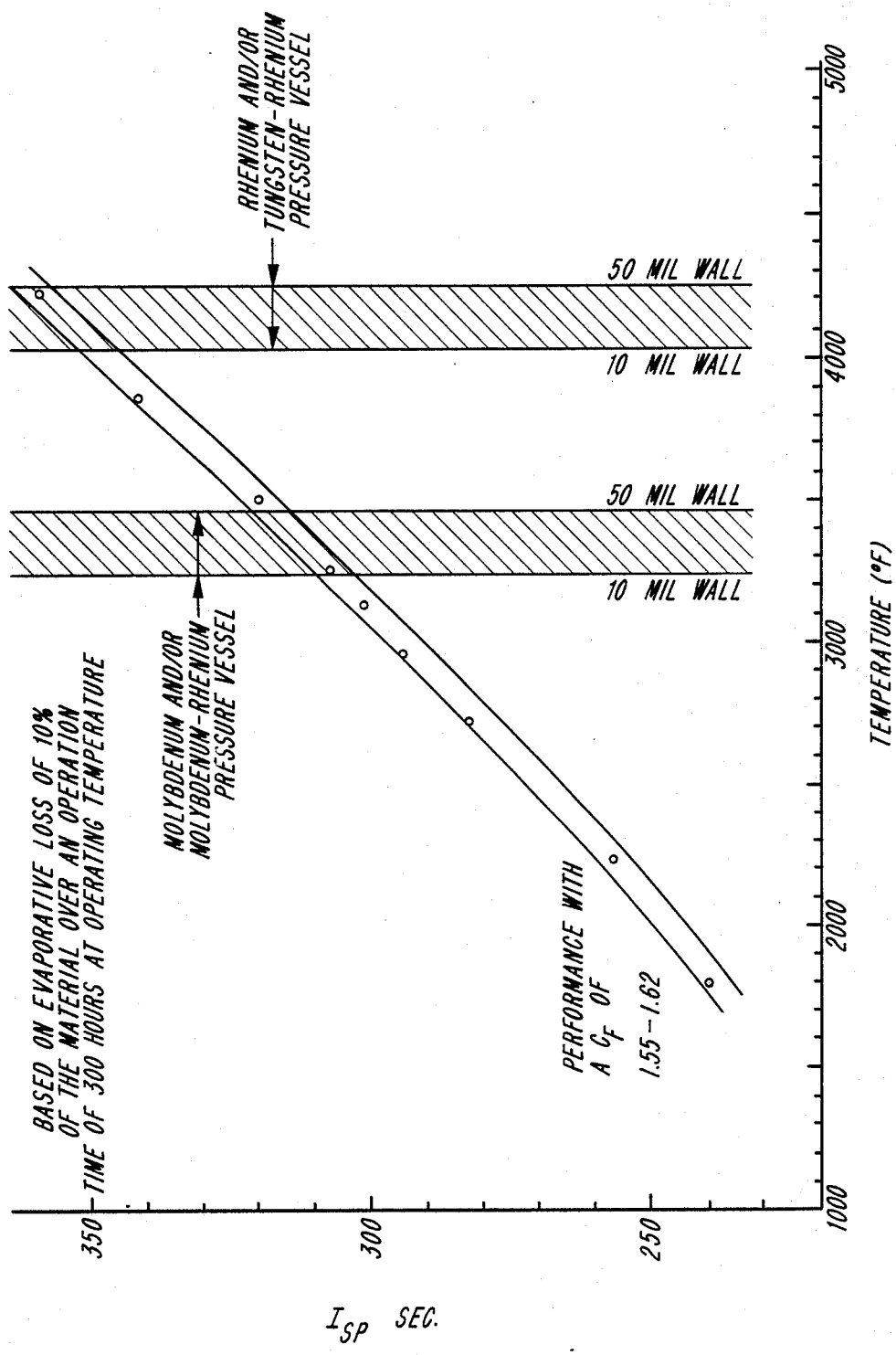

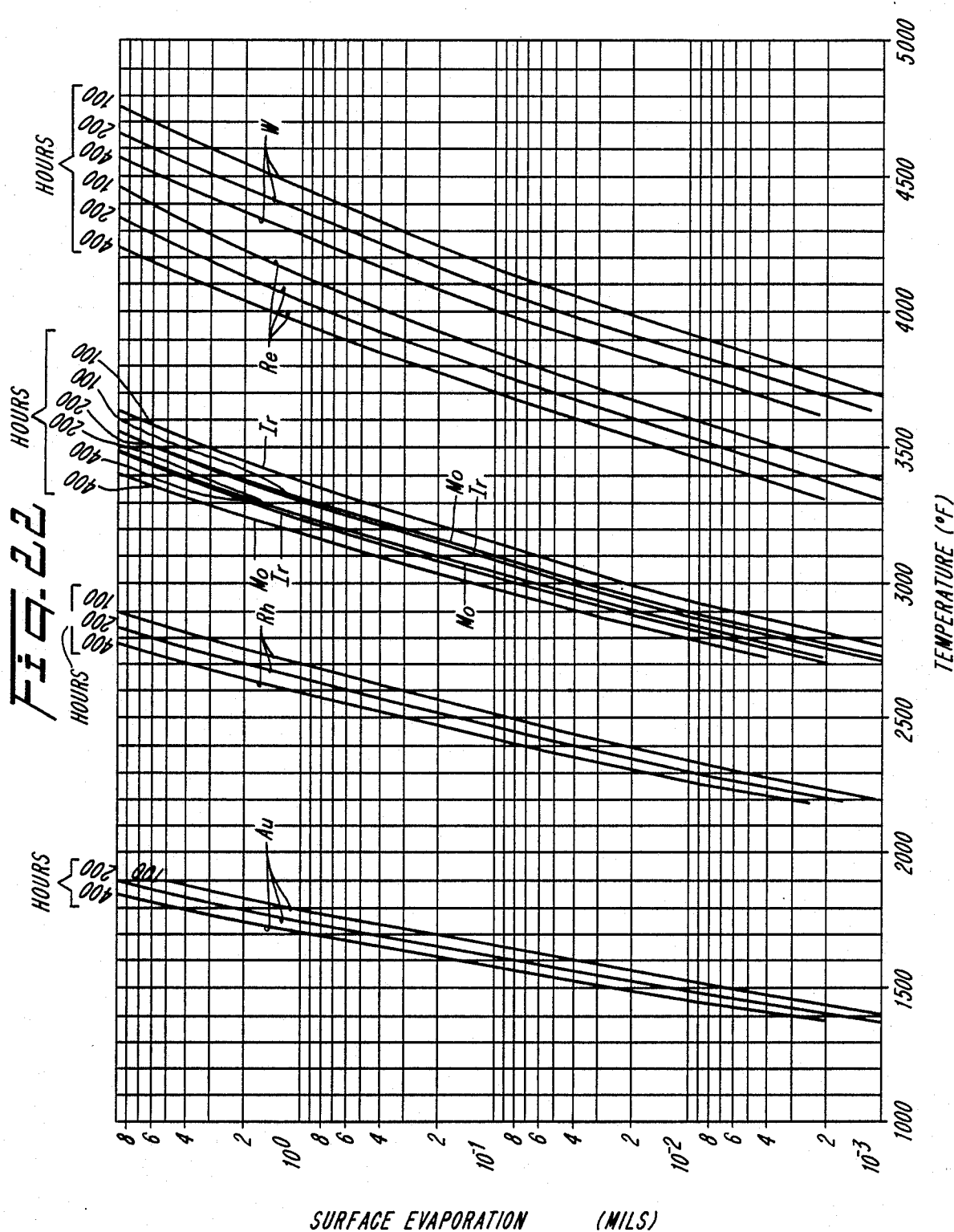

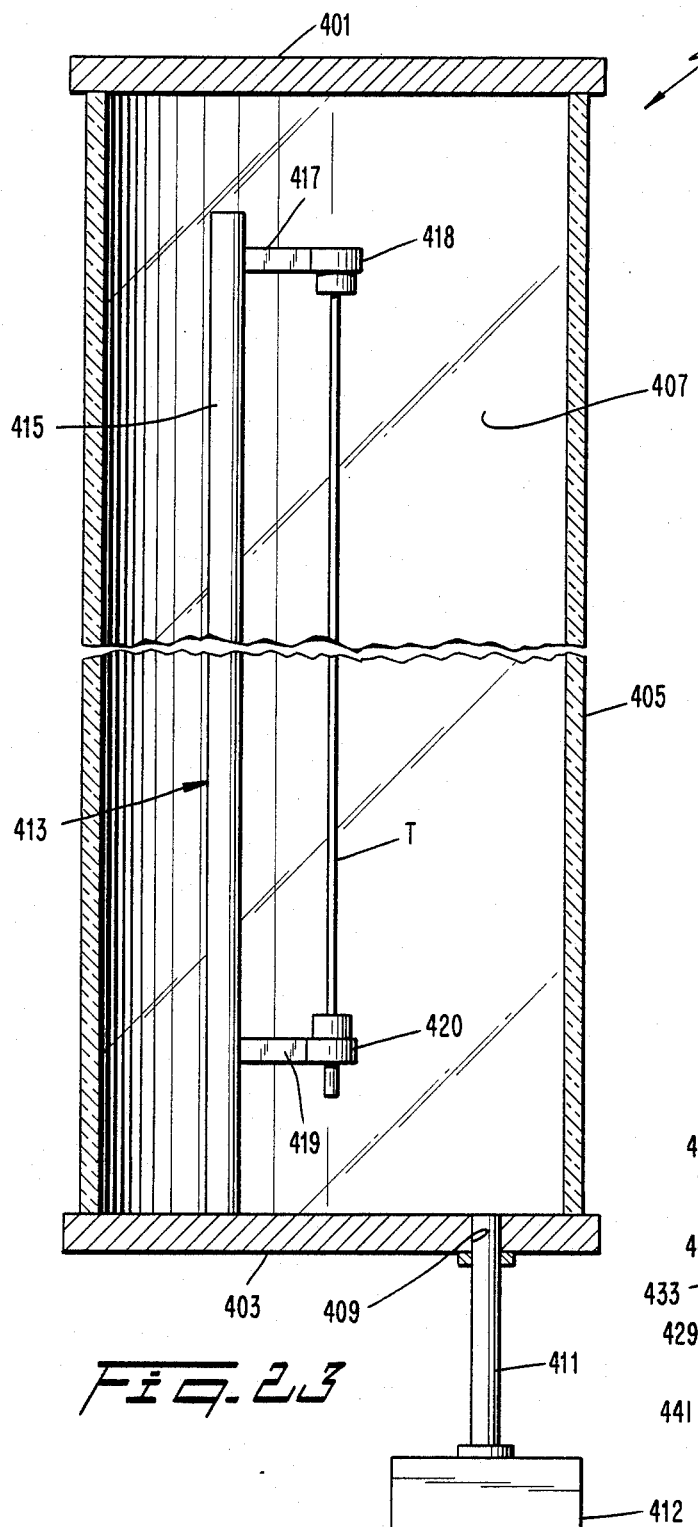

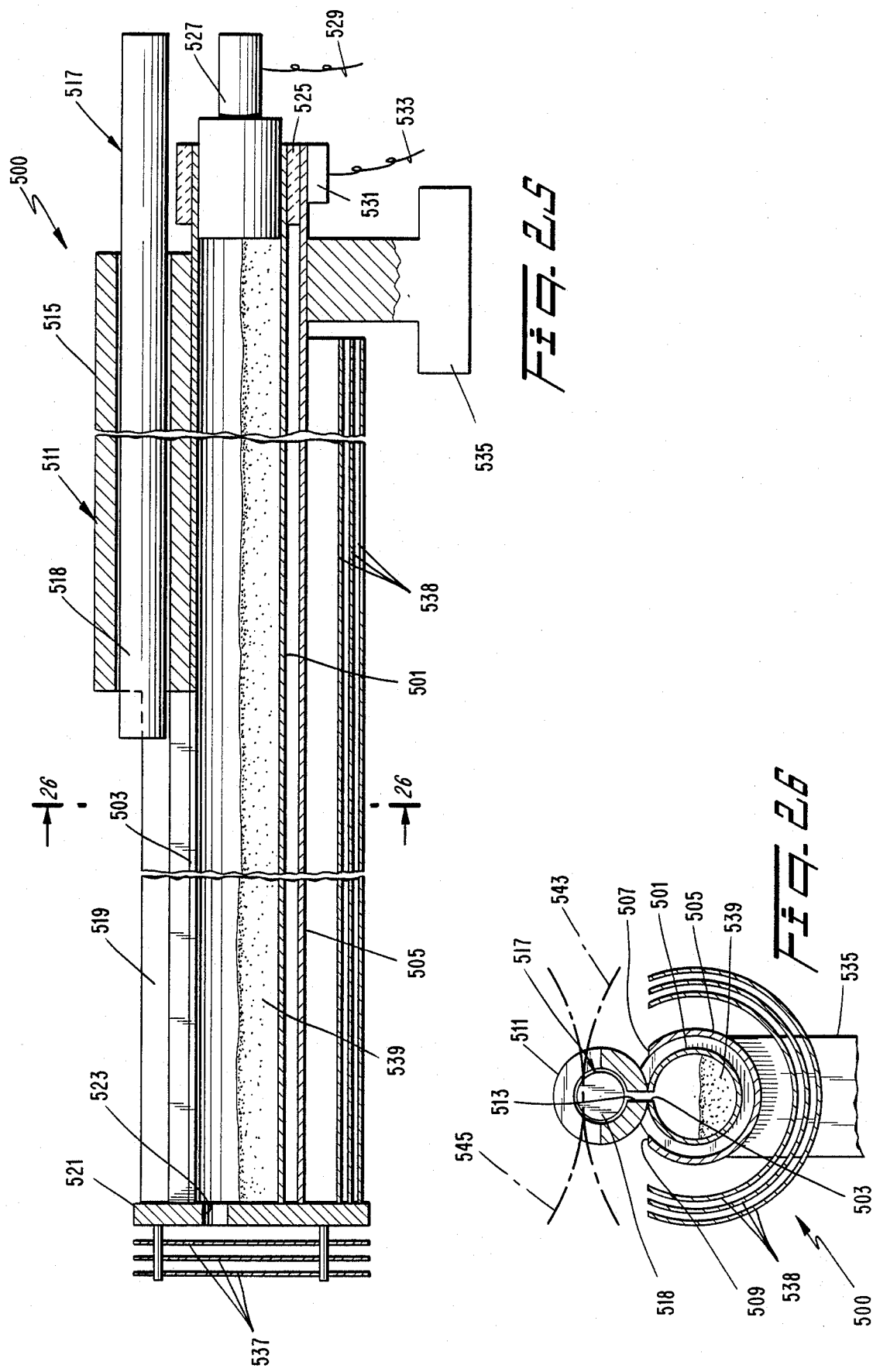

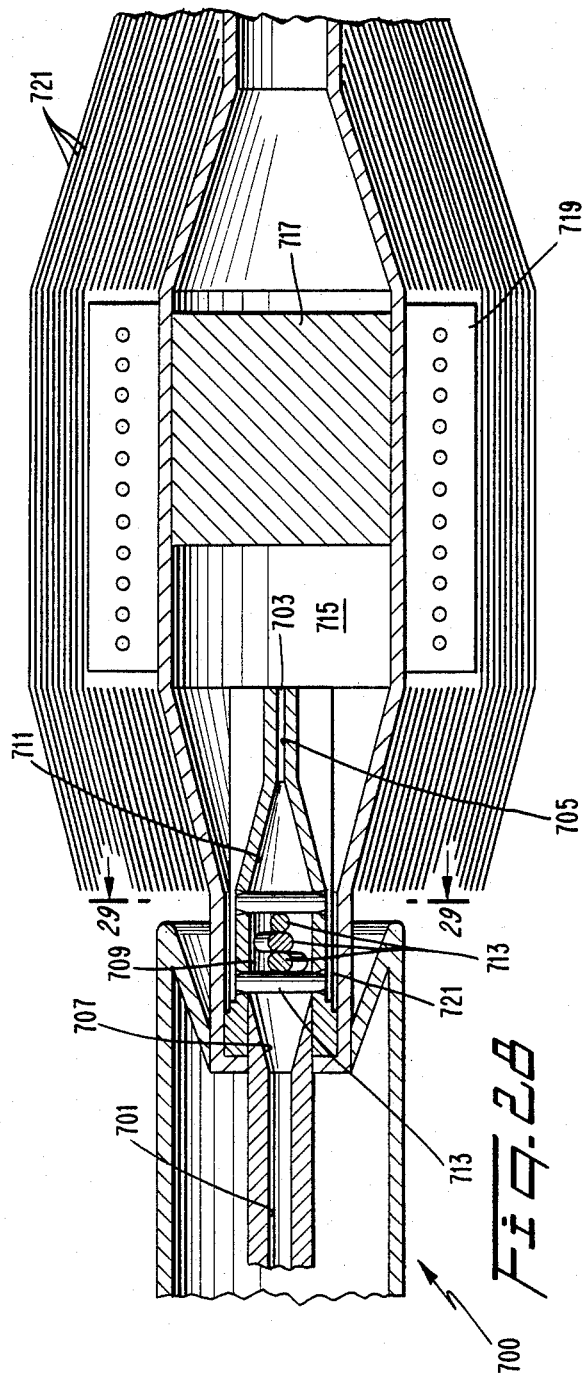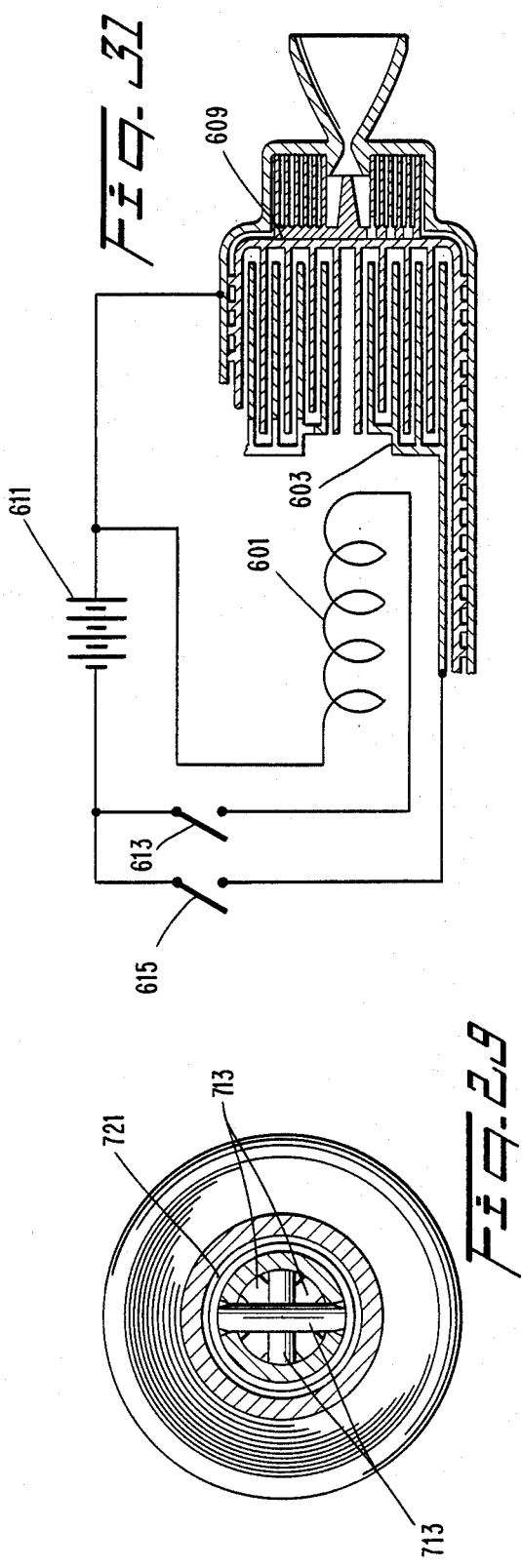

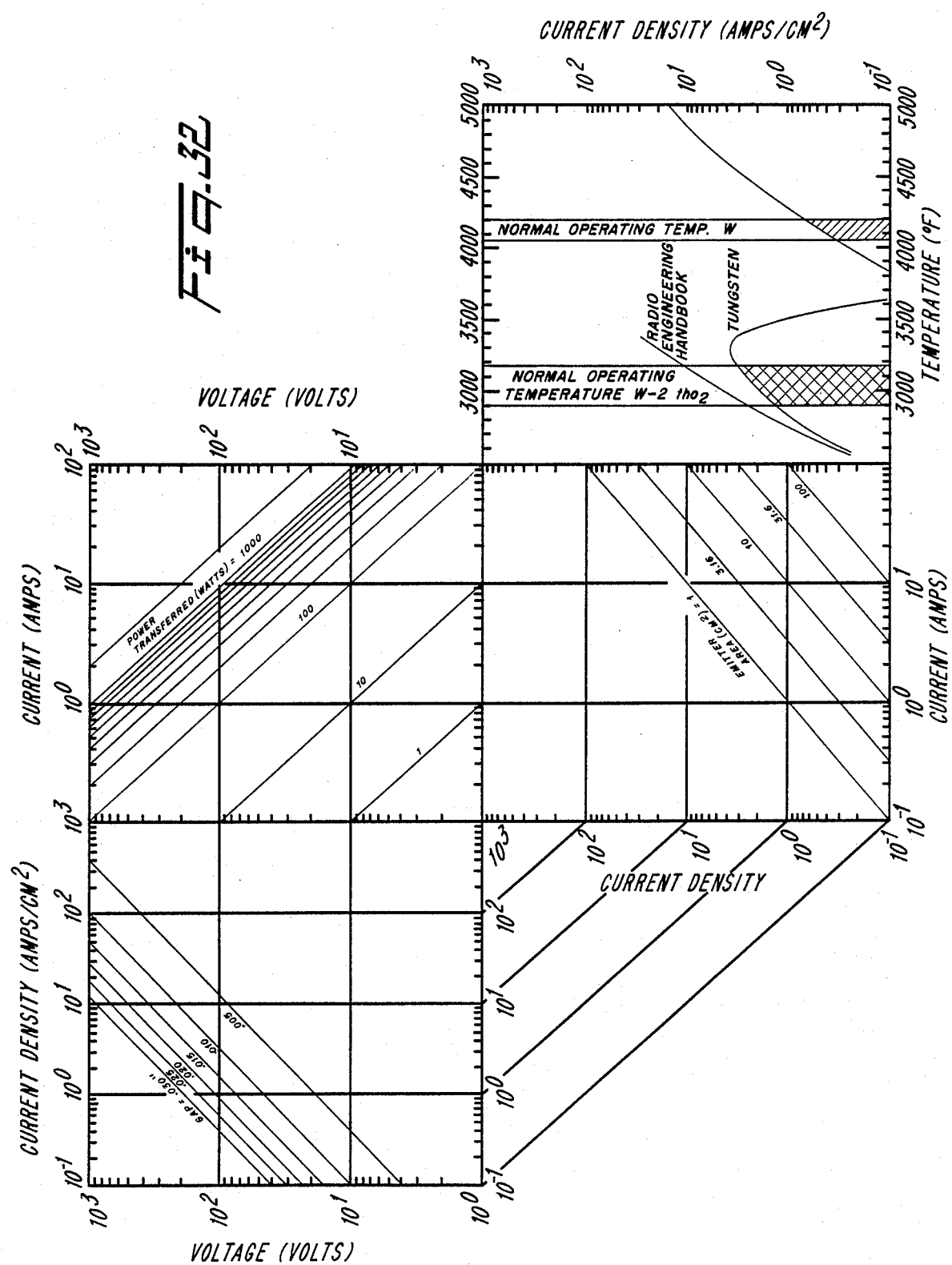

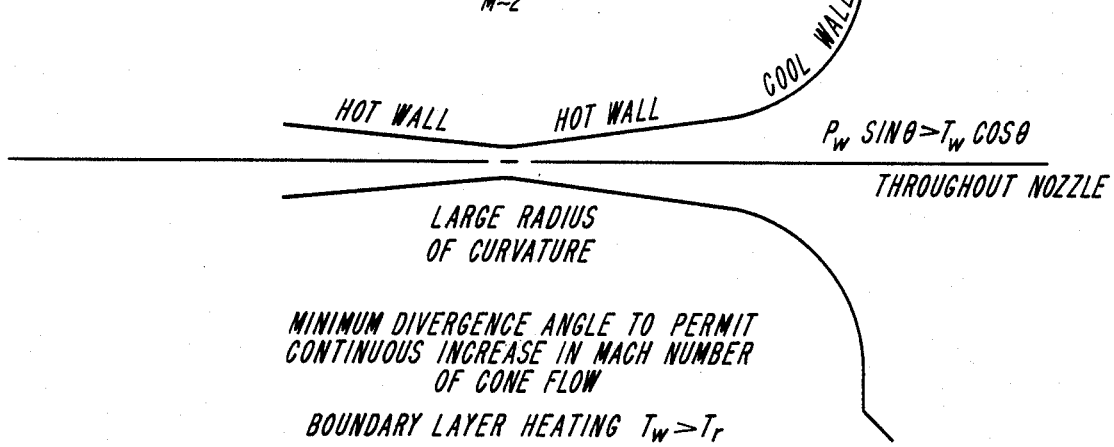
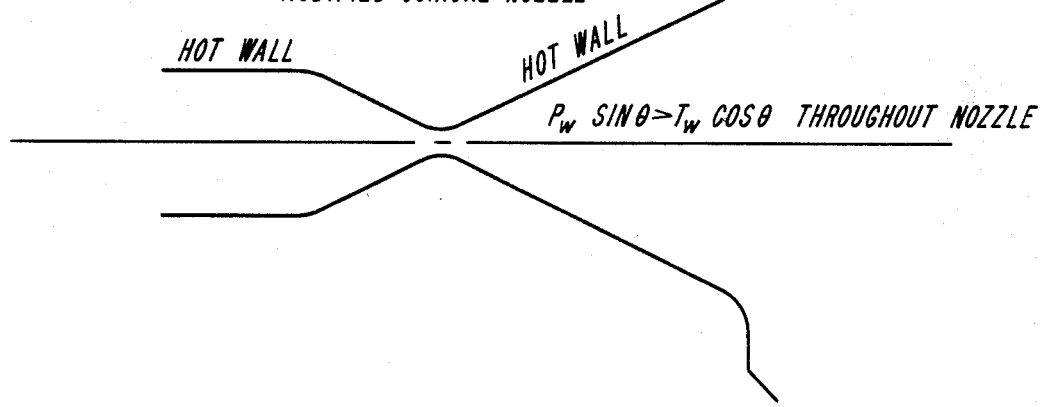
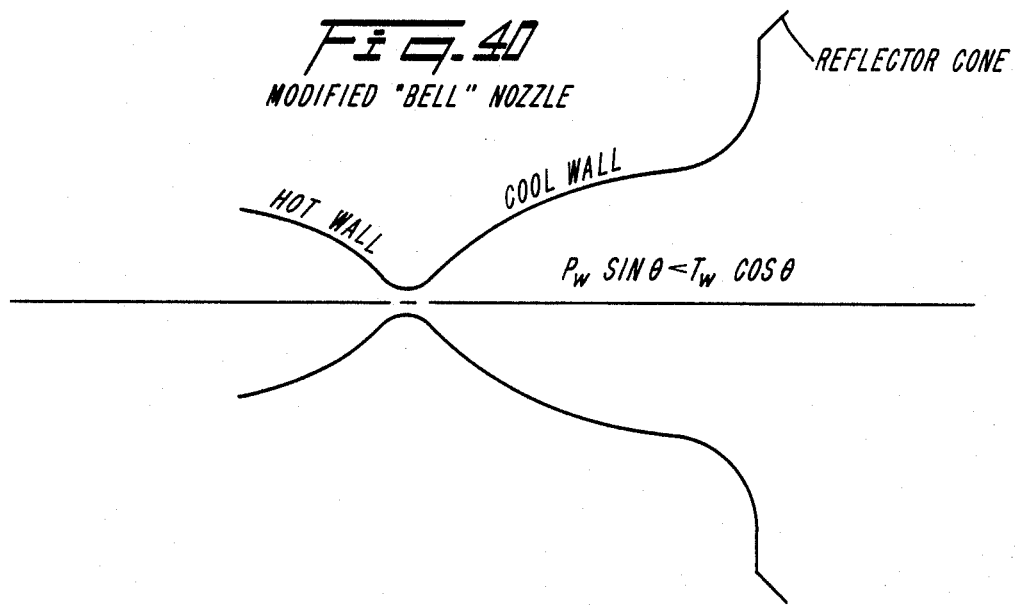

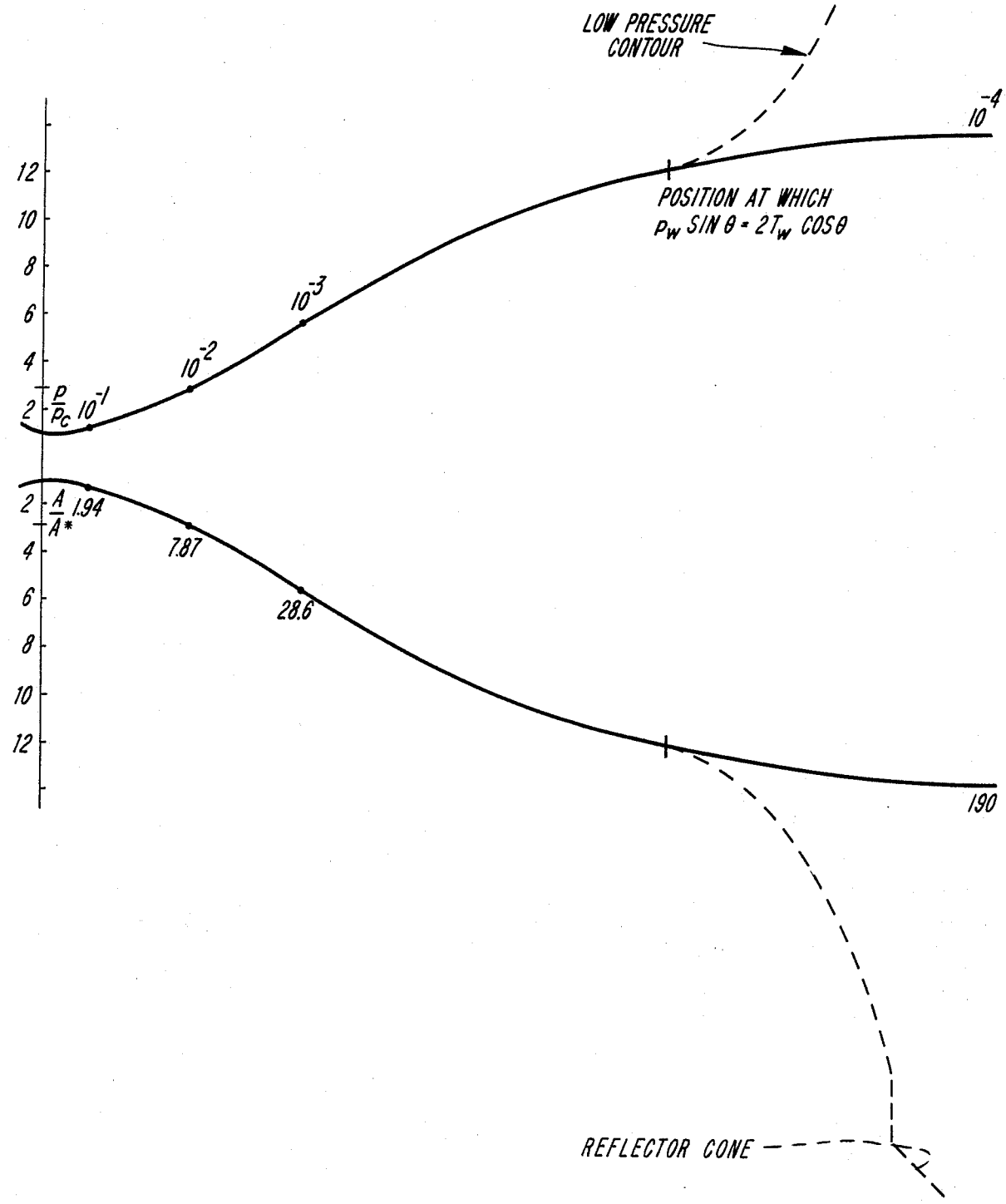
Fig. 4.5
PRIOR ART

PERFORMANCE IMPROVEMENTS IN THRUSTER ASSEMBLY

BACKGROUND OF THE INVENTION

This application is a CIP of application Ser. No. 517,265 filed July 26, 1983, now abandoned, which is a CIP of Ser. No. 359,776, filed Mar. 19, 1982, now abandoned.

FIELD OF THE INVENTION

This invention relates to thrusters intended to be used for low-power applications such as in the orbital positioning of spacecraft. The thruster disclosed is of the type using propellants such as hydrazine or hydrogen in which the propellant is heated to a desired temperature prior to exiting through a rocket propulsion nozzle. The heating provides a high specific impulse and facilitates decomposition and/or combustion.

These thrusters are normally used during the lifetime of a three axis stabilized or spin stabilized satellite (presently 8–10 years for synchronous orbit satellites) in order to place in, to change or to maintain orbit station. Satellite on-board propulsion is frequently required to finalize and, in some instances, make major corrections to achieve final orbit circularization and/or orbit station. When this is accomplished with a typical hydrazine-fueled engine, large quantities of propellant may be expended. Use of a performance augmented engine (using electric energy to extend the nominal chemical reaction performance level) for this function would conserve and retain more fuel for on-orbit functions. Typically, excess electric power is available on a spacecraft even during orbit/station insertion maneuvers. Correction firings are time-spaced, with off periods between firings so as to permit battery recharge for subsequent firings. By this augmentation process, fuel usage can be reduced by as much as 30 percent or more.

The thruster may also be used for correcting a satellite orbit which has decayed, or to maintain the orbit of a satellite which experiences some significant atmosphere drag or for repositioning the satellite to another location or station. Such thrusters can also be used for propelling satellites which follow other satellites or for evading tracking satellites. Another application of the performance-enhanced engine is to change the orbital path of a satellite in order to evade ground tracking or to make ground tracking more difficult. An application of this would be in satellite maneuvering for the sole purpose of decoying or saturating would-be tracking capabilities.

In usage, this engine could be ground-controlled by the spacecraft operating agency, or in some instances of covert operation, may be preprogrammed for on-orbit automatic control.

BRIEF DESCRIPTION OF THE PRIOR ART

Liquid propellant fueled spacecraft engines operate at performance levels limited by the chemical reaction energy of the propellant. Performance is generally maximum for steady state operating periods of more than a minute and reduced for pulsing operation. For a monopropellant fueled engine using a propellant such as hydrazine, either a catalyst bed or a thermal decomposer is used to initiate the exothermic reaction process. Of these processes, the catalyst bed is the most common. The thermal decomposer is typically brought to operating temperature by means of an electrical resistance heater. There decomposers serve only to initiate the chemical reaction, but do not add to or augment the chemical performance level. To extend the performance level, investigators have suggested use of electrical resistance heaters to boost the chemical performance level by exposing the chemically reacted or reacting propellant to a high temperature heater, thereby increasing the propellant temperature prior to expansion of the propellant through a nozzle. The inherent problem of such a device is the fact that direct contact between the heater and the flow requires that the propellant be as free as possible of contaminants (standards in excess of those typical of most rocket engine usage specification levels). This also precludes use of the more complex propellant formulations such as any that would contain carbon or oxygen, due to possible chemical interactions with the heating element.

In the prior art, the heaters were designed for maximum output during propellant contact. Without heat removal by the propellant the heater would attain excessive temperature and heater burn-out could occur. Accordingly, the power could only be switched on when propellant was flowing, and this meant that the successful transfer of energy from the heating filament to the propellant could be accomplished only when a sufficient amount of electric power was available for heating the propellant at the rate that the propellant was being utilized for thrust. This not only prevented operation during times when battery power was substantially low, but also precluded preheating the thruster with the heater before propellant flow was initiated. This also places limitations upon attainable temperatures. Such an engine cannot be off-flow modulated or pulsed with off periods greater than a few milliseconds and as such is limited in its usefulness.

A further characteristic of flow-coupled devices is that the heater is subjected to all pressure fluctuations of the propellant supply and reaction process. Gas dynamic forces from any propellant reaction instability will be transmitted to the heater and may cause a heater distortion failure. Since the flow is circulating through the heater region there is constant flow impacting and washing of the heater. Further, the heat transfer area is limited by the finite surface area of the heater.

This prior art design also requires use of high temperature sealed electrical feed-through(s) into the chamber. This places restrictions on the overall engine design as to operating temperature and power.

The prior art thrusters used an outer shield having a low emissivity surface in order to reflect as much heat as possible back to within the heating portion of the thruster. This minimized energy losses by maintaining a higher temperature within the heating section of the thruster. Because the minimization of heat loss was accomplished in part by minimizing exterior surface cooling, the exterior tended to remain hot causing heat to be transferred through the thruster's supporting structure to the satellite proper. A further disadvantage of having a high exterior temperature was that infrared sensors could easily distinguish a warm satellite's components from the surrounding space. The rocket nozzle section of thrusters also presented a source of high temperature emissions. This resulted from the high temperatures present at the nozzle's throat and internal expansion chamber areas, which high temperatures were conducted as heat to the outer portions of the rocket nozzle.

In prior augmentation designs, the liquid propellant is first decomposed, vaporized and reacted in an uninsulated, thermally separate chamber allowing some of the reaction energy to be lost.

Nozzle expansion area ratios of most rocket engines including prior augmentation thrusters are characteristically several hundred or less. Rocket engine test facilities characteristically have limited capability to simulate a space environment, therefore actual spaceflight is typically required to fully evaluate nozzle performance for large expansion ratio nozzles of engines at thrust levels greater than a few tenths of pounds thrust. Ground test data as it exists for these engines due primarily to the inadequacy of space simulation in the test facilities suggests ineffectiveness for expansion ratio nozzles of greater than several hundred. Further, state-of-the-art analytical projections are not definitive as "universal agreement does not exist regarding the correct procedures and assumptions for calculating the propulsive performance for nozzles with these high area ratios," as stated in the following reference:

Cooper, L. P. (NASA LeRC), Advanced Propulsion Concepts for Orbital Transfer Vehicles, AIAA paper-83-1243, June 1983.

BRIEF DISCUSSION OF THE STATE OF THE ART IMMEDIATELY PRECEDING THE PRESENT INVENTION

Use of the electrical power supply of a space vehicle to augment and/or to induce propellant dissociation can result in achievement of more thrust per unit mass of gas as the gas temperature is raised to increasingly higher values. Since satellite launch capabilities limit the mass of material that can be carried as propellant, the higher the temperature of the propellant outflow, generally the longer the useful lifetime of the space vehicle. For communication, navigation, weather or surveillance satellites, space stations, space platforms and space probes, great gains can usually be obtained by increasing the stagnation temperature of the propellant flow.

In one aspect of the invention disclosed in parent application Ser. No. 517,265, a thruster is provided which permits propellant to be heated without directly contacting a heater filament. The heater may have single or multiple elements to permit operation at different power levels and/or to have element redundancy. It is a further objective to increase the efficiency of heat transfer from the heater element by increasing the ratio of transfer of thermal energy to the propellant over thermal energy loss. In a further aspect thereof, an increase in propulsion performance is provided by permitting significant amounts of thermal energy to be stored within a heat exchanger for fractions of seconds or for considerable periods of time, such as several minutes. This enables the thruster to operate with reduced amounts of electrical power when necessary or advantageous. This thermal capacity of the heat exchanger also permits the engine to operate in a periodically modulated (interrupted) flow mode with constant heater power to accommodate specific flight operations or circumstances for either balancing or unbalancing the thrust vector. Typically, control engines are operated as matched thrust level pairs mounted on a vehicle to provide parallel thrust vectors which when summed together provide a resultant vector that would generally extend through the center of mass of the vehicle. In the event of an unbalanced disturbance torque on the vehicle or of inadvertent single engine performance degradation, i.e., a fractional reduction of thrust pressure in one engine, the opposite engine could be flow modulated at a rate that would maintain a thrust vector sum that would have the desired orientation. The option is also available to input a torque into the vehicle by this means. For a spinning spacecraft with engines located on either side of the spin axis if one engine were to fail, the second, if flow modulated during each revolution, could maintain a desired thrust vector.

In a further aspect of the invention disclosed in the parent application, a thruster is provided which may be operated at maximum efficiency by off-modulating either its heater filament or the propellant as necessary to match thruster pairs and/or to achieve an optimum performance balance under typical spacecraft conditions of a reducing propellant flow rate due to blow down of the propellant tank pressurant over mission life and changing spacecraft power supply due to a let down of battery voltage during a firing sequence and/or power supply capability degradation over mission life.

In a further aspect of the invention disclosed in the parent application, a thruster assembly is provided which is efficient in transfer of heat energy from an electrical heating element by means of effective utilization of heat shielding. It is a further object to provide such a thruster which, despite an effective means of maintaining heat in the thruster, maintains a relatively cool exterior surface and thereby presents a cool attachment point for a supporting structure.

In a yet further aspect of the invention disclosed in the parent application, a thruster is provided which, despite maintaining heat within the thruster, presents a cool exterior surface which is difficult to track with infrared scanning devices prior to actual ignition of the thruster, thereby decreasing the possibility that an enemy could detect an intended ignition of the thruster, even though the thruster may have a pre-heat capability. In a further aspect, a thruster is provided which has as an option to transfer as little heat as possible from its nozzle throat section to the outside portions of its nozzle. In a further aspect, a thruster is provided which operates with a cool exterior surface so as to make the thruster more difficult to track with infrared sensing devices when the thruster is expelling propellant into space.

In one further more specific aspect of the invention disclosed in the parent application, a thruster assembly is provided with a heating filament located within a heater cavity that communicates to space and which has a propellant guiding structure surrounding the heater cavity. This propellant guiding structure provides for the propellant inflow (injection) to occur at a location near the engine supporting structure, by design the coolest zone of the heat exchanger, and the propellant is then guided or channeled to flow through the inlet to the heat exchanger to the hottest zone which is adjacent to the nozzle throat. In this manner, the flow is heated by acquiring some of the heat that would otherwise be lost from the heat exchanger due to conduction into the supporting structure. This regenerative heating of the propellant both increases the efficiency of the heat exchanger and helps achieve higher propulsive performances for a given amount of available electric power.

The heater located within the heater cavity of the invention disclosed in the parent application can be assembled and tested separately from the heat exchanger. This modular construction feature also permits the heat exchanger to be assembled and tested separately from the heater, using a test heater or heater simulator. For flight applications, this permits operational testing of a flight heater in a non-degrading environment typical of the used for preflight checkout of rocket engines or spacecraft. A flight heater may be joined with the flight heat exchanger for a preflight vibration test, then removed and replaced with a ground-test-only heater (1) for preflight validation of the heat exchanger-nozzle and engine operating characteristics and (2) calibration. Subsequently the flight heater which has been checked out and calibrated in a separate test series in the non-degrading environment is reinstalled into the heat exchanger/engine in readiness for flight. Another feature of this arrangement permits a heater replacement, if desired, subsequent to engine installation on a vehicle or in a test facility without needing to remove the heat exchanger/engine.

The heater disclosed in the parent application may be comprised of one or more radiating heating elements or a combination of heaters and/or a thermionic emitter. A preferred configuration if a thermionic emitter is used would be to energize a heater to bring the cathode emitter to emission temperature. An embodiment featuring use of a cathode emitter to transfer energy to the heat exchanger requires the heater assembly to be electrically insulated from the heat exchanger and the heat exchanger would then function as an anode to receive the electron transfer from the cathode.

The heater filament disclosed in the parent application may have a number of configuration options as to shape, spacing and material selection. The heater may include one or more heating elements. Multiple elements may provide heater redundancy and/or the capability to operate at one or more power levels. The heaters may be free standing (self-supporting) or may be provided with additional electrically insulated mechanical supporting structures. The heater material and size are selected to provide an energy transfer capability to match or nearly as is feasible the spacecraft power supply capability making minimum use of additional power controllers and/or voltage-current regulators. The radiating heater materials will be made primarily of tungsten. Additional materials and processing are used with the tungsten to obtain specific predetermined characteristics. Three percent rhenium is added thereto to create the alloy W3Re to provide (1) ease in forming the element and (2) high vibration resistance. Selected trace elements and processing with the tungsten (without 3% rhenium) are used to make a high temperature resistant (in excess of 1925 degrees K.) wire more "sag" or droop resistant in the presence of gravitational and/or centrifugal force fields than would otherwise be attainable. This type of material combination and processing is typical of that used for filaments in aircraft landing lights. Application of this same type of filament material for the radiating heater(s) in the thruster provides a heater that can operate in a gravitational and/or centrifugal force field with less "sag" or deformation than would typically occur with a W3Re filament. This "sag" resistant wire permits extended periods, in excess of 100 hours, of high-g flight time or ground (one g) test time without resorting to heater rotation at rates of one rotation or more per minute; (such rotation rates are required to prevent "sag" of a high temperature self-supporting W3Re heater filament in a typical thruster configuration.) This "sag" resistant wire makes it possible to use a radiating high temperature filament on a spin stabilized spacecraft (characteristically having a rotation rate of 40 to 80 revolutions pr minute) with the engine being mounted away from the spin axis and exposed to centrifugal forces of 2 to 6 g's.

A further aspect of the invention disclosed in the parent application is the option of sealing the heater cavity containing a non-reactive gas, such as nitrogen, to enable gas pressurization of the filament. This pressurization will reduce heater filament vaporization rates. Conduction through the gas and gas convection induced by a "g" field will also transfer significant amounts of power from the heater element to the heat exchanger, resulting in a lowered temperature (as much as 220 degrees K. lower) of the coil for the transfer of a given amount of power. This combination of a reduced evaporation rate and a lower coil temperature to transfer a given power from the coil to the heat exchanger can increase the lifetime of a coil by over one order of magnitude, e.g. from 60 hours to over 600 hours. Pressurant gas dynamic forces in the heater cavity may also be used to counteract distorting g forces. That is, the heater filament may be configured in relationship to the cavity so as to interact with the pressurant gas to cause a gas convection force to oppose the "sag" forces.

The heating filament may be switched "on" for significant periods of time when propellant is not flowing through the passageway and a heat-sinking capability of the propellant guiding structure permits heat to be transferred to propellant when the filament is switched "off". The propellant guiding structure may be formed in multiple layers to provide plural thermal zones of increasing temperature for the propellant as the propellant is passed through the structure. In order to retain heat within the structure, the shields will be separated by means of physical indention or preformed to specific configurations with thermal processing. Multiple radiation shields may be used internally within the heat exchanger, surrounding and at the base of the heater assembly and external of the heat exchanger. While interior shields have low emissivity in order to reflect and hold heat inwardly, the exterior surface of the thruster may have a coating having a high emissivity in order to present as cool an exterior surface as possible. The tendency of the exterior surface to remain cool by emitting heat enables operation of the thruster with higher internal temperatures, hence more efficiently. The heat exchanger/engine supporting structure, typically designated in the art as a barrier tube, connects and mechanically couples the engine to the spacecraft mount. The preferred embodiment of this barrier tube as disclosed in the parent application, uses a thin tube of extended length, with material cut-outs, formed of a low thermal conductivity material such a titanium to minimize the heat loss through this thermal conductivity path. This extended length barrier tube may be configured as concentric cylinders connected at alternating ends to minimize packaging volume with acceptable engine structural support to meet typical spacecraft launch vibration load requirements.

The heating filament and the interior surface of the heater cavity as disclosed in the parent application, may also be provided with high emissivity coatings by means of surface treatment and/or coatings in order to promote a rapid transfer of energy from the heating filament to the materials surrounding the heater cavity with minimum temperature differentials between the wire and the cavity. The heating filament may operate in either a vacuum environment or may be pressurized with an inert or non-reactive gas or with reacted propellant gases in order to prolong the life of the filament. Reacted and/or energized propellant gases may be introduced into the heater cavity directly from a heat exchanger bleed for moderate level pressurization, (40 to 150 psia), or from a bleed from the expansion nozzle wall for less than one atmosphere (as low as $10^{-3}$ psia) pressurization. In that the cavity would be moderately well sealed (low leak of several cubic centimeters of gas per hour or less permitted), the gas is essentially stagnant in the absence of a "g" field. No significant measure of propellant is lost during this pressurization process.

The filament itself may be provided with a bifilar helix configuration. In this mode, electromagnetic forces resulting from current flowing through each filament half will cause the filament to maintain a desired central position relative to the other, thereby axially stabilizing the filament when it is hot.

The construction is such that the fuel passageways are formed as helix threads or as grooved passageways extending in one or more plural layers along the length of the thruster housing coaxial with the heater cavity. The concentric relationship of the fuel passageways and associated structure, including the shield, permits the thruster to be assembled with a minimum of weldments or other fastening devices.

The thruster assembly as disclosed in the parent application may be provided with an injection passage such that the propellant can be introduced as a liquid and heat from the performance augmentation section will thermally decompose it without the use of a dissociation catalyst.

The fluid passageways may be coated or plated with a material that is resistant to chemical interaction or, when desired, to enhance the dissociation process of the propellant, permitting use of less costly materials for the passageway such as TZM molybdenum alloy.

In a further aspect of the invention as disclosed in the parent application, a thruster assembly such as described above can be formed with a nozzle having a nozzle throat insert. The nozzle throat insert has a high temperature capability, whereas the remainder of the expansion area of the nozzle is not required to have the same high temperature properties. The insert construction also provides a means to reduce thermal emissions from the thruster's nozzle expansion portion.

While the thruster assembly disclosed in parent application Ser. No. 517,265 has met with commercial success, potential for improvement exists in its structure and operation in the following particulars:

(a) Firstly, the thruster assembly disclosed in the parent application decomposes hydrazine in a typical rocket engine catalytic bed in a separate chamber and feeds the reaction products into the thruster through a feed tube. This technique, however, is found to result in the loss of a significant percentage (up to 30%) of the hydrazine decomposition chemical energy from the gas flow while retaining high fractions of undissociated ammonia. For separate reasons then, these approaches to propellant (hydrazine) decomposition and injection have disadvantages.

(b) The heat exchanger surrounding the heater coil will be typically made from Mo4ORe bar stock. This material is presently available in diameters of 1⅛ inch or less, and at the maximum size there is some porosity in the material within the inner ½ inch core. This material costs about $2,700/kg (1983) and most of the purchased weight has to be machined out and discarded. This present limit at to maximum diameter available of Mo4ORe imposes restrictions on engine thrust level due to heat exchange surface area limitations.

This material size restriction also limits the amount of power that can be transferred by radiation to the limited diameter cavity walls, as there are packaging, operating condition and lifetime limits of current heater technology, as demonstrated in FIG. 22.

The power radiated from a heater coil with a fixed major helix diameter can be increased somewhat higher than 750 watts and still maintain adequate life by any or all of the following techniques:

(i) Enhance the emissivity of the coil by surface roughing or by using a surface coating such as hafnium carbide (maximum increase of power transfer is about a factor of four).

(ii) Pressurize the cavity to reduce the surface loss rate and permit the coil to operate at a higher temperature and thus radiate more power-per-unit surface area (see FIG. 27) (maximum increase of power transfer is about a factor of two and one-half). (This feature would also permit some power to be conducted from the heater to the heat exchanger wall by convection through the gas so that the total power increase factor by means of pressurization could be three or three and one-half.)

(iii) Lengthen the cavity and simultaneously lengthen the coil. This results in longer unsupported heater coil lengths and weights, and thereby approaches a maximum length limit where the coil will eventually fail either in vibration or in "creep" or "squirm". An estimate on the potential power increase available by lengthening is a factor of about two.

(c) Stresses in the heat exchanger section surrounding the inner heater coil, caused by the internal gas pressure, lead to creep rupture distortion and/or failure in lifetimes up to about 500 hours. If wall thicknesses are increased to extend lifetimes, undesirable weight is added. To help minimize the material stresses and wall thickness, the internal pressure is reduced by external pressure drop mechanisms from a typical propellant or fluid supply pressure range of 350–100 psia to values ranging from 100–40 psia over life. This reduces the Reynold's number of the flow through the nozzle and consequently results in a lower thrust coefficient of the nozzle. Hence, the specific impulse of the augmenter is lower than what it could be by utilizing the full pressure available.

(d) In order to reduce energy loss out the open end of the heat exchanger cavity, three short (one-inch length) radiation shields (FIG. 16) are placed between the coil and the cavity surface. All of the cavity can be emissivity-enhanced by roughening or by thermo-chemical treatment of or plating the surface. Such processing can increase the effective emissivity by several factors. These arrangements maximize the amount of heater radiation absorbed by the cavity. However, as the surface area of the cavity and the surface emissivity (enhanced or not) is uniform over the cavity length, the radiative heat transfer into the wall is relatively uniform. This arrangement did not permit any significant concentration of radiation transfer near the engine nozzle throat inlet section thereby limiting the peak specific impulse (propellant temperature) operating conditions.

(e) Thermal shielding of the heat exchanger components can effectively be accomplished only by using radiation shielding. In existing designs, scrolls of molybdenum foil are used, together with some discs. Both are usually spaced or separated by surface indentations and preforming or by wires. If the ratio of the contact area to the shield areas exceeds $10^{-5}$, the effectiveness of the shields is significantly reduced. It is difficult to obtain an area ratio lower than $10^{-4}$ by using surface indentations and preforming or wire separations.

Good shielding at the nozzle end is extremely important to ensure that the heat exchanger in this region attains its highest possible temperature value. If gas from the nozzle exit is permitted to expand and enter the outer shield cover and surrounding the shields, the shields' effectiveness is reduced. In this regard, reference is made to Tables 1A and 1B. If the shield cover is not effectively sealed to the nozzle exit, then the radiation shields will have degraded performance.

TABLE 1A

POWER LOST IN WATTS FROM RADIATION SHIELDED HEAT EXCHANGER AS FUNCTION OF AMBIENT PRESSURE AND SHIELD CONTACT SURFACE RATIO

| | $A_c/A$ | | | | |
|---|---|---|---|---|---|
| P(Torr) | $10^{-3}$ | $10^{-4}$ | $10^{-5}$ | $10^{-6}$ | $10^{-7}$ | |
| 1.0E 01 | 296.86 | 269.29 | 266.16 | 265.84 | 265.88 | 16 |
| 1.0E 00 | 227.41 | 174.28 | 167.47 | 166.70 | 100.73 | SHIELDS |
| 1.0E-01 | 189.87 | 108.53 | 95.52 | 94.08 | 93.96 | T.c = 1900 |
| 1.0E-02 | 184.06 | 95.45 | 78.63 | 76.47 | 76.25 | deg K. = |
| 1.0E-03 | 183.46 | 93.94 | 76.32 | 73.96 | 73.71 | (2961 |
| 1.0E-04 | 183.40 | 93.77 | 76.07 | 73.69 | 73.44 | deg F.) |
| 1.0E-05 | 183.40 | 93.76 | 76.05 | 73.66 | 73.42 | .010 in. Spacing |
| 1.0E 01 | 291.03 | 259.50 | 255.88 | 255.52 | 255.53 | 22 |
| 1.0E 00 | 215.77 | 152.50 | 144.07 | 143.20 | 143.14 | SHIELDS |
| 1.0E-01 | 183.98 | 92.66 | 77.45 | 75.74 | 75.59 | T.c = 1900 |
| 1.0E-02 | 179.52 | 82.11 | 63.48 | 61.00 | 60.74 | deg K. = |
| 1.0E-03 | 179.05 | 80.93 | 61.62 | 58.92 | 58.63 | (2961 |
| 1.0E-04 | 179.00 | 80.81 | 61.43 | 58.70 | 58.41 | deg F.) .008 in. Spacing |
| 1.0E 01 | 305.64 | 282.26 | 279.64 | 279.39 | 279.4 | 10 |
| 1.0E 00 | 249.37 | 209.85 | 205.06 | 204.58 | 204.56 | SHIELDS |
| 1.0E-01 | 203.30 | 138.12 | 128.38 | 127.33 | 127.25 | T.c = 1900 |
| 1.0E-02 | 194.83 | 120.10 | 106.45 | 104.83 | 104.65 | deg K. = |
| 1.0E-03 | 193.87 | 117.83 | 103.33 | 101.55 | 101.37 | (2961 |
| 1.0E-04 | 193.77 | 117.60 | 103.00 | 101.20 | 101.02 | deg F.) |
| 1.0E-05 | 193.76 | 117.57 | 102.97 | 101.17 | 100.99 | .018 in. Spacing |
| 1.0E-06 | 193.76 | 117.57 | 102.96 | 101.17 | 100.99 | |
| 1.0E-07 | 193.76 | 117.57 | 102.96 | 101.17 | 100.99 | |
| 1.0E-08 | 193.76 | 117.57 | 102.96 | 101.17 | 100.99 | |

O.D. 1.5"
L = 2.75

TABLE 1B

POWER LOST IN WATTS FROM RADIATION SHIELDED HEAT EXCHANGER AS FUNCTION OF AMBIENT PRESSURE AND SHIELD CONTACT EFFECT OF COATING SHIELD WITH RHODIUM
RADIATION SHIELD PERFORMANCE COMPARISON

16 Shields
T.c = 1900 deg K.
= (2961 deg F.)
.010 in. Spacing

| | $A_c/A$ | | | | |
|---|---|---|---|---|---|
| P(Torr) | $10^{-3}$ | $10^{-4}$ | $10^{-5}$ | $10^{-6}$ | $10^{-7}$ |
| No Coating | | | | | |
| 1.0E 01 | 300.90 | 274.05 | 271.00 | 270.70 | 270.73 |
| 1.0E 00 | 233.06 | 181.24 | 174.62 | 173.93 | 173.89 |
| 1.0E-01 | 196.54 | 117.93 | 105.68 | 104.34 | 104.23 |
| 1.0E-02 | 190.91 | 105.75 | 90.12 | 88.09 | 87.88 |
| 1.0E-03 | 190.32 | 104.36 | 87.98 | 85.75 | 85.52 |
| 1.0E-04 | 190.26 | 104.21 | 87.75 | 85.50 | 85.27 |
| Rh Coating | | | | | |
| 1.0E 01 | 291.86 | 263.58 | 260.28 | 259.95 | 259.98 |
| 1.0E 00 | 219.31 | 162.27 | 154.90 | 154.14 | 154.09 |
| 1.0E-01 | 179.05 | 90.91 | 77.15 | 75.66 | 75.53 |
| 1.0E-02 | 172.80 | 77.12 | 60.64 | 58.71 | 58.51 |

TABLE 1B-continued

POWER LOST IN WATTS FROM RADIATION SHIELDED HEAT EXCHANGER AS FUNCTION OF AMBIENT PRESSURE AND SHIELD CONTACT EFFECT OF COATING SHIELD WITH RHODIUM
RADIATION SHIELD PERFORMANCE COMPARISON

16 Shields
T.c = 1900 deg K.
= (2961 deg F.)
.010 in. Spacing

| | $A_c/A$ | | | | |
|---|---|---|---|---|---|
| P(Torr) | $10^{-3}$ | $10^{-4}$ | $10^{-5}$ | $10^{-6}$ | $10^{-7}$ |
| 1.0E-03 | 172.13 | 75.56 | 58.60 | 56.56 | 56.35 |
| 1.0E-04 | 172.07 | 75.40 | 58.38 | 56.34 | 56.12 |

SUMMARY OF THE INVENTION

The present invention improves upon the prior art as discussed hereinabove in the following particulars:

(a) The inner and outer heat exchanger components are brazed together along the lands of the threads or the tops of the grooves thereof (FIG. 16). Braze material could be a material such as, for example, molybdenum or iridium. One method of several options to apply the braze material may be by vapor-deposition on the inner diameter of the outer heat exchanger component, the outer diameter of the inner heat exchanger component, or both. Another method of putting the braze in position is by layering between the parts a thin foil of braze material. A third method is to provide a channel in the meshing parts which contains the braze material, i.e. in the form of a wire (see FIG. 46). The braze can be accomplished by any one of several methods:

(i) Heating the whole structure in a vacuum furnace.

(ii) Placing a heater assembly in the heat exchange cavity and heating in a vacuum environment (preferably ion-pumped to under $10^{-4}$ Torr). This is a preferential brazing technique, since the inner component will be somewhat hotter than the outer component. The extra thermal expansion of the inner component will close any gaps that may exist between the components over the surface that is to be brazed.

Effecting this braze reduces the tension load on the outer component and the compression load on the inner component to negligible values so that the wall thickness (and weight) can be substantially reduced. Also, the creep-rupture problem is almost completely eliminated, since each flow passage is now equivalent to a tube and all of the metal becomes structural. This improvement will permit lower specific weight for the heat exchanger while giving simultaneously a life extension of over 500 hours as compared to an unbrazed structure.

(b) Further, a coiled tube replaces the outer heat exchanger passage of the prior art configuration discussed hereinabove. This tube can be made of molybdenum-rhenium, rhenium or other high-temperature materials.

Use of centrifugal flow passages for either the inner or outer heat exchanger passage and the resulting effects of the induced secondary flow which is generated into the flowing propellant tends to greatly increase the heat transfer rates over those usually obtainable in the straight flow channel. Also, the gas is heated more uniformly because of the mixing induced by the secondary flows.

For better performance, the coiled tube can also have an inside coating of iridium, tungsten or rhenium. Iridium is an advantageous coating material since it would enhance catalyzation of the reaction of converting hydrazine ($N_2H_4$) into only hydrogen ($H_2$) and nitrogen ($N_2$). It would also help transform any ammonia ($NH_3$) that might be injected into the tube at the inlet, into hydrogen and nitrogen molecules and thus ensure that this would not occur in the hotter components where some damage to the material could result from the intermediate reaction products (e.g., N or $N^+$) reacting with some component of the material. Useful thicknesses of the coating will be discussed hereinafter.

Some of the advantages of using this injection tube heat exchanger component to duct the propellant (typically hydrazine products) into the inner heat exchanger are as follows:

(i) The outer diameter of the "effective" heat exchanger is now not limited by the present manufacturing size limits of molybdenum-rhenium;

(ii) The weight and cost of this component are much lower than they would be by machining it from bar stock, as compared even to present available bar stock; and (iii) The stresses are comparatively low in the tube, thus resulting in an extension of typical lifetimes. The further feature of coating the inner diameter of the tube will provide additional lifetime in excess of 500 hours.

Several methods may be used to coat the inner diameter of the tube. One method is to vapor-deposit the coating by typical chemical vapor deposition (CVD) techniques. A second method is to vapor-deposit the coating from a wire strung on the axis through the tube. This concept and apparatus are considered to be an integral part of the invention and are described in detail hereinafter.

(c) The power radiated from the heater coil is reflected from the inner shield into the preferentially placed optimum (high absorbent) energy absorber structure. In order to maximize this effect, the heater enclosing radiation shields internal to the cavity are lengthened to extend the full distance of the cavity instead of covering only the first approximately one-third as in prior designs. An energy absorber component is brazed or welded into the nozzle end of the cavity wall in order to maximize the power transfer into this region. Power is transferred to this energy absorber component by direct radiation from the heater coil and by reflection from the inner surface of one of the shields. By making the ratio of the gap length to gap spacing in the energy absorber component high enough, impinging photons will undergo enough multiple reflections in the energy absorber component to be absorbed, thus giving the energy absorber component an effective emissivity of unity. The cross-sectional area of each cylinder of the energy absorber component must be adequate to ensure that the temperature difference between the braze joint and the far edge of each cycle is less than 20° C. with maximum energy flux.

The energy absorber component may be fabricated from any of the following materials: tungsten, tungsten-rhenium, molybdenum, rhenium, or molybdenum-rhenium. It can be fabricated as a series of cylinders brazed to a disc, or as a scroll brazed to a disc.

The combined advantage of the full length shields and the energy absorber component is to have over 50% of the power radiated from the heat coil transferred to the energy absorber component. In this way, the peak temperature of the nozzle inlet end of the heat exchanger can be raised over 200° C. above what it might be without these improvements.

(d) A nozzle inlet area heat exchanger component may also be brazed or welded into the cavity wall face opposite the energy absorber component. This nozzle inlet area component can be fabricated as a spiral, attached at both ends to a housing, or as a series of cylinders with gaps at alternate ends. The cross-sectional area of the metal needs to be large enough to ensure that axial temperature differences between the cavity end and the nozzle inlet area end are less than 20° C. This component can be fabricated from any of the following materials: tungsten, rhenium, tungsten-rhenium, molybdenum or molybdenum-rhenium. The advantage of this component is that it will ensure that the gas temperature is heated to within 20° C. of the peak temperature attained anywhere in the heat exchanger and that this peak heat exchanger temperature is adjacent to the inlet sonic orifice of the nozzle. Over one-half of the electrical power input can be transferred to the propellant on this nozzle heat exchanger component.

(e) In order to obtain the best performance of the radiation shields, wherever possible they are made as disc-cylinder combinations. They may, if desired, be made of 0.001" thick tungsten foil formed and annealed into cylinders and welded to discs that are 0.005" or 0.010" thick tungsten. These shields can then be nested and held together with a means that mimimizes the contact area between successive shields.

The advantage of this method of shield fabrication and support is that the contact-area to shield-area ratio can be kept to values of under $10^{-5}$, making the shield effectiveness close to the theoretical maximum as will be described hereinafter. Where appropriate, these shields can be coated with a low-emissivity metal to enhance their performance. The case and the nozzle exit can be joined together in such a manner as to eliminate propellant leakage or back flow to ensure that the pressure inside of the enclosure which holds the shields is always under $10^{-3}$ Torr at operational conditions. In order to help maintain this internal enclosure pressure low, the enclosure can also be vented at the end where the heater assembly is attached, at a location remote from the nozzle.

(f) In order to additionally concentrate the energy flux into the absorber and nozzle heat exchanger, the heat exchanger components may be replaced by a support tube and a second coiled tube heat exchanger, as will be described in greater detail hereinafter. Since the support tube now only serves to support the structure of the energy absorber component and nozzle heat exchanger component, its cross-sectional area for heat conduction away from these components can be much smaller than that of the components described in (a) above (see FIG. 20). This will permit a further increase in the temperature of these components for a given input power and mass flow rate, thus further increasing the specific impulse. It will also reduce the weight and cost of the thruster.

This tube may also be internally coated with tungsten or rhenium in the same manner as the coiled tube described hereinabove with reference to FIGS. 16 and 20.

With this dual-coiled tube configuration, if the nozzle heat exchanger components, as well as the pressure vessel are made out of rhenium or tungsten-rhenium, operating temperatures can be increased to over 2475° K. (4000° F.). For hydrazine propellant this could allow the mission average specific impulse ($I_{sp}$) to approach 340 seconds as explained by the graph in FIG. 21. In order to get this value of $I_{sp}$, it may also be necessary to increase the number of shields in the cavity and also around the nozzle heat exchanger.

(g) If more of the chemical power of hydrazine decomposition could be retained (and/or used for ammonia dissociation), considerable savings of electrical power would result, especially at the higher thrust levels. For example, at a thrust level of 0.50 lb$_f$ and a flow rate of 5.8 lb$_m$/hr ($I_{sp}$=310 sec), the loss of chemical power could be as high as 230 watts (with a gas temperature of 900° F. at the injection point of fully decomposed hydrazine into the augmenter).

The methods of saving most of this power involve adequately insulating the catalytic bed chamber with radiation shields to reduce the heat loss and provide a longer bed (more propellant dwell time and catalyst contact) to maximize ammonia dissociation. Radiation shielding may be accomplished using ultra-light, low-emissivity disc-cylinder radiation shields; preferably micro-arc welded thereto using, for example, the process and equipment described in U.S. Pat. No. 4,404,456 to Cann. This shielding may also be coated to achieve optimum emissivity properties in manner to be described hereinafter.

As the augmenter design is improved to permit both higher operating power levels and increased propellant flow rate, an additional advantage can be realized. This higher flow rate through the injector into the decomposer will result in a higher level of absorption of energy before boiling. For example, if the flow rate is 7 lb/hr, by heating all of the liquid from 298° K. to 398° K., the liquid would absorb 206 watts. Additionally, at this flow rate, the liquid flow is likely to be turbulent, thus promoting mixing and better cooling capabilities by turbulent heat transfer from the tube to the fluid (see Table 2).

optimum value. This makes it possible to design radiation transfer augmenters, using combinations of the power enhancing features of this disclosure, to operate over a broad range of power levels, even in excess of 20 kw. Removal of these size limitations makes it possible to optimize performance with H$_2$ propellant as compared to the performance available with devices of the prior art. Hydrogen typically requires longer dwell time or higher heat transfer rate to achieve a given temperature increase as compared to a hydrazine augmenter.

(i) As the power input to the augmenter increases, the coil size and weight increases. On a spinning spacecraft, this coil weight will almost certainly lead to unacceptably high sag rates of the coil when it is hot, thus reducing the lifetime below desired values. To overcome this problem, a technique of combining radiative and thermionic heating may be employed. A thermionic emitter element is mounted in the cavity of the heat exchanger with cylinders interleaving those of the thermal absorber. This emitter element is electrically insulated from the heat exchanger and is connected electrically to the negative terminal of the power bus. The heat exchanger is electrically connected to the positive terminal of the power bus and the operational sequence for this heater is as follows:

(1) Power is supplied to the coil by closing a switch.

(2) The power radiated from the coil heats the thermionic element and the heat exchanger.

(3) Once the temperature of the emitter element gets above about 1650° K. (2500° F.), great numbers of electrons are emitted by the thermionic emitting material, such as thoriated tungsten, from which the emitter is fabricated. The electric field between the emitter and the heat exchanger accelerates these electrons toward the heat exchanger where they impact and are absorbed.

TABLE 2

HEAT TRANSFER AND HEAT ABSORPTION PROPERTIES OF LIQUID HYDRAZINE FLOWING THRU THE INJECTION TUBE UPSTREAM OF THE DECOMPOSER

| T °C. | T °F. | $p^{psi}$ | $\mu$ | $c_p$ | K | $\rho$ | Pr | $.5\#$ hr. $(Re)_{min}$ | $1.5\#$ hr. $(Re)_{max}$ | m/sec. $w_L$ | m/sec. $w_L$ | Watts $P_{liq}$ | Watts $P_{liq}$ |
|---|---|---|---|---|---|---|---|---|---|---|---|---|---|
| 0 | 32 | 5.80$^{-2}$ | 1.28$^{-3}$ | 3,650 | .921 | 1,080 | 4.95 | 308 | 925 | 3.60 | 10.8 | −5.6 | −16.8 |
| 50 | 122 | 3.48 | 0.65$^{-3}$ | 3,560 | .850 | 980 | 2.72 | 607 | 1,822 | 3.96 | 11.9 | 5.6 | 16.8 |
| 100 | 212 | 9.28 | 0.40$^{-3}$ | 3,770 | .783 | 925 | 1.93 | 987 | 2,961 | 4.20 | 12.6 | 17.1 | 51.4 |
| 150 | 302 | 40.6 | 0.31$^{-3}$ | 4,390 | .703 | 882 | 1.94 | 1,270 | 3,820 | 4.41 | 13.2 | 30.0 | 90.0 |
| 200 | 392 | 149.0 | 0.24$^{-3}$ | 6,490 | .624 | 818 | 2.50 | 1,650 | 4,930 | 4.75 | 14.3 | 47.1 | 141.0 |
| 250 | 482 | 387.0 | 0.18$^{-3}$ | 10,900 | .544 | 755 | 3.61 | 2,193 | 6,580 | 5.15 | 15.4 | 74.5 | 228.0 |
| 300 | 572 | 890.0 | 0.12$^{-3}$ | 24,300 | .452 | 675 | 6.45 | 3,290 | 9,870 | 5.76 | 17.3 | | |
| 350 | 662 | 1,335.0 | 0.08$^{-3}$ | | .368 | 535 | | 4,930 | 14,800 | 7.26 | 21.8 | | |

This feature makes the utilization of propellant thermal decomposition eminently feasible with minimum problem from NVR build-up due to boiling and/or three-phase flow in the liquid injection tube. In order to ensure good fluid mixing and minimum power input in the injection tube near the outlet, a mixer and shield assembly may be incorporated into the fluid injection system downstream of the valve, and just upstream of the injection point. This incorporation of a thermal decomposer made integral with the augmenter will permit retention of close to 100% of the chemical power in the gas flow.

(h) Using a further configuration, the limitation on power imposed by the maximum presently available material stock diameter of molybdenum-rhenium is removed and the diameter can now be increased to any (4) This electron flow constitutes an electric current which flows across a potential drop equal to that of the power source, such as a battery, delivering energy to the heat exchanger at a rate given by:

$$P = IV \tag{1}$$

where:
P=power;
I=current;
V=potential drop.

Almost all of this energy is deposited in the thermal absorber, adjacent to the nozzle.

(5) This power (P) heats the thermal absorber to temperatures above that of the emitter. Most of this power is transferred to the gas in the heat exchanger near the nozzle. However, some small fraction is radiated back to the emitter, supplying the work function energy to maintain the electron emission and temperature of the emitter, which in turn keeps the electric current flowing.

(6) The gaps between the emitter and the absorber are designed to values which control the level of current at the space-charge-limited level, given by the Child-Langmuir equation:

$$I = A \frac{4\epsilon_o}{9} \left(\frac{2|e|}{m_e}\right)^{\frac{1}{2}} \frac{V^{3/2}}{x^2} \qquad (2)$$

where:
I = current;
A = active emitter area;
$\epsilon_o$ = capacitivity of vacuum;
$|e|$ = charge on the electron;
$m_e$ = mass of the electron;
x = gap;
V = potential drop between the emitter and the heat exchanger.

(7) Once the design current is flowing and the steady-state operational temperature with propellant flowing is established, a switch can be opened, permitting the coil to cool down to the heat exchanger temperature. Since the coil is used essentially as an initiator, being hot for only a few minutes each firing, the coil lifetime can be many thousands of augmenter operational hours before it would fail due to factors of evaporation and/or distortion or sag.

(8) When the firing is to be terminated (after 40–60 minutes), a switch is opened and the propellant flow rate is stopped by closing the valve.

The advantages of this type of heating over pure radiative heating are as follows:

(a) Unlimited power can be transferred by increasing the voltage, , the area of the emitter, , or by decreasing the gap, .

(b) The energy is deposited exactly where it is most useful, near the nozzle throat entrance, thus permitting this final and most thermally isolated section of the heat exchanger to operate at the highest temperature possible and with the highest thermal efficiency.

(c) The structure of the emitter can be very rigid and thus not move or deform appreciably under the "g" loading in a spinning spacecraft.

(d) The cylindrical structure of the emitting and absorbing elements give great rigidity to the surfaces so that electro-thermo-mechanical instability leading to hot-spot development cannot readily occur.

(e) The emission characteristics of thoriated tungsten match exceptionally well to the temperature range to which the heat exchanger (absorber) and propellant gases need to be heated to get specific impulses of 300 to 340 sec. (FIG. 32 is explanatory in this regard). By designing for current densities of under 0.2 amps/cm², the emitter temperature can vary from 1650° to 2200° K. (2500° to 3500° F.) before the current flow becomes "emission" limited, rather than "space charge" limited. With the collector part of the heat exchanger operating 38° to 93° C. (100° to 200° F.) hotter than the emitter, an ideal temperature is produced for operating a high-performance augmenter using hydrazine decomposition products, hydrogen or ammonia, as the propellant gases.

(f) The intermeshed emitter-collector structure disclosed hereinafter with reference to FIGS. 30–31 represents a near-ideal configuration for implementation in a thruster. The large surface area of both components permits low current density operation. This has the following advantages:

(i) A wide operating temperature range at constant power input is available.

(ii) The large active emitting surface area permits gaps of over 0.020 inches between the emitter and the collector with conventional spacecraft voltages of about 40 volts (see FIG. 32). These size gaps can be maintained at an adequately constant spacing, even with significant differential thermal expansion between the components.

(iii) With low current density, the power density to the collector is low ($\simeq$8 watts/cm²). Thermal conduction in the metal can hence overpower any tendency for hot-spot development due to small changes that may occur locally in the gap spacing.

(g) During the lifetime of the spacecraft on which the engine is being used, the average voltage of a typical space vehicle power source during a firing decreases. For most current communication spacecraft this is usually from 41 to 36 volts. Simultaneously, the storage pressure feeding the propellant will decay over life from, typically, 300 psia to 100 psia. Since the power output varies as the voltage to the 5/2 power, thermionic heating will have less change in specific impulse over life than will pure radiation heating, where the power input varies approximately as the 8/5 power of the voltage.

In order to further improve upon the performance of thrusters such as that which is disclosed in the parent application, modifications in the nozzle assembly are desirable and the present invention includes aspects of nozzle design and analysis resulting in improved thruster performance. The objective of the nozzle analysis and design optimization is to determine the nozzle configuration which will deliver the maximum $I_{sp}$ at the specified thrust and to predict the off-design performance over a range of operational parameters likely to be encountered during operations. A further objective is to investigate options for minimizing the back flow contamination of the space vehicle by the exhaust plume, plume interaction with vehicle structure that could be located in the flow path such as solar panel array and plume loss mechanisms in satellite configurations where the exhaust gases must pass through a long large-diameter duct. This last problem area is presently postulated as limiting the usefulness of augmented engines on some spinning spacecraft, the coil "sag" problem in the g-field having been successfully solved recently by the applicant.

Nozzle and engine operating and configuration variables to be considered are:
1. Propellant characteristics
2. Stagnation pressure and throat area
3. Nozzle contour
4. Nozzle exit area
5. Nozzle wall temperature distribution The importance of working for a high thrust coefficient is described in greater detail hereinafter and indications are that at a specific impulse of 310 sec., the stagnation gas temperature can be reduced from 2077° K. (3280° F.) to 1950° K. (3050° F.) if the thrust coefficient is increased from 1.60 to 1.65. Alternatively, the specific impulse could be raised to 320 sec. at a gas temperature of 2077° K. (3280° F.) by increasing the thrust coefficient from 1.60 to 1.65 (see in this regard FIG. 33).

Since the procedures for analytically and experimentally determining the thrust coefficient were generated for high thrust rockets exhausting to an ambient atmosphere, some of the physical processes that can affect the thrust coefficient in low thrust rockets, whose laminar boundary layers may encompass a significant fraction of the flow, exhausting to the vacuum of space, have not been given due consideration. A curious anomaly appears to have occurred in the design of nozzles for rockets used to control space vehicles. Although rocket nozzle designers realize that they operate only in the vacuum of space, the area ratios of most nozzles are designed to give best performance in the steady-state vacuum achievable in the ground test facility where the engine will be tested. No significant attempt has been made in the prior art to utilize the thrust available, through proper design, from the low pressure expansion region. Nozzles also have traditionally been cooled to minimize chemical and physical erosion, to reduce radiative power loss and to minimize nozzle weight by taking advantage of the higher strength of the material at low temperatures. This design approach needs to be reexamined for low thrust rockets that operate only in a space environment. This is especially true for the high performance augmented engines in which new mechanisms occur when the gas consists of a mixture of atoms or molecules of very different molecular weight, such as is found in the decomposition products, hydrogen and nitrogen, of hydrazine at high temperature. These new mechanisms can be identified by the processes of:

thermal diffusion (species diffusion in a temperature gradient)
pressure diffusion (species diffusion in a pressure gradient)
interspecies energy transfer It may be possible to utilize one or all of these effects to enhance the thrust coefficient over what it would be for a lower operating temperature engine or as compared to a propellant of a single species gas of the same temperature and molecular weight.

The phenomena to be considered are:

1. Thermal diffusion tends to separate the species when a temperature gradient exists. For a mixture of hydrogen and nitrogen, the hydrogen is concentrated in the higher temperature regions. The computed and measured thermal diffusion coefficient is plotted as a function of the species number density ratio in FIG. 34. The amount of species separation that could be achieved is plotted in FIG. 35 as a function of the temperature ratio, $T_{hydrogen}/T_{nitrogen}$. If the nozzle were run hot, then the gas in the boundary layer would have a higher percentage of hydrogen than average (i.e., greater than 67%). This reduces the viscosity in the boundary layer as well as the mass flux through the boundary layer, both of which can reduce viscous momentum losses and may increase the thrust coefficient.

2. Pressure diffusion permits the lighter molecular weight component (in this case hydrogen) to have a higher velocity than the nitrogen as the gas expands through the pressure gradient in the nozzle. This effect becomes more pronounced as the static pressure drops below one Torr. This is shown graphically in FIGS. 36 and 37 where the velocity separation achievable with a fixed pressure gradient is plotted as a function of the pressure. In the "core" flow one wants to discourage this from occurring by having the hydrogen molecules accelerate the nitrogen molecules by way of collisions; this leads to the highest values of the thrust coefficient. A design criterion becomes: The stagnation pressure should be as high as possible so that when the two species do "uncouple", at low pressure, the static temperature of the gas is as low as possible.

3. Interspecies Energy Transfer. For a given mass of gas in the chamber, two-thirds of the energy resides in the hydrogen and one-third in the nitrogen. If this gas is now expanded through a perfect nozzle with no pressure diffusion so that the hydrogen and nitrogen molecules form a univelocity beam, one-eighth of the energy is carried by the hydrogen, and seven-eighths is carried by the nitrogen. For this "massive" energy transfer to occur (more than one-half of the energy in the gas), the temperature of the hydrogen, as well as its directed velocity, must be higher than that of the nitrogen through the nozzle. An estimate of the temperature difference needed to keep the two species moving at the same velocity may be determined as a function of pressure. Again, to ensure that this energy transfer takes place, the pressure should be as high as possible. An enhancement mechanism may be available by considering the following model:

(a) Operate the nozzle wall, both upstream and downstream of the throat, above the recovery temperature of the hydrogen.

(b) The high thermal conductivity of the hydrogen may transfer energy into the hydrogen in the core, where collisions with the nitrogen will transfer this added energy to the nitrogen.

(c) This addition to the stagnation enthalpy of the gas in the nozzle will tend to increase the thrust coefficient by a factor that is proportional to the square root of the ratio of the enhanced stagnation temperature over the unenhanced stagnation temperature. As a result of the above considerations, several important design criteria result:

(a) The stagnation pressure in the heat exchanger should be as high as possible.

(b) The nozzle wall temperature should be operated at a temperature equal to or greater than the recovery temperature in the gas. This must be "optimized" by including considerations of radiation power loss from the nozzle. The recovery temperature, $T_r$, is defined as:

$$T_r = \frac{1 + \frac{\gamma - 1}{2} M^2 \sqrt{P_r}}{1 + \frac{\gamma - 1}{2} M^2} T_c \qquad (3)$$

where
$T_r$ = recovery temperature
$T_c$ = stagnation temperature in chamber
$\gamma$ = ratio of specific heats of gas
$M$ = free stream Mach number in flow
$P_r$ = Prandtl number The curvature of the nozzle at the throat, $r_c$, is another important parameter of the nozzle design. It appears prominently in the expression for the discharge coefficients $C_d$ in the following form:

$$C_d = 1 - \left(\frac{r_c}{r^*}\right)^{\frac{1}{4}} \frac{f(\gamma)}{\sqrt{Re^*}} \tag{4}$$

where
$C_d$ = discharge coefficient
$r_c$ = radius of curvature of throat
$r^*$ = throat radius
$f(\gamma)$ = a function of the specific heat ratio, $\gamma \approx 0.97 + 0.86$
$Re^*$ = flow Reynold's number based on throat diameter
$\gamma$ = ratio of specific heats of the gas How the value of the discharge coefficient affects the thrust coefficient is not immediately obvious. This is investigated by developing a novel method of computing the thrust coefficient.

The thrust of a rocket (F), operating in a vacuum, can be computed by two methods:
1. Evaluating the integral:

$$F = \int_0^{r_e} (p + \rho w^2) 2\pi r \, dr \tag{5}$$

$$C_F^* = \frac{1}{p_c A^*} \int_0^{r^*} (p^* + \rho^* w^{*2}) 2\pi r \, dr \tag{6}$$

$$\Delta C_F = \frac{1}{p_c A^*} \int_{r^*}^{r_e} 2\pi R \sin\theta (p_w \sin\theta - \tau_w \cos\theta) dR \tag{7}$$

where $r_e$ = radius at nozzle exit at the nozzle exit, or
(2) Integrating the stress tensor over the axial projection of all interior and exterior surfaces.

The approach adopted here is to compute the thrust that is generated up to the nozzle throat using method 1 above, and then to compute the additional thrust in the expanding section using method 2 above. The two components of the thrust coefficient, $C_F$, are identified as follows:

$$C_F = \frac{F}{p_c A^*} \tag{8}$$

where $$C_F = C_F^* + \Delta C_F$$

and,
F = thrust
p = gas pressure
$\rho$ = gas density
w = gas velocity
r = radial variable
$r_e$ = radius at nozzle exit Since the velocity $w^*$ is purely axial at the throat, cylindrical coordinates are used in computing $C_F^*$.

For invisid gas, accelerated at constant enthalpy and with a conical diverging nozzle, the integrals can be evaluated. The results are:

$$C_F^* = 2 \frac{(2)}{(\gamma - 1)} \frac{1}{\gamma - 1} \frac{1 + \cos\theta}{2} \tag{9}$$

$$\Delta C_F = \frac{1 + \cos\theta}{2} \left(\frac{2}{\gamma + 1}\right)^{\frac{\gamma+1}{2(\gamma-1)}} \left(\frac{\gamma - 1}{2}\right)^{\frac{1}{2}} \left\{ \left[ \frac{\frac{2}{\gamma-1} + \left(\frac{2\gamma M_e^2}{\gamma-1}\right)}{M_e \frac{(M_e^2 + 2)}{(\gamma - 1)}} \right] - 2 \frac{\sqrt{\gamma + 1}}{\gamma - 1} \right\} \tag{10}$$

Further, if $M_e \to \infty$ $$C_F \to \frac{1 + \cos\theta}{2} \gamma \left(\frac{2}{\gamma + 1}\right)^{\frac{\gamma+1}{2(\gamma-1)}} \left(\frac{2}{\gamma - 1}\right)^{\frac{1}{2}} \tag{11}$$

$C_F$ = thrust coefficient for subsonic portion of the nozzle
$\Delta C_F$ = increment to thrust coefficient from supersonic portion of the nozzle
$p_c$ = chamber pressure
$A^*$ = throat flow area
$p^*$ = gas pressure at the throat
$\rho^*$ = gas density at the throat
$w^*$ = gas velocity at the throat
$p_w$ = gas pressure at the wall
$\tau_w$ = shear stress at the gas-wall interface $$\approx \frac{\mu_w W_{f.s.}}{\delta}$$

$\mu_w$ = viscosity of the gas at the wall
$W_{f.s.}$ = free stream velocity of the gas
$\delta$ = momentum thickness of the boundary layer
r = radial coordinate in cylindrical coordinate system
R = radial coordinate in spherical coordinate system
$\theta$ = half angle of the nozzle where
$\theta$ = half angle of the conical nozzle
$M_e$ = Mach number at the exit of the nozzle
$\gamma$ = ratio of specific heats of the gas Note: On the above calculations, the flow at the throat has been made spherically symmetric for convenience.

Equations 9 through 11 represent the results of the classical approach to computing the thrust coefficient.

Assuming that the pressure is independent of the radius at the throat, the viscous effect on $C_F^*$ can be computed. The result is:

$$C_F^* = (1 + \gamma C_D^2) \left(\frac{2}{\gamma + 1}\right)^{\frac{\gamma}{\gamma - 1}} \tag{12}$$

where $C_D$ = discharge coefficient

The expression indicates that the radius of curvature at the throat should be small so that $C_D$ is kept as high as possible. This conclusion may be somewhat modified by the desire to continue heating the gas as it accelerates through the throat.

Some indication of the optimum nozzle shape can be determined by using equation 7. Immediately downstream of the throat there will be a negative increment to $C_F$ since $p_w \sin\theta < \tau_w \cos\theta$. Once the expansion angle is increased to make the expression in brackets positive, the angle $\theta$ must be adjusted throughout the expansion to ensure that:

$$p_w \sin\theta - \tau_w \cos\theta > 0 \qquad (13)$$

Eventually the nozzle half-angle will approach 90°, becoming a disc perpendicular to the axis of the throat. When the disc is extended out sufficiently far radially, such that substantially no collisions are occurring between propellant particles at the periphery thereof, at that circumferential location, a conical end piece may be provided having an angle with respect to the longitudinal axis of the nozzle designed to maximize deflection of propellant particles in the direction parallel with the nozzle axis. Since the disc part and conical end piece of the nozzle can be fabricated from extremely thin sheet material, the conical end piece should extend to the maximum diameter permitted by space vehicle constraints.

The pressure at the wall, $p_w$, is a strong function of $\theta$ and $\tau_w$, a weak function of $\theta$. Both decrease as R is increased. An analysis of the nozzle in accordance with the teachings of the present invention should permit an optimization of the nozzle contour and determine the exit area for the range of operational Reynold's numbers. In order to obtain the most accurate results for the nozzle design downstream of the throat, equation 7 or 35 may be calculated for spaced nozzle wall increments as low as one millimeter or less. Such calculations may be done by computer for greater efficiency and accuracy.

Taking into consideration the test data and the design implications of the mechanisms discussed earlier, nozzle configurations that have analytical interest are sketched in FIGS. 38, 39 and 40. The rationale for each design feature is indicated on the figures.

Some predicted and test data is available for estimating the values of the thrust coefficient for various nozzle shapes and gases (Murch, C. K., Broadwell, J. E., Silver, A. H. and Marcisz, T. J. "Performance Losses in Low-Reynolds-Number Nozzles", J. Spacecraft, Vol. 5, #9; Potter, J. Leith and Carden, William H., "Design of Axisymmetric Contoured Nozzles for Laminar Hypersonic Flow", J. Spacecraft, Vol. 5, #9; and Kinslow, Max and Miller, John T., "Nonequilibrium Expansion of a Diatomic Gas Through a Convergent-Divergent Nozzle", The Physics of Fluids, Vol. 9, #9. The first reference gives throat Reynold's numbers in data for nitrogen and hydrogen flows which are comparable throat Reynold's numbers to those found in "EPAT" and "ACT" in FIG. 41. This data has been examined so that comparisons with the existing test data from the two augmented engines, "EPAT" and "ACT", could be made, and also to determine the feasibility of scaling to higher throat Reynold's numbers. In this comparison a surprising difference in performance between nitrogen and hydrogen is seen, FIG. 41. This may be because of the different rates of freezing the vibrational and perhaps even the rotational energy as the pressure drops during the expansion. Using the definition of nozzle efficiency contained in the first reference, the efficiency values can be converted to thrust coefficients by multiplying the ordinate by 1.7498, the thrust coefficient for a perfect gas expanding through an area ratio of 100 and turned so that the velocity is only in the thrust direction. Scaling curves may be drawn based on the following relation:

$$C_F = C_F(\gamma, A/A^*) \frac{1+\cos\theta}{2} \left( \frac{\sqrt{Re^*}}{\alpha + \sqrt{Re^*}} \right) \qquad (14)$$

where $C_F(\gamma, A/A^*)$ = the functional dependence of the thrust coefficient on the ratio of specific heats, and the area ratio $\theta$ = half angle of conical nozzles $Re^*$ = Reynold's number based on the throat diameter $\alpha$ = a "variable" constant Since most of the data for various area ratios and for the two gases passes through the point $$\eta_n = .90 \ @ \ Re^* = 3000 \qquad (15)$$

$$\alpha = 4.914$$

where $\eta_n$ = nozzle efficiency

Extrapolated performance predictions using this relation are plotted in FIG. 41 out to Reynold's numbers of 20,000 using a value of $\gamma = 1.40$ with data from the first reference also being shown on this plot.

When a higher gas pressure is used it may be possible to recover more of the energy from vibrational and rotational de-excitation. The maximum available thrust coefficient from a gas with a value of $\gamma = 1.31$ has been calculated assuming an area ratio of 100, and that profile losses scale in the same manner as computed previously. This curve is also displayed in FIG. 41. Finally, the best estimates of the thrust coefficients from several thruster implementations are shown in FIG. 41. These implementation are described in FIG. 41 with abbreviations defined as follows:

| | |
|---|---|
| HiPEHT | a TRW electrothermal hydrazine augmented disclosed in U.S. Pat. No. 4,322,946 |
| ACT | a Rocket Research Corporation implementation of a catalytic hydrazine augmenter as disclosed in parent application serial number 517,265 filed July 26, 1983 |
| EPAT | TRW test data from applicant's implementation of the catalytic hydrazine augmenter disclosed in the parent application |
| Lord(a) | resistojet disclosed in a publication by J. A. Donovan, W. T. Lord and P. J. Sherwood entitled "Fabrication and Preliminary Testing of a 3 KW Hydrogen Resistojet" given at the AIAA 9th Electric Propulsion Conference, April 17-19, 1972. |
| Lord(b) | resistojet disclosed in a publication by J. A. Donovan and W. T. Lord entitled "Performance Testing of a 3 KW Hydrogen Resistojet" |
| Yoshida | resistojet disclosed in a publication by R. Y. Yoshida, C. R. Halbach and C. R. Hill entitled "Life Test Summary and High Vaccum Tests |

-continued of 10 MLB Resistojets"

It should be emphasized that the predicted performance, as well as the measured performance from the first reference is based on an area ratio of 100. HiPEHT and ACT have area ratios of 250 to 300, but were tested with ambient pressure of 0.1 to 0.5 Torr. EPAT has an area ratio of 700 and a flat plate nozzle continuation out to a diameter of 2 inches. The test was also conducted with an ambient pressure of $10^{-5}$ to $10^{-2}$ Torr during the test. The large area ratio and the low background pressure in the test chamber accounts for the higher thrust coefficients shown for EPAT.

Further data on the effect of the ambient pressure on thrust has been found in papers (by Lord and Yoshida) presenting results from a 3KW hydrogen resistojet and a 10 MLB resistojet. In two cases, thrust was measured as a function of pressure and the thrust coefficient increased from 1.14 to 1.40 in one case as the pressure was decreased from 20 microns to 2.6 microns (1000 microns = 1 Torr) and in the other case, the thrust coefficient increased from 1.25 to 1.51 as the pressure was decreased from 1000 micron to 1 micron. This and other data from these papers are plotted in FIG. 41 and are identified as data points by Lord and Yoshida.

BRIEF DESCRIPTION OF THE DRAWINGS

FIG. 7 shows a section of a fuel supply passage with a coating or plating formed on an inner surface thereof;

FIG. 8 shows a cross-section of a heater filament with high emissivity coating thereon;

FIG. 9 shows a blown up side view of a portion of a heater filament with high emissivity surface treatment thereon;

FIG. 10 shows a blown up view of a portion of the inner wall of the heat exchanger assembly with high emissivity surface treatment thereon;

FIG. 11 shows a section of the inner wall of the heat exchanger assembly with high emissivity coating thereon;

FIG. 12 shows a further embodiment of a heater assembly which provides radiation as well as emission as disclosed in the parent file;

FIG. 13 shows a further embodiment of the heater assembly providing maximum spacing between the heating coil and the heat exchange wall as disclosed in the parent file;

FIGS. 14 and 15 show schematic views of prior art thruster assemblies;

FIG. 16 shows a first embodiment of a thruster assembly in accordance with the present invention;

FIG. 20 shows a second embodiment of a thruster assembly in accordance with the present invention;

FIG. 21 shows a graph of $I_{sp}$ vs. Temperature °F., indicating typical material life limits due to evaporation in a vacuum;

FIG. 22 shows a graph of surface evaporation rate versus temperature which is used in determining coating thickness or component thickness for high temperature components used in the present invention;

FIGS. 23 and 24 show side and cross-sectional views, respectively, of an apparatus according to the present invention which is used to coat the inner surfaces of a heat transfer tube;

FIG. 25 shows a side view of an apparatus according to the present invention utilized to coat radiation shields;

FIG. 26 shows a cross-sectional view along the line 26—26 of FIG. 25;

FIG. 28 shows a cross-sectional view of a fuel injection apparatus coupled with a pre-heater and/or propellant decomposer in accordance with the present invention;

FIG. 29 shows a cross-sectional view along the line 29—29 of FIG. 28;

FIG. 31 shows an electrical schematic for the embodiment of FIG. 30;

FIG. 32 shows a thermionic emission nomogram for thoriated tungsten and tungsten;

FIG. 38 shows a schematic longitudinal section of a nozzle for continuous heating through M 2;

FIG. 39 shows a schematic longitudinal section of a modified conical nozzle;

FIG. 40 shows a schematic longitudinal section of a modified "bell" nozzle;

FIG. 45 shows a schematic comparison of a prior art nozzle design with a nozzle designed in accordance with the present invention; and FIG. 46 shows an expanded view of a portion of FIG. 16.

Figure 1:
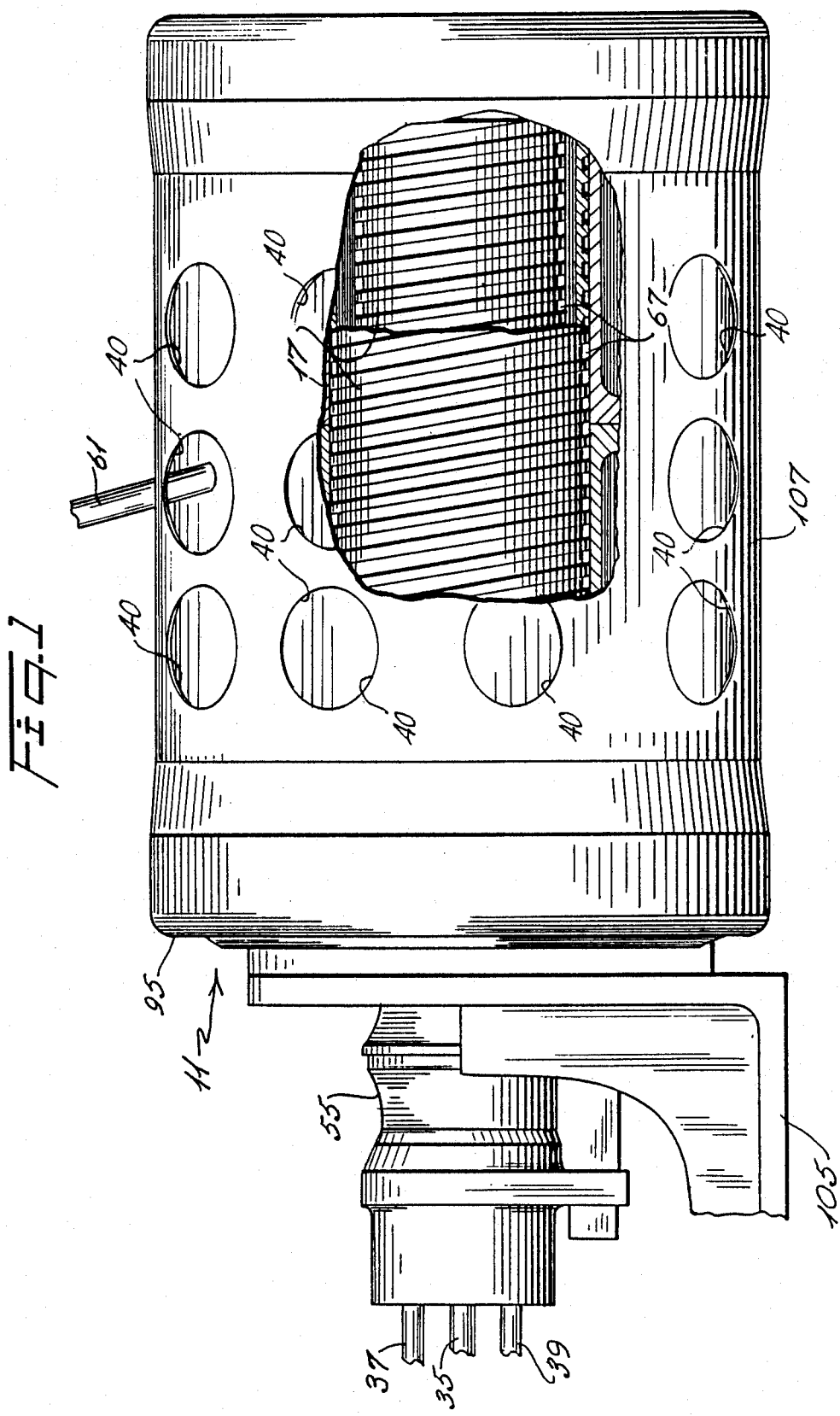
FIG. 1 is a side view of a thruster as disclosed in parent application serial number 517,265.

Before discussing the present invention, the subject of matter of FIGS. 1-13 as disclosed in the patent application will be set forth.

Referring to FIGS. 1-10, a thruster assembly 11, according to the present invention, is comprised of a heater assembly 13 and heat exchanger assembly 15. The heat exchanger 15 contains fuel passages 17 through which propellant is caused to enter. Energy is transferred to the propellant for any or all of the following purposes: to be vaporized, decomposed, reacted and/or heated to a higher temperature. The heat exchanger fuel passages 17 may be coated or plated at 14 as shown in FIG. 7 for the purpose of chemically isolating the fuel passages 17 from the propellant or to enhance decomposition or reaction of the propellant. One example of a material which enhances catalytic decomposition of the propellant hydrazine is platinum. The heated propellant will then pass on its way to a rocket propellant expansion nozzle 19 which includes a nozzle throat 21. The nozzle throat 21 opens into an expansion section 23. The propellant may be any one of, for example, hydrazine, $N_2$, $NH_3$, $H_2$, etc.

Figure 2:
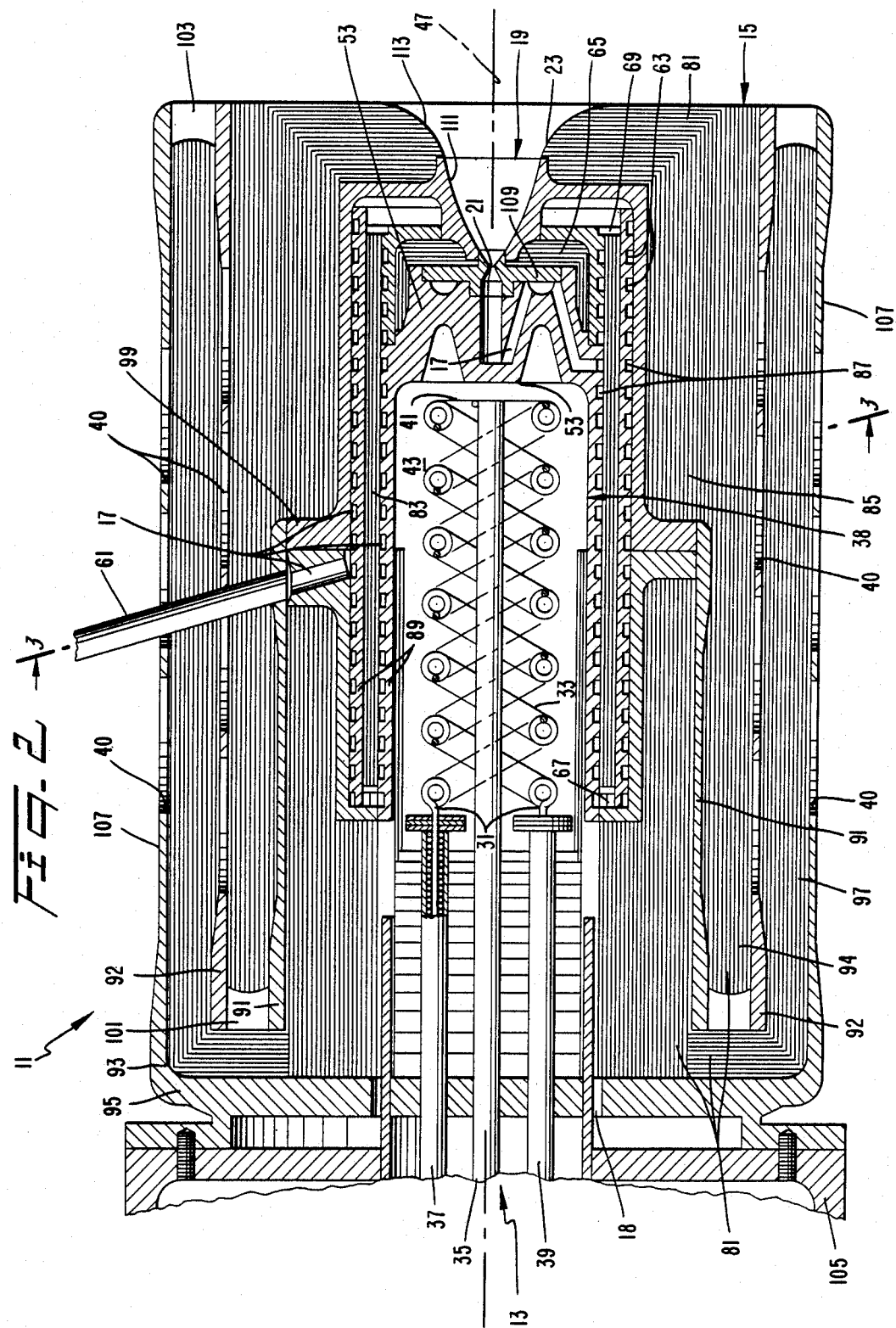
FIG. 2 is a cut-away side view of the thruster of FIG. 1.
Figure 4:
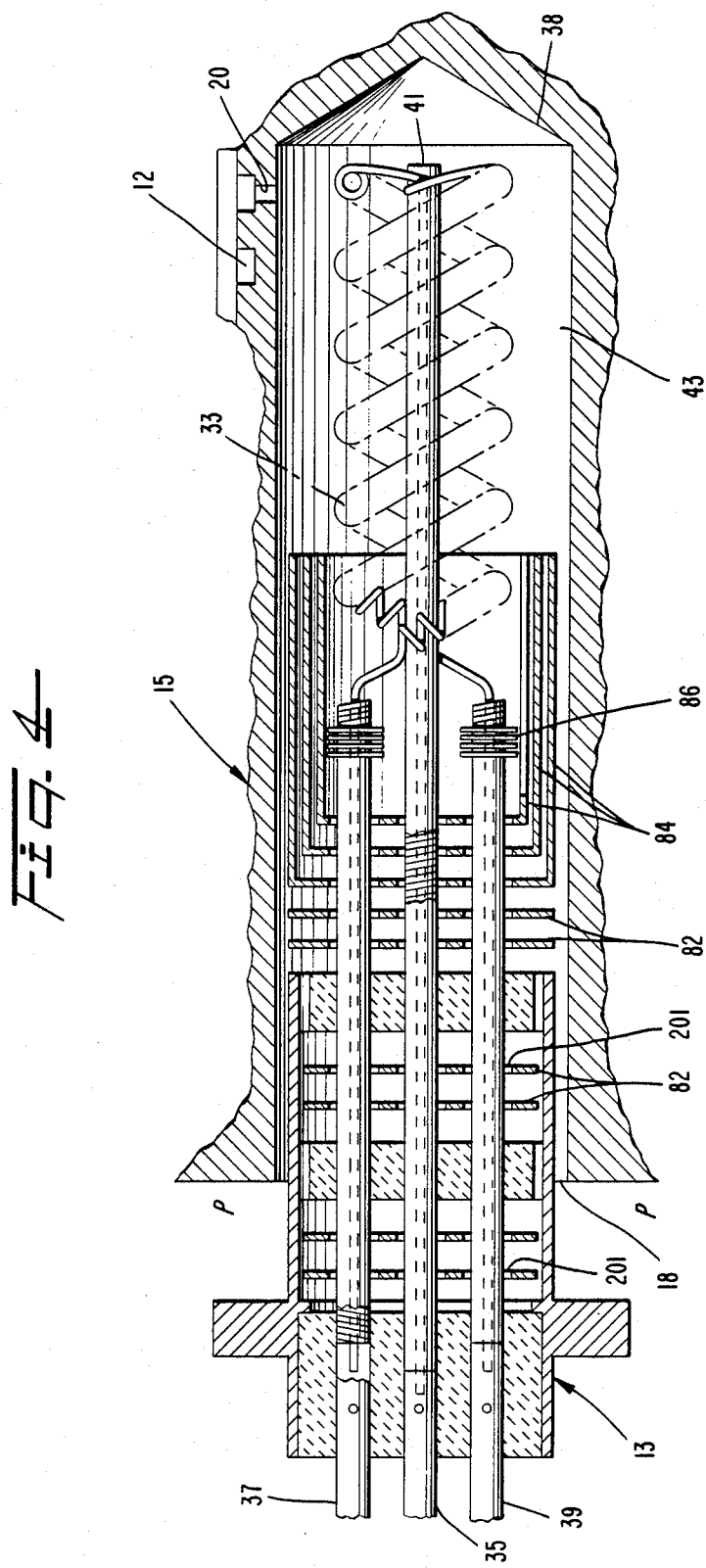
FIG. 4 is a side view of a heater element of FIGS. 1-3 and showing details thereof.
Figure 6:
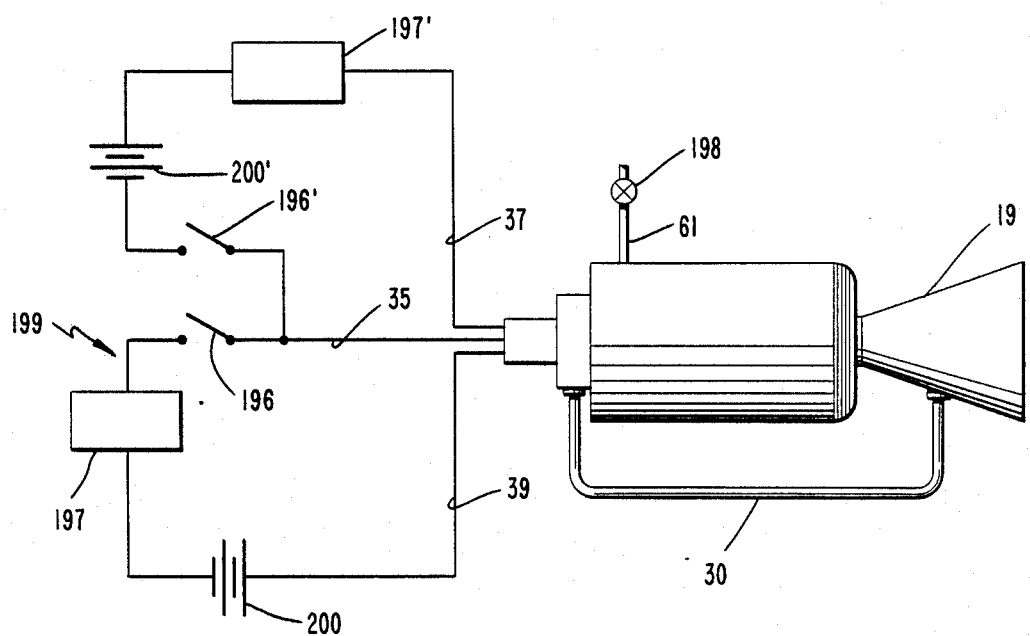
FIG. 6 shows a schematic view of a thruster with power supplies connected thereto usable with all embodiments as disclosed in the parent file.
Figure 17:
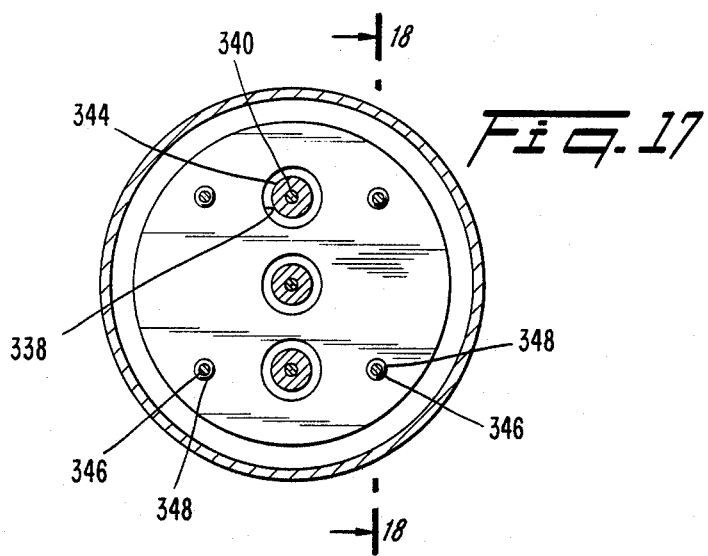
FIG. 17 shows a cross-sectional view along the line 17—17 of FIG. 16.
Figure 18:
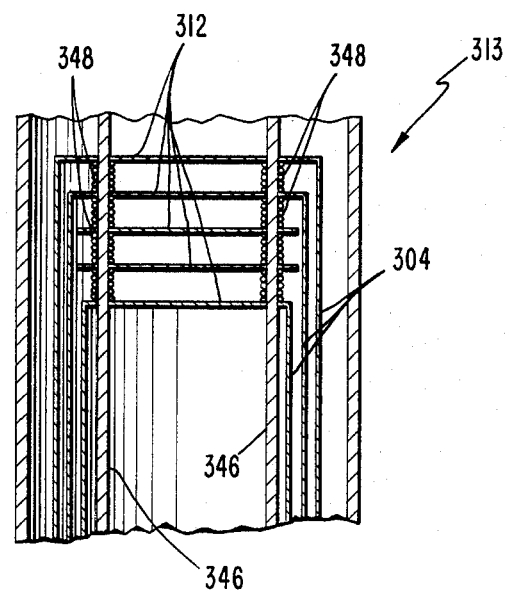
FIG. 18 shows a cross-sectional view along the line 18—18 of FIG. 17.

Referring to FIGS. 2, 4 and 6, the heater assembly 13 comprises a heater element 31 which is formed as a coil 33 surrounding a center conductor and/or supporting post 35. The coil 33 is formed of wire which is first tightly wound into a small diameter helix (about 0.1 inches in diameter) which is then wound into a large diameter helix (of about ½ inch to ¾ inch outside diameter). The coil 33 is connected to an electric power source 200 (FIG. 6) by way of a pair of power conductors 35, 37 and 39. The power conductors 35, 37 and 39 are attached to the heater filament 33 at end 41 of a heating cavity 43 which houses the heater filament 31. The heater assembly is an elongate structure including in this embodiment the coil 33 formed of two segments that are bifilar wound as a double helix. Each lead conductor is made of several sections corresponding with temperature transition from the high temperature radiating heater or emitting cathode to the cold, less than 100° C., connection to a power supply 200. For simplicity, only one section of the lead system is shown in FIGS. 1 and 6. The radiating coil wire 33 forming in the helixes includes a portion that is not coiled that extends in straight line paths away from the coiled portion until it reaches a lower temperature zone at 31 where the temperature is less than 1000° C. This straight wire is a section of the power lead conductor.

The coil 33 is centered along a center axis 47 (FIG. 2) of the thruster 11 from the end 41 of the heater assembly 13 to the lower temperature zone at 31. The center conductor 35 extends along the center axis 47 and is attached to the coil 33 at the end 41 of the coil. When power is provided to the power conductors 37 and 39 the heater filament 31 elevates in temperature and becomes less rigid than it would be with the power switched off. With current passing through the heater element 33, electro-magnetic forces are formed which cause the coil 33 to be biased in such a way as to center about the center post and/or conductor 35.

The bifilar heating filament provides the primary source of heat from the heater assembly 13. In order to enhance the transfer of heat form the coil filament 33, the coil filament 33 can be coated (FIG. 8) or surface processed (FIG. 9) to produce a high-emissivity surface, thereby maximizing the transfer of thermal energy from the coil filament 33 to the heat exchanger cavity wall 38. Additionally, the heat exchanger 11 cavity wall 38 can have a high emissivity coating 25B as shown in FIG. 11 or surface processing as shown in FIG. 10. The use of a high emissivity surface permits a greater transfer of power for any given temperature or, alternatively, reduces the temperature required to obtain a certain amount of power transfer. In operation, for a given amount of current, a faster warm-up time is also obtained by the use of the high emissivity surface. Advantageously, the emissivity with an optimum coating or surface treatment is expected to be 0.85 or greater, with 1.0 being perfect emissivity and 0 being perfect reflectivity. In operation, the heat exchanger cavity wall 38 has a large geometric view as compared to the heater coil 35 or center post 35 and, therefore, intercepts a high percentage of radiation emitted by the heater coil 33.

To reduce the amount of radiant energy that would be lost out of the open end of the heat exchanger 15 (an area defined as the plane P—P of an opening (FIG. 4) in the heat exchanger cavity wall 38), radiation shields 82, 84 and 88 are located to intercept and reflect this energy back into the heater cavity 43, where most of the energy will be intercepted subsequently by the heat exchanger cavity wall 38. This embodiment of the invention illustrates an arrangement of a number of reflective discs, shown in FIG. 4, spaced along the power lead-heater support channel. Each metallic disc 82 has cut-outs 201 to allow passage therethrough without contact by the lead connectors 37 and 39. To reduce radial outflow of radiation, reflecting cylinders 84 are attached to several of the discs 82.

The coil 33 illustrated is configured as a single element with a center tap 41 and support conductor or post 35. This element may be operated either as a single total element with the post 35, in this mode, merely performing a support function, or with the post 35 being connected in common with both filaments 33, or as two distinct heater elements. Additional elements might be also enclosed within the heating cavity 43 for the purpose of providing (1) additional step levels of operating power, (2) a non-harmful ground test circuit, or (3) redundant heating elements for greater reliability and/or extension of operating capability.

The heater assembly 13 and heat exchanger assembly 15 are configured such that they can be fabricated and independently tested as separate entities, and substitute or test heater assemblies may be interchanged with the flight heater assembly 13 (see FIGS. 2 and 4).

The heater assembly 13 may be attached to the heater exchanger assembly 15 so as to maintain an opening gap 18 as shown in FIGS. 2 and 4 which permits pressure within the cavity 43 to reach equilibrium with ambient pressure outside of the thruster 11. Since the thruster 11 is designed to operate under extraterrestrial conditions, the ambient pressure will be quite low. Thus, the pressure inside the cavity 43 will be nearly a vacuum and energy from the element 31 will be transferred to the heat-transfer structure 15 and the nozzle 53 primarily by radiation.

An alternate embodiment (not shown) would provide a complete closing or sealing of the heater cavity opening gap 18 so as to entrap and/or enclose a cavity 43 pressurant such as an inert gas which may be placed in the cavity during assembly or be permitted to bleed into the cavity from a heat exchanger flow passage 12 to the heater cavity 43 bleed 20 (FIG. 4) during engine/heat exchanger operation or be pressurized from the nozzle 19 through a nozzle flow to heater cavity bleed line 30 as shown in FIG. 6.

The heater assembly 13 may also be configured to provide radiant heating and/or thermionic emission energy transfer. An exemplary embodiment 213 illustrative of this emphasis is shown as FIG. 12. Here, the heater coils 233 are shown schematically as simple coils supported by a center post cathode lead connector 235. If desired, the coil 233 could be formed with helixes like those of FIGS. 2 and 4. The heater leads 237 and 239 are similar to those illustrated previously in FIGS. 1, 2 and 4. This heater embodiment allows operation in relatively high force fields, that is, 5 "g"s without detrimental sag. In this illustration the center post cathode lead connector 235 supports a cylinder-disc cathode 236. The cathode 236 is fabricated to conform with the shape of the heat exchanger anode cavity wall 238 and a separation gap 243.

FIG. 6 is a schematic illustration of the inventive propellant flow control valve 198 and power leads 35, 37, 39 and associated power system 199. Also shown are power/voltage converters 197 and 197' if required as well as power switched 196 and 196'. As shown, separate power supplies 200 and 200' may be used for the radiation heater 233 and the thermionic converter 236 (FIG. 12) respectively, as well as for the two parallel coils 33 shown in FIG. 4. The separate power supplies and separate controls therefor enable a large variety of adjustments in heater intensity to be made. If desired, the power supplies 200 and 200' may be operated in a pulsed mode with "on" condition thereof corresponding to opening of valve 198 and "off" condition thereof corresponding to closing of valve 198.

FIG. 12 illustrates an embodiment wherein a relatively large surface area cathode emitter 236 would be used for the primary mode of energy transfer and the radiation heater 233 would be used to heat the cathode 236 and anode 238 to emission temperature conditions. The radiation heater 233 can also be configured to augment or serve as a backup device to transfer energy by radiation to heat exchanger wall 238. In a typical embodiment, the emitter cathode 236 will be adequately supported by a bracket or brackets 241 to maintain separation gap 243 with a supporting distance insulator 242 separating the cathode 236 and the anode 238.

An alternative embodiment to provide maximum spacing between the heating coil 233' and the heat exchanger wall 238' is shown in FIG. 13. This configuration is useful for full operation life of a radiation coil 233' in a gravitational and/or centrifugal force field where all energy transfer is to be accomplished with a radiative heater 233' as contrasted to the embodiment illustrated in FIG. 12 where the principal use of the radiation heater 233 is to preheat an emitter 236 and the emitter performed the principal amount of energy transfer.

Since the transfer of energy from the filament 33 to the heat exchanger assembly 15 is primarily by radiation, the outer surface of the heater filament 33 and the inner surface of the heat exchanger assembly 15 are preferably provided with high emissivity coatings or are surface treated to effect a higher than normal emissivity. Referring to FIG. 8, a cross-section of a heater filament 33 is shown to have a high emissivity coating or plating 250 formed thereon. This coating or plating may be, for example, hafnium carbide. FIG. 11 shows a similar coating or plating 256 on the inner surface of heat exchanger assembly wall 38. Referring now to FIG. 9, a blown up side view of a heater filament 33 is shown to include surface treatment 252 for the purpose of the increasing the surface area there to enhance and increase heat transfer therefrom. This surface treatment may be accomplished through mechanical or thermochemical means. FIG. 10 shows a similar treatment 254 on the inner surface of heat exchanger wall 38. This surface treatment may increase the filament surface area and cavity surface area by at least 20% and possibly by as much as 100% or more.

For the purpose of this disclosure, extraterrestrial conditions mean the conditions normally present where orbital satellites are located. This normally includes the ionosphere and above provided that the satellite is within planetary orbit about the earth. Emissivity, $\epsilon$, is a property of a surface which permits the surface to radiate heat across the surface. It is given a dimensionless value, with a pure reflector having an emissivity of $\epsilon = 0$ and pure black body having an emissivity of $\epsilon = 1$. Typical values of emissivity are:

| | |
|---|---|
| Gold = | 0.05 |
| Molybdenum = | 0.15 |
| Tungsten = | 0.2 |
| Hafnium Carbide (HfC) = | 0.8–0.9 |
| Tungsten Carbide (WC) = | 0.5 |

For the purpose of this patent application, high emissivity means $\epsilon > 0.4$. The high emissivity materials should have an emissivity as high as is practical, considering the thermal stresses to which the material is exposed. Advantageously, the emissivity value of the high emissivity material should be $\epsilon > 0.5$ and preferably $\epsilon > 0.75$. If possible, the emissivity of these materials should have a higher value, such as $\epsilon > 0.85$. In the preferred embodiment, hafnium carbide is used for its high emissivity and ability to withstand high temperatures. However, tungsten may be thermally and chemically treated to modify the surface to increase the nominal $\epsilon$ of 0.2 to 0.5 or higher.

The heat exchanger assembly 15, as mentioned above, contains fuel passages 17 which are provided in layers about the heater cavity 43. Propellant enters the fuel passages 17 either as a gas or as a liquid through a propellant inlet line 61 which directs propellant to an intermediate temperature propellant passageway 63 which connects with an elevated temperature propellant passageway 65. Passage of propellant from the intermediate temperature propellant passageway 63 to the elevated temperature passageway 65 is by way of two propellant flow passageways, to with, fore and aft conduits 67 and 69 located at fore and aft ends of the helixes, respectively. The elevated temperature propellant passageway 65 communicates with a short expansion nozzle structure conduit 71 which, in turn, communicates with a propellant expansion chamber 19. The propellant inlet line 61, the intermediate temperature propellant passageway 63, the elevated temperature propellant passageway 65 and conduits 67-71 are all considered a part of the fuel passages 17. The elevated temperature propellant passageway 65 and the intermediate propellant passageway 63 are each cut as a helix within the heat exchanger assembly 15.

A series of laminations 81 arranged concentrically about the propellant passageways 63, 65 and provide a means to retain as much heat as possible within the heat exchanger assembly 15. The laminations provide a thermal insulting function within the heat exchanger assembly 15. A set of laminations 83 between the intermediate temperature and elevated temperature propellant passageways 63, 65 forms a thermal shield. A second set of laminations located concentrically outside the intermediate temperature propellant passageway 63 and forms a second shield 85. Beyond the second shield 85 are additional laminations 94 and 97.

The helixes defining the intermediate and elevated temperature passageways 63, 65 are formed as thread-like cuts 87 in thermally conductive material which is defined as propellant passageway material 89. There are, or course, no mating threads for the thread-like cuts, as propellant passes through these cuts 87 instead. The thread cut arrangement facilitates fabrication because, prior to assembly, the cuts 87 are on the outside of their respective portions of the propellant passageway material 89. Due to the concentric relationship of the propellant passageways 63, 65, they are able to be assembled by merely nesting concentric layers.

Figure 3:
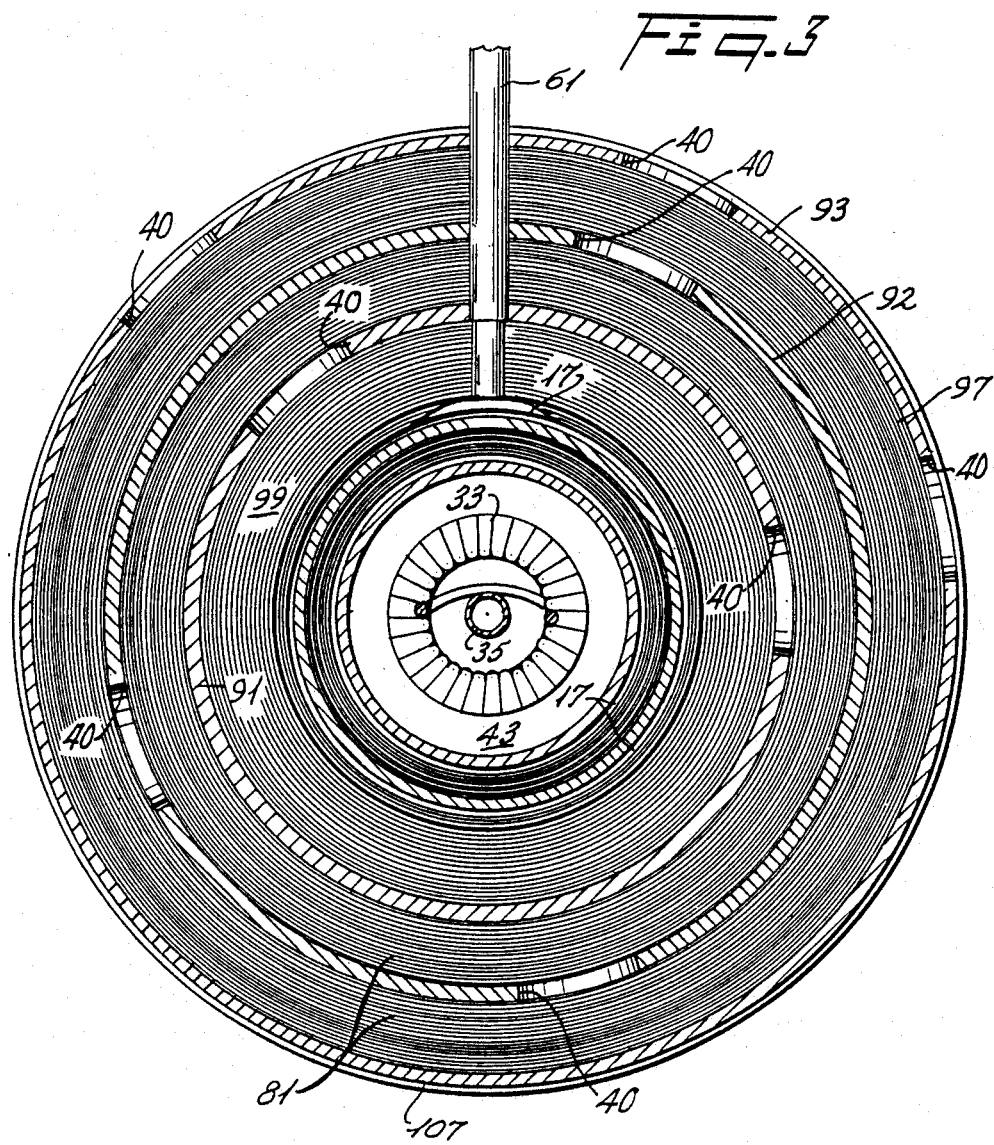
FIG. 3 is a sectional view taken along the line 3—3 of FIG. 2.

As best shown in FIG. 3, the propellant passageway material 89 forming the propellant passageways 63, 65 extends to a first concentric tube 91. A second concentric tube 92 is located concentrically outside of the first concentric tube 91. A third concentric tube 93 is located concentrically outside of the second concentric tube 92. The concentric tubes are separated from each other by laminations 81 which, together with the concentric tubes 91-93, form outer thermal shields. These outer thermal shields comprise the second thermal shield 85 and third thermal shield 94 and an external shield 97.

The third concentric tube 93 is made continuous with a foreplate 95. The third concentric tube 93 and foreplate 95 form an exterior layer of the external shield 97. The exterior surface of the external shield 97 is coated with a low emissivity coating.

A portion of the propellant passageway material 89 extends outwardly the first concentric tube as a first connecting ring portion 99. A second connecting ring portion 101 extends between the first and second concentric tubes 91, 93, at fore ends of the first and second concentric tubes 91, 92. Laminations separate the fore ends of the first and second concentric tubes 91, 92, as well as the second concentric ring portion 101 from the foreplate 95. An exterior connecting ring portion 103 extends between the second concentric tube 92 and the third concentric tube 93 at aft portions of the second and third concentric tubes 92, 93. The connecting ring portions 99-103 and the concentric tubes 91-93, as well as the foreplate 95, form a supporting structure for the propellant passageway material 89 and that part of the thruster 91 located aft of the fore plate 95. The locations of the connecting ring portions 99-103 cooperate with the concentric tubes 91-93 to form a folded configuration for the supporting structure. Thus, direct heat conduction through the supporting structure must take a tortuous path from the propellant passageway material 89 to the foreplate 95. The foreplate 95 is attached to a thruster mount 105 which is a part of the satellite designed to support the thruster. Because of the folded arrangement achieved by the concentric tubes 91-93, as connected by the connecting ring portions 99-103, the foreplate 95 is kept relatively cool, thus presenting a minimum of thermal heat conduction to the satellite via the thruster mount 105.

In order to further reduce the temperatures to which the thruster mount 105 is exposed, the exterior surface of the thruster 11, particularly exterior surface 107 of the third concentric tube 93, is coated or surface conditioned to obtain a high emissivity coating. A preferred high emissivity coating would be hafnium carbide (HfC). The use of the high emissivity coating on exterior surface 107 increases radiation heat loss from the third concentric tube 93, thereby conducting less heat to the thruster mount 105.

The reduction in temperature of the third concentric tube 93 is believed to also affect the infrared radiation by causing emission to occur at longer wavelengths. This not only makes it difficult for an outside observer to determine when the thruster 11 is being heated, but also makes the thruster more difficult to trap using infrared sensors.

By providing the high emissivity coating on exterior surface 107, the operation temperature of the thruster 11 at the propellant passageway material 89 can be increased even though it may be necessary to maintain a low temperature at exterior surface 107. This enables the thruster 11 to operate at high efficiencies because of the use of the high emissivity coating on exterior surface 107. It should be further noted that without the use of the folded arrangement of the concentric tubes 91-93, separated by the laminations 81, it would be necessary to reduce heat loss at the exterior surface and a low emissivity coating on the exterior surface would be less practical. In addition to the thruster mount 105, various controls are attached to the thruster 11. The reduction of temperature accomplished by the use of the high emissivity coating at exterior surface 107 (similar to that shown in FIG. 11) reduces the maximum temperature to which external components of these controls are exposed. Heat conduction through the supporting structure 107, 92 and 91 may be reduced by having material cut-outs 40 as illustrated in FIGS. 1 and 3.

When propellant is being expelled from the expansion nozzle 19 (FIGS. 2 and 5) to produce thrust, high temperatures are created at the nozzle throat 21. To withstand these high temperatures, it is necessary to use high temperature or refractory materials at that location.

Figure 5:
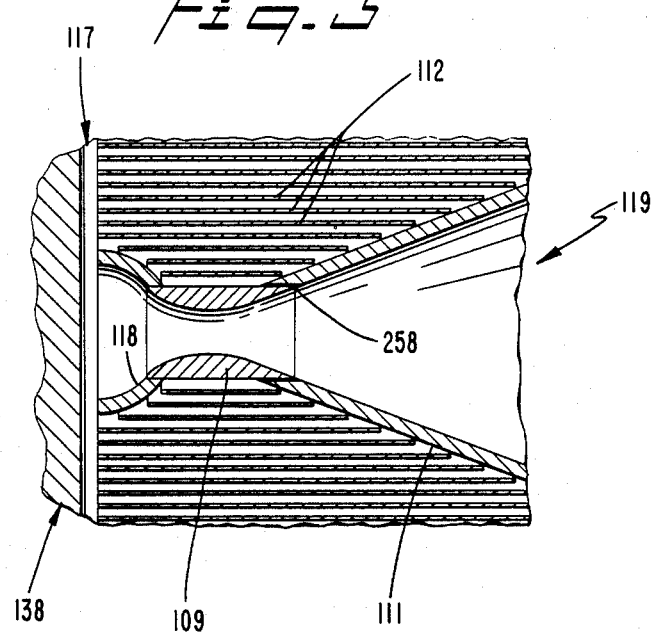
FIG. 5 shows a modification of the expansion nozzle section of the thruster.

An option as shown in FIG. 5 is to use a separate insert 109 for the nozzle throat area 21. The insert extends to connect the heat exchanger flow passage 117 with the expansion nozzle structure 111. By using the separate insert 109, costly materials are only required for the hottest portions of the heat exchanger chamber 15. The expansion section of the nozzle 111 is exposed to a lower temperature. This part of the nozzle can be made as a separate section or shell which covers laminations of external radiation shields 112 which are located in that area. It can be seen that, because of the uncoupled heat-exchange relationship of the insert 109 and the expansion portion 111, the amount of heat loss through the expansion nozzle due to conduction and radiation during the operation of thruster 11 is reduced. In the preferred embodiment, the insert 109 is made of thoriated tungsten. Further, the preferred material for the interior walls of the heat exchanger 138 and the nozzle inlet 118 is molybdenum/rhenium, and the expansion nozzle 111 is preferably made of TZM (a moderate cost molybdenum alloy) or titanium.

By separating insert 109 from the expansion portion 111, a means is provided to reduce radiation losses from the nozzle 119. The insert 109 is not mechanically joined directly to the expansion portion 111 and a blocking effect is accomplished by a thin diaphragm 258 between insert 109 and the expansion portion 111. As shown, the diaphragm 258 is located on the expansion side of the nozzle throat 109 and acts as a "block" to prevent propellant flow from entering the radiation shield area 112 through the gap that would otherwise be present between insert 109 and expansion portion 111. Thus, the diaphragm 258 acts as a layer of metal blocking the gap from flow-through. In the preferred embodiment, this diaphragm 258 will be made of tungsten foil. Therefore, less power is transferred from the hot insert 109 to the expansion portion 111.

It is expected that temperatures at the insert 109 will reach a range of 1700° to 1900° K., whereas temperatures at the intermediate divergent portion 111 will reach a range of 1100° to 1400° K. Without a separation of the nozzle portions 109–113, energy losses would be represented by:

$$P = \sigma \epsilon_n A_n T_N^4 \tag{16}$$

where
 P = power-energy/unit time
 $\sigma$ = (Stefan-Boltzman) constant
 $\epsilon_n$ = integrated emissivity of the nozzle 111
 $A_n$ = effective area of the nozzle 111
 $T_N$ = temperature of the nozzle 111
with the separated structure of the preferred embodiment, energy losses would be represented by:

$$P = \sigma\{\epsilon_i A_i T + \epsilon_n(A_n - A_i)T_p^4\} \tag{17}$$

where
 $\epsilon_i$ = emissivity of the insert 109
 $A_i$ = area of the insert 109
 $T_i$ = temperature of the insert 109
 $T_p$ = temperature of the expansion portion 111.

These equations are approximate models because of such factors as thermal conductivity and direction of thermal radiation. Using a 0.1 pound thrust engine for an illustrative example, the typical power loss values for an integral nozzle without a diaphragm would be:

$A_N = 3.68 \times 10^{-5}$ square meters $T_N = 1900$ degrees K.

$\epsilon_w = .35$ $\theta = 30$ degrees $$\begin{aligned}\epsilon_N &= \frac{1 + \epsilon_w \tan\theta}{1 + \tan\theta} \\ &= \frac{1 + .35 \times .577}{1.577} \\ &= .762\end{aligned}$$

$$\begin{aligned}P &= 5.67 \times 10^{-8} \times .762 \times 3.68 \times 10^{-5} \times 1900^4 \\ &= 20.72 \text{ watts}\end{aligned}$$

For the nozzle with a diaphragm, approximate values would be:

$A_i = .098 \times 10^{-5}$ square meters $T_i = 1900$ degrees K.

$\epsilon_i = .35$ $T_P = 1400$ degrees K.

$$\begin{aligned}P &= 5.67 \times 10^{-8} \times .35 \times .098 \times 10^{-5} \times 1900^4 + .762 \times \\ &\quad 3.58 \times 10^{-5} \times 1400^4 \\ &= 25 + 5.94 \\ &= 6.19 \text{ watts}\end{aligned}$$

These examples indicate that the radiative power loss from the nozzle can be reduced by more than a factor of 3 by using the diaphragm and thermal uncoupling.

To provide for flow modulated operation, the inflow of propellant through inlet 61, FIGS. 1, 2 and 3, can be shut on and off by a flow control valve 198 shown in FIG. 6.

OPERATING PROCEDURES

Prior to operation, a warm-up procedure is normally followed. First, non-stored electrical energy, if available, is applied to the heater filament 33 in order to gradually increase the internal temperature of the thruster 11. Typically, such non-stored energy would be provided by solar cells or by a reactor power supply on the space vehicle and would provide an initial warm-up without taxing the vehicle's battery storage system. If the power available from such a non-stored energy source is fairly low, it may be desired to use the center conductor 35 in combination with one or both of the power conductors 37, 39, thus reducing the optimum operating voltage of the filament 33 in half. Such an initial phase of warm-up may last typically from several minutes to a couple of hours and is not essential to the successful operation of the device. Warm-up may also be accomplished by flowing reacted propellant through the device. A full warm-up procedure is then initiated.

During the full warm-up procedure, current is applied to the coil filament 33, normally through the power conductors 37, 39 in order to bring the temperature of the elevated temperature propellant passageway 65 to a temperature at which the thruster 11 is ready for thrusting operations. When the temperature of the elevated temperature propellant passageway 65 is elevated in such a manner, the intermediate temperature propellant passageway also warms, with temperature gradually decreasing toward the third concentric tube 93. The coil filament 33 may be off-modulated when the overall temperature of the heater assemblies 13 is at a maximum limit or when the temperature at the elevated temperature propellant passageway 65 and the expansion nozzle 19 is sufficiently high for operation. Obviously, a number of control programs can be designed in accordance with reduced energy consumption and a necessary degree of readiness. At this time, the high emissivity coating on the exterior surface 107 and the folded structure of the concentric tubes 91-93 causes the exterior surface 107 to remain at a fairly low temperature. The low temperature operation, as stated above, prevents excess thermal conditions from occurrence at the thruster mount 105 and reduces the possibility that a warm-up of the thruster 11 can be readily detected.

Typically this stage of the warm-up takes between a couple of minutes and a half hour. In the event of a lower power supply or when conditions otherwise require reduction of electrical consumption, a longer warm-up is employed.

When the temperature occurring at the elevated temperature propellant passageway 65 and at the expansion nozzle 19 is sufficiently high, the thruster 11 is throttled on by causing propellant to enter the propellant inlet line 61. This causes the fuel passages 17 to cool, thus requiring additional heat from the heater assembly 13. The thruster 11 has a heat-sinking capability which permits the heater to be controlled by off-modulation, rather than by partial attenuation of current. This not only enables the heater coil filament 33 to operate at maximum efficiency, but also increases the efficiency of DC electrical power supply in that voltage-changing devices or resistor banks are not required for attenuation. The heater coil filament 33 is thus switched "on" and "off" by switch 196 in order to provide a desired minimum temperature for the propellant without greatly exceeding that temperature, in order to provide optimum and safe operation.

When the cooling effect of the propellant is greater than the heat able to be produced by both the exchange of heat from the expansion nozzle 19 and the heat produced by the heater assembly 13, it is possible to off-modulate the propellant supply. The heater assembly 13 can then provide enough heat to heat the propellant passageway material 89 and the expansion nozzle 19 until the propellant can be caused to flow at an optimum rate. The ability of the thruster 11 to operate in such an intermittent manner enables an increased efficiency of operation, thereby reducing the requirement for electrical power consumption and conserving propellant fuel.

An additional advantage of (1) the ability to off-modulate the heater assembly 13 and (2) the ability to operate the heater assembly 13 in a way which brings the internal temperatures of the thruster to proper levels without propellant passing through the fuel passageways 17, is the fact that the propellant can be selectively throttled, with the thruster being constantly ready for thrusting operations. This gives the engineers controlling the thruster a great deal of flexibility in the operation of the satellite and permits them to rapidly change the position of the satellite as circumstances require.

Referring now to FIGS. 16-20, several aspects of the present invention will be discussed. Firstly, note the first opening 298 and second opening 299. The heater assembly 311 is mounted into the first opening 298 and the nozzle 321 opens to the second opening 299. As discussed hereinabove with regard to FIG. 2, reference number 89 refers to a pair of concentric members defined as propellant passageway materials, each of which has cut therein thread-like cuts 87 which define passageways for the propellant which are connected to one another via conduits 67. With reference back to FIG. 16, it is seen that the optimized performance augmenter 300 includes propellant passageway material 389 having cut therein screw thread-like passageway means 387. Between the threads of the thread-like passageway means 387, a plurality of lands are formed which are designated by reference number 388. These lands 388 define the interface between the passageway material 389 and outside wall 317 at the inner pass heat exchanger assembly 313. The inner pass heat exchange assembly 313 includes an interface surface 316 which faces and engages the lands 388 of the propellant passageway material 389. In one aspect of the present invention, the surface 316 of the inner pass heat exchanger assembly 313 is brazed directly to the lands 388 of the propellant passageway material 389 of the inside wall of the inner pass heat exchanger component which also serves as the enclosing cavity of the heater assembly 311. As discussed hereinabove, the braze material could be a material such as, for example, vanadium, molybdenum or iridium. Several methods are available for use in brazing the inner pass wall 388 of heat exchanger assembly 313 to the outside wall 316 of the inner pass heat exchanger assembly 313 via the lands 388 and the surface 316. One such method may comprise vapor deposition on the inner diameter surface 316 of the outside wall of the heat exchanger assembly 313 as well as on the lands 388 of the inside wall 389 of the inner heat exchanger assembly 313. A further method of brazing may comprise putting the braze material in position by layering between the parts of thin foil of the base material. Another method would be to locate grooves or channels 351 in the lands 388 of the inner pass heat exchanger 313 and placement of the braze material 353 in this channel 351 as seen in FIG. 46. After this is completed, the braze may be accomplished by any one of several methods including (1) heating the whole structure in a vacuum furnace, (2) placing a heater assembly in the heat exchange cavity defined between the inner wall 389 and outer wall 317 of the inner pass heat exchanger assembly 313 and heating in a vacuum environment preferably ion-pumped to under $10^{-4}$ Torr. This technique is preferred since the inner component 389 will thereby become somewhat hotter than the outer component 317 and the extra thermal expansion of the inner component 389 caused by this extra heating will close any gaps which may exist between the components over the surface which is to be brazed.

As described hereinabove, affecting this braze reduces the tension load on the outer component 317 and the compression load on the inner component 389 to negligible value so that the wall thickness and thereby the weight thereof may be substantially reduced. Also, the problem of creep and rupture of these components is almost completely eliminated since each flow passage is now equivalent to a tube and all of the metal becomes structurally involved in the assembly. This improvement alone will permit lower specific weight for the heat exchanger, while simultaneously extending the life thereof to over 500 hours of use.

With reference back to FIG. 2, as discussed hereinabove, there are two concentric structures of propellant passageway material 89. As shown in FIG. 16, the outermost propellant passageway material 89 from FIG. 2 is now designated as the outer pass heat exchanger 315 and now takes the form of a continuous coiled tube 391 which extends from the propellant inlet tube 361 to an exit point 392 which opens into a intermediate passageway 367 which is equivalent to the connecting passageway 67 of FIG. 2. The intermediate connecting passageway 367 communicates the coiled tube 391 with the spiral passageway 387 within the propellant passageway material 389 to thereby allow a continuous flow of propellant therethrough. If desired, the coiled tube 391 may be made of molybdenum-rhenium, rhenium alone, or other high-temperature materials. As described hereinabove, for better performance the coiled tube 391 may also have an inside coating of iridium, tungsten or rhenium. Iridium is an advantageous coating material since it would enhance catalyzation of the reaction of converting hydrazine into separate hydrogen and nitrogen. Such a coating would also help transform any ammonia (an intermediate decomposition product of hydrazine) that might be injected into the tube 391 at the inlet thereof into hydrogen and nitrogen molecules, to thus ensure that such ammonia would not reach the inner spiral passageway 387, which is much hotter than the coiled tube 391 where some damage to the material could result from intermediate reaction products such as N or N+ reacting with some component of the material. As shown in FIG. 22, useful thicknesses for this inner coating may easily be determined.

Applicant has discovered through research that when propellant is flowing in a laminar manner, greater heat exchange results through a coiled tube than through a linear tube. Programs have been developed by applicant which compute the distribution of temperature and of heat flux rate through all components of a heat exchanger. These calculations must be iterated with calculations for the gas properties at each point in the heat exchanger.

The expression used to describe the heating is:

$$\frac{dh_o}{h_o} = \frac{P_c \, Nu \, K}{d_{equ} m h_o} (T_w - T_r) dl \tag{18}$$

where
- $h_o$ = stagnation enthalpy of gas
- $d_{equ}$ = equivalent or hydraulic diameter
- = $4A_c/P_c$
- $A_c$ = cross-sectional
- $P_c$ = perimeter of wetter surface
- Nu = Nusselt number
- K = thermal conductivity of the gas
- m = mass flow rate flowing through the channel
- $T_w$ = temperature of the wall
- $T_r$ = recovery temperature in the gas with $$T_r = \left(1 + \frac{\gamma - 1}{2} M^2 \sqrt{Pr}\right) T_g \tag{19}$$

Figure 43:
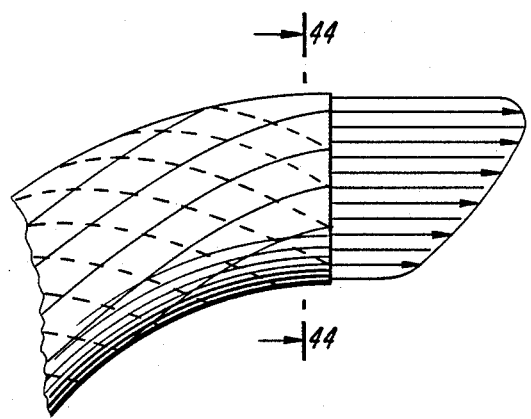
FIG. 43 shows a curved pipe with lines and arrows schematically depicting flow therethrough.
Figure 44:
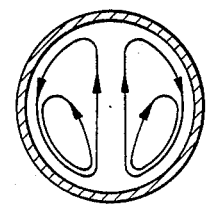
FIG. 44 shows a cross-sectional view along the line 44—44 of FIG. 43 with arrows depicting flow lines schematically.

- $T_g$ = local static temperature of the gas
- M = gas Mach number
- Pr = Prandtl number
- dl = element of length along the flow channel Once values for the Nusselt number are established, the integration can precede. Standard texts on heat transfer give the Nusselt number for straight pipes and ducts. However, as will be seen later, the effect of curvature on the skin friction is very pronounced. By Reynold's analogy, a similar effect can be expected with the heat transfer. Hence, the same curvature corrections to the friction factor will be used to correct the Nusselt number. These corrections are significant in the helical passages proposed (over a factor of 2). Helical, rather than straight flow passages can hence increase the heat transfer rate to the gas very significantly, all other factors being equal. This enhanced heat transfer rate and friction factor occurs because a secondary flow is induced in the gas, as shown in FIGS. 43 and 44. This secondary flow will also mix the gas, giving a much more uniform enthalpy to the flow at any given cross-section. The enhancing effect of curvature also permits the flow to stay laminar to higher Reynold's numbers, while at the same time giving higher heat flux rates and skin friction coefficients than would be obtained from turbulent flow at these Reynold's numbers.

Using these expressions and the procedure outlined hereinbelow, reasonable agreement has been obtained between the calculated and measured pressure drops in applicant's heat exchanger designs.

The influence of curvature is stronger in laminar than in turbulent flow. The characteristic dimensionless variable, which determines the influence of curvature in the laminar case, is the Dean number D:

$$D = \tfrac{1}{2} Re \sqrt{R/r} = \frac{uR}{\nu} \sqrt{\frac{R}{r}} \tag{20}$$

where
- R = radius of the cross-section
- r = radius of curvature
- u = flow velocity
- $\nu$ = kinematic viscosity
- Re = Reynold's number of the flow The measurements carried out by M. Adler for the values: r/R = 50, 100, and 200, demonstrated the existence of a large increase in the resistance to flow caused by the curvature for $Re\sqrt{R/r} > 10\tfrac{1}{2}$. According to his calculations the resistance coefficient, $\lambda$, for laminar flow in a curved pipe is given by $$\frac{\lambda}{\lambda_0} = 0.1064 \left[ Re \sqrt{\frac{R}{r}} \right]^{\tfrac{1}{2}} \tag{21}$$

where
- Re = Reynold's number of flow and
- where $\lambda_0$ denotes the coefficient of resistance of a straight pipe. Measurements indicate, however, that the above equation only has asymptotic validity, and may be used for values of the parameter $\sqrt{R/r}$ exceeding about $10^{2.8}$. The results of measurements are approximated with a higher degree of precision by the following empirical equation, first given by L. Prandtl.

$$\frac{\lambda}{\lambda_0} = 0.37 \, D^{0.36} \tag{22}$$

This equation gives good agreement with experimental results in the range $$10^{1.6} < Re(R/r)^{\tfrac{1}{2}} < 10^{3.0} \tag{23}$$

C. M. White has found that the resistance coefficient for turbulent flow in a curved pipe can be represented by the equation $$\frac{\lambda}{\lambda_0} = 1 + 0.075 Re^{\tfrac{1}{4}} \frac{(R)^{\tfrac{1}{2}}}{(r)} \tag{24}$$

Further, $$\lambda \left(\frac{r}{R}\right)^{\frac{1}{2}} = 0.029 + 0.304 \left[R\left(\frac{R}{r}\right)^2\right]^{-0.25}$$

$300 > R (R/r)^2 > 0.034$ $$\frac{\lambda}{\lambda_0} = \left[R\left(\frac{R}{r}\right)^2\right]^{0.05} \quad R (R/r)^2 > 6 \tag{25}$$

These differ somewhat from, but are in general agreement with C. M. White's equation above.

On the basis of calculations and data evaluation to date, a number of further design criteria can be defined:

(i) The flow channels should be designed so that the Mach number increases monotonically from the injection point up to the nozzle outlet.

(ii) The flow passages should be as large as possible throughout the heat exchanger to ensure the maximum possible pressure at the throat.

Figure 48:
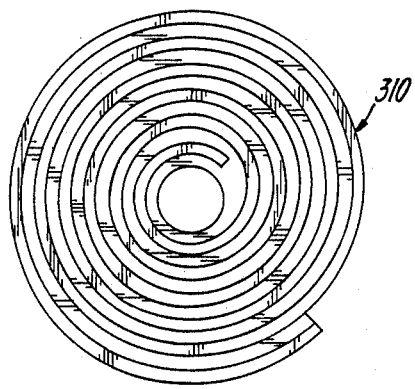
FIG. 48 shows an end view of the nozzle heat exchanger shown in FIG. 16.
Figure 49:
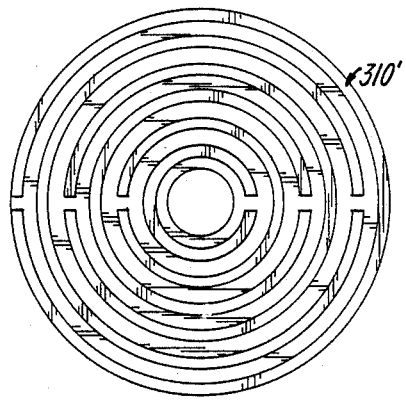
FIG. 49 shows an end view of an alternative nozzle heat exchanger construction.

A comparison of FIGS. 2 and 16 reveals that the invention illustrated in FIG. 16 includes further structure not contemplated by the invention shown in FIG. 2. In particular, the terminus of the inner heat exchanger assembly 313 shown in FIG. 16 includes the provision of an energy absorber structure 309 and a pre-nozzle entrance heat exchanger 310. The heat exchanger 310 may, if desired, be brazed into the wall 302 on a side thereof opposite to the side to which the energy absorber component 309 is brazed. The nozzle heat exchanger 310 may be fabricated either as a spiral brazed at both ends to a housing, FIG. 48, or as a series of cylinders with gaps at alternative ends, FIG. 49. It may be fabricated from tungsten, rhenium, tungsten-rhenium, molybdenum or molybdenum-rhenium. There are also a trio of radiation shields 306, 307 and 308 which are located within the heat exchange cavity 303 extending the entire length of the cavity with the open ends facing the energy absorber structure 309. Each of the radiation shields 306, 307 and 308 is comprised of a disc 312 extending transverse to the longitudinal axis of the heating coil 305 and some radiation shields have the further provision of a cylindrical member 304 extending along this longitudinal axis. In FIG. 16, only the cylindrical member 304 associated with the disc 312 of the shield 306 is shown, however it may be seen from FIG. 20 that these cylindrical components may extend the full distance of the heat exchange cavity 303 or 303'.

Each metallic disc 312 has cut-outs 338 to allow passage therethrough without contact by the lead connectors 340, 342, 344. These discs 312 are supported in the structure by a plurality of rods 346 (FIGS. 17 and 18) anchored in insulator segment discs similar to those illustrated in FIGS. 4, 12 and 13. Short tungsten springs 348 are mounted over the four support rods 346 and placed between the discs 312. These springs accurately position the discs axially and permit thermal expansion without inducing excessive stresses in any component. In order to accurately position the discs axially a predetermined compression is induced in all springs during assembly. The length of these springs can vary along the channel in which the discs are mounted in order to improve the efficiency of the radiation shielding. To reduce radial outflow of radiation, the reflecting cylinders 304 are attached to several of the discs 312. A plurality of smaller discs similar to the discs 86 in FIG. 4 are included on the lead connector to block radiation leakage through the cut-outs 338 in the larger radiation discs 40 wherein the gap is provided for noncontact passage of the lead connectors 340, 342 and 344. This embodiment of radiation shields permits a radiation transfer efficiency to the energy absorber component 309 of 90 to 95 percent.

Similar structure to the disc-cylinder shielding structure described hereinabove may be used in the thruster housing between the opening for the heating element and the outer skin to reduce power losses. As shown in FIGS. 1-3, holes 40 are formed in the outer skin and inner support structure so as to expose the housing interior to the vacuum of outer space. Referring to FIG. 16, it is seen that the thruster 300 has a wall 350 structurally connecting the nozzle 321 with the outer walls of the housing. It is important to keep the wall 350 free of holes 40 so as to prevent flow of propellant leaving the nozzle 321 from entering into the housing.

Figure 19:
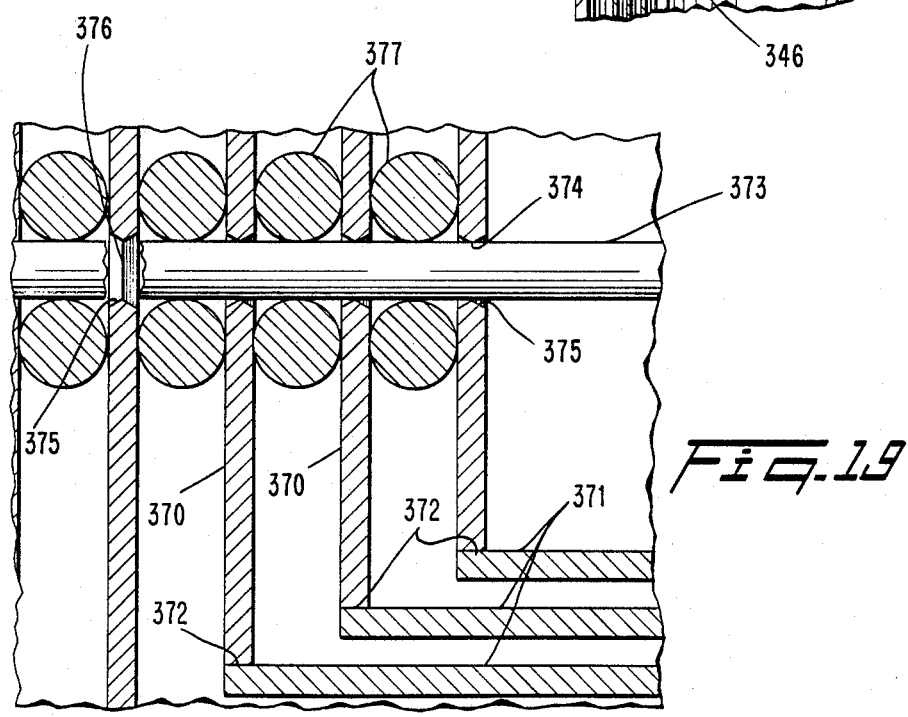
FIG. 19 shows an enlarged view of portion of FIG. 16.
Figure 27:
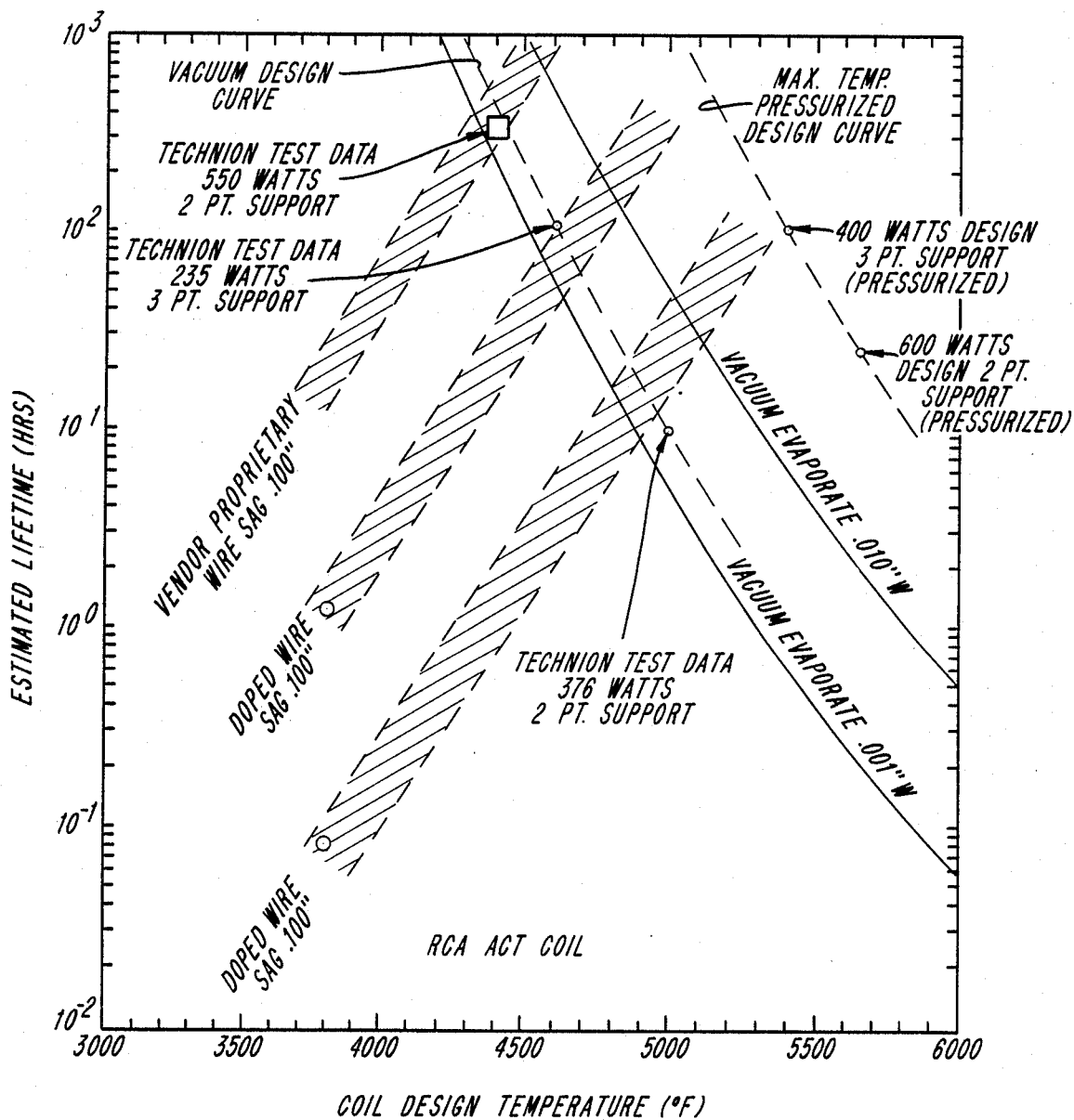
FIG. 27 shows a graph of estimated coil lifetime versus temperature for various materials and environments.

FIG. 19 shows an expanded view of a portion of FIG. 16 explaining the manner of installation of space optimized radiation shielding in the housing. As shown in FIG. 16, the shielding consists of a plurality of discs 370 having respective cylinders 371 preferably micro-arc welded thereto at 372 much in the manner disclosed in U.S. Pat. No. 4,404,956 to applicant herein. As better seen in FIG. 19 rods 373 are assembled through holes 374 formed in the discs 370, which holes are comprised of opposed annular beveled surface 375 to thereby define a circular line 376 which contacts the rod 373 so as to minimize the surface area of contact therebetween. In order to separate the discs 370 between respective disc pairs are inserted wire rings 377 which contact each of the adjacent discs 370 as well as the rod 373 in a circular line contact only which minimizes the surface area of contact therebetween.

Applicant has discovered through research that the smaller the ratio of surface area of contact between shields to surface area shields, the smaller the power loss through the shields. Similarly, as the pressure of the atmosphere in which the shields are mounted is reduced, reduction in power loss is evidenced. These discoveries are demonstrated in Table 1A as set forth hereinabove. For example, referring to Table 1A, it is seen that with 16 shields being used at pressure of $10^{-2}$ Torr, as this ratio is reduced from $10^{-3}$ to $10^{-7}$, the power loss is reduced from 184.06 watts to 73.71 watts. Further, with reference to Table 1A, at a constant ratio of $10^{-5}$, as the pressure is reduced from 10 Torr to $10^{-5}$ Torr, the power loss is reduced from 266.16 watts to 76.05 watts.

Figure 50:
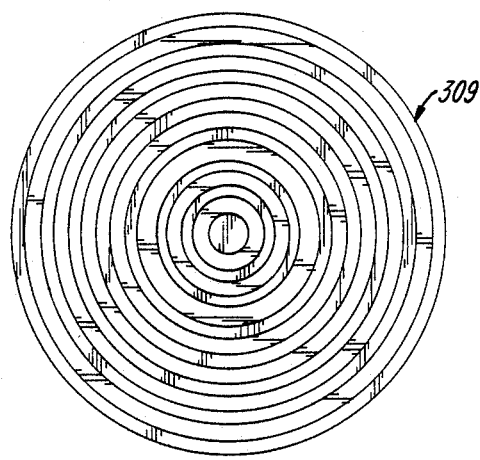
FIG. 50 shows an end view of the energy absorber component shown in FIG. 16.
Figure 51:
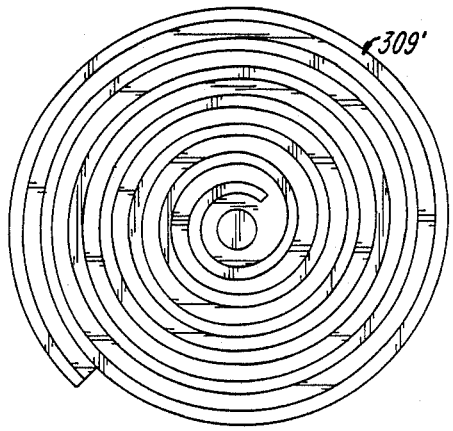
FIG. 51 shows an end view of an alternative energy absorber component construction.

The energy absorber component 309 is brazed into the nozzle end of the cavity wall 302 so as to maximize power transfer from the coil 305 to the fuel which has made its way to the pre-nozzle entrance heat exchanger component 310. Power is transferred to the energy absorber component 309 from two sources, firstly directly through radiation from the coil 305, and secondly by reflection from the inner surface of the shield 306. As described hereinabove, by making the ratio of the gap length to gap spacing in the energy absorber component 309 high enough, photons impinging therein will undergo enough multiple reflections so as to be absorbed thereby, thus giving the energy absorber component 309 an effective emissivity of substantially unity. If desired, the energy absorber component 309 may be fabricated from any one of tungsten, tungsten-rhenium, molybdenum, rhenium, or molybdenum-rhenium. If desired, it may be fabricated as a series of cylinders brazed to a disc, FIG. 50, or as a scroll brazed to the disc, FIG. 51. By utilizing the full length cylindrical members exemplified by the cylindrical member 304 in conjunction with discs so as to comprise the radiation shields 306, 307 and 308 in conjunction with the energy absorber component 309, a great increase in the power radiated from the coil 305 which is transferred to the energy absorber component 309 is realized, thus enabling the peak temperature of the nozzle end of the heat exchange to be raised 200° C. above what it might be able to be raised to without these improvements.

Referring again to FIG. 2, it is seen that the propellant supply passages 87 extend in two concentric rows of thread-like passages. As discussed hereinabove with reference to FIG. 16, the outer passages 87 may be replaced with a continuous coiled tube 391 and modifications to the inner passages may be made, including brazing operations, to reduce tension loads on the outer component 317 and for other purposes specifically set forth hereinabove.

Further improvement may be made in the FIG. 2 thruster by completely replacing the inner threads 87 thereof with a coiled tube like the tube 391 of FIG. 16. In this light, reference is made to FIG. 20 which shows a thruster 300' wherein the inner thread-like passageway 87 of FIG. 2 has been replaced with an inner coiled tube 322 to convey propellant from outer tube 391 to the nozzle heat exchanger component 310. As may be seen from a comparison of FIGS. 16 and 20, the support tube 320 of the FIG. 20 does not include the thread structure of the corresponding component of FIG. 16, designated by reference number 313, and further the support tube 320 with its cavity wall 302' is only required to (1) isolate the heater assembly 311 from propellant supply, (2) support the energy absorber component 309 and (3) support the nozzle heat exchanger 310. Accordingly, the tube 320 may be made much thinner than the tube 313 of FIG. 16, which results in: (1) saving in weight, and (2) higher levels of heat transfer from the heater assembly 311 to the propellant. As discussed hereinabove with regard to the tube 391, the tube 322 may similarly be internally coated with tungsten or rhenium.

With the dual-coiled tube 322, 391 configuration shown in FIG. 20, if the nozzle heat exchanger 310 and the pressure vessel are made of rhenium or tungsten-rhenium, operating temperatures may be increased to over 4000° F., and with hydrazine as a propellant this could allow the mission average specific impulse ($I_{sp}$) to approach 340 seconds as shown in the FIG. 21 graph. For hydrogen as a propellant, this operating temperature would result in an average specific ($I_{sp}$) approaching 850 seconds.

As stated hereinabove, the inside surfaces of the coiled tubes 322 and 391 may advantageously be coated with iridium, tungsten or rhenium. Iridium is an advantageous coating material for use with hydrazine since it would enhance catalyzation of the reaction of converting hydrazine ($N_2H_4$) into only hydrogen ($H_2$) and nitrogen ($N_2$). Referring now to FIGS. 23 and 25, applicant has devised a device for coating the inside surfaces of a tube T before it is coiled to form tubes 322 and 391. As shown in FIG. 23, the coating apparatus 400 includes a top plate 401 and a bottom plate 403 which close openings formed in a high temperature glass tube 405 to form an enclosed chamber 407. An opening 409 is formed in the bottom plate 403 and a conduit 411 connects this opening 409 with a vacuum pump 412 which is designed to maintain the chamber 407 at a pressure of $10^{-4}$ Torr or below.

Rigidly mounted to the bottom plate 403 is a bracket assembly 413 which includes an upstanding rod-like support 415. Extending outwardly from the support 415 are an upper arm 417 and a lower arm 419. The upper arm 417 has attached thereto at its extreme end a bracket 418, while the lower arm 419 has similarly attached thereto a bracket 420.

Referring now to FIG. 24, it is seen that the bracket 420 has attached thereto a tube supporting member 427. The bracket 420 includes a radially inwardly directed shoulder 421 and a side wall 423 which slidably accommodate therein the member 427. An insulating disc 429 is slidably mounted in the tube supporting member 427, by virtue of the inner longitudinal wall 431 and radially inwardly projecting surface 433 thereof. The insulating disc 429 is preferably made of boron nitride and includes an opening 435 therethrough sized to slidably receive the high temperature lead 437. A flexible power lead 439 is suitably electrically attached to the high temperature lead 437.

The high temperature lead 437 has an opening 441 therein designed to slidably accommodate one end of coating wire 443. A threaded opening 445 is formed transverse to and intersecting with opening 441 and a set screw is threaded into the opening 445 so as to forcibly engage the side of the wire 443 to thereby retain it in mounted configuration within the opening 441. In a similar fashion, the tube supporting member 427 includes an opening 449 in which is slidably inserted the tube T. The tube supporting member 427 further includes a transverse threaded bore 451 in which is threaded a set screw 453 which is provided so as to bearingly engage the tube T and thereby retain it within the opening 449. The high temperature lead 437 has welded thereto a vapor shield 438 which is provided so as to keep vapors created by the operation of this device from welding the tube T to the tube supporting member 427 and further prevents any short circuits involving the high temperature lead 437. A flexible power lead 440 is attached in a manner well know to those skilled in the art to the tube supporting member 427.

With further reference to FIG. 24, it is seen that the bracket 418 has attached thereto a further tube supporting member 455 which includes an opening 457 for receipt of the top of the tube T and a transverse threaded bore 459 which receives therein a threaded set screw 461 which bearingly engages the surface of the tube T to thereby retain the tube within the bore 457. Further, the tube supporting member 455 includes a plurality of transverse bores 463 which are provided for the same purpose as the transverse bores 452 in the tube supporting member 427, to wit, to enable the venting from the tube T of vapors formed by the heating of the wire 443. The tube supporting member 455 further includes a further bore 465 which is provided to slidably receive therein the wire 443 and the tube supporting member 455 further includes a further transverse threaded bore 467 which threadingly receives a threaded set screw 469 which bears against the wire 465 to thereby retain it within the bore 465.

As should be evident from FIG. 24, a flow path for electrical current is created by the structure shown therein from the flexible power lead 439, through the high temperature lead 437, through the wire 443, through the tube supporting member 455, through the tube T, through the tube supporting member 427 and to the flexible power lead 440. It is seen that the insulator 429 acts to electrically insulate the high temperature lead 437 from the tube supporting member 427 so as to prevent any short circuits. The vapor shield 438 prevents any vapors from impinging upon the insulator 429 so as to prevent any completion of circuitry between the high temperature lead 437 and the tube supporting member 427.

As disclosed hereinabove, advantageous coating materials for the inside surfaces of the tube T include iridium, tungsten or rhenium. Accordingly, the wire 443 is made of whichever one of the hereinabove listed materials is desired to be used for the coating of the interior surfaces of the tube T. With this wire suitably attached to the high temperature lead 437 and the tube supporting member 455, a source of current of approximately 10 to 15 amps is placed across the flexible power leads 439 and 440. The wire 443 has an inherent resistance which increases substantially linearly with the temperature thereof. Accordingly, the resistance of the circuit may be measured and from the circuit resistance, a good estimate of the temperature of the wire 443 may be determined. In this way, the temperature of the wire 443 may be controlled. It is anticipated that in order to properly coat the inner surfaces of the tube T, the wire 443 will have to be electrically heated via the flexible power leads 439 and 440 for a time period of approximately one to four hours. It is noted that the current in the above described circuit flows through the tube T in the opposite direction to the flow of current through the wire 443. As a result, the electrons flowing in the tube T and the wire 443 tend to repel one another and thereby the wire 443 is maintained in a centered position within the tube T. It is further noted that as the wire 443 is heated, it will tend to expand. It is for this reason that the high temperature lead 437 is slidably mounted within the bore 435 of the insulator 429. In this way, as the wire 443 expands, the high temperature lead 437 will slide downwardly due to the force of gravity through the bore 435 to maintain the wire 443 in a taut configuration within the tube T.

As stated hereinabove with regard to FIGS. 16 and 20, the shields 306, 307 and 308 may be coated with a low emissivity metal to thereby enhance their performance. Low emissivity metals include, for example, gold, silver and rhodium.

With reference now to FIGS. 25 and 26, an apparatus will be described which has been devised so as to enable the coating of the shields 306, 307 and 308. As shown in FIGS. 25 and 26, the shield coating apparatus 500 is seen to include a first elongated tube 501 having an elongated slit 503 therein which extends approximately half of its longitudinal extent as best seen in FIG. 25. In surrounding relation to this tube 501, a further tube 505 is provided which includes a section removed therefrom defining faces 507 and 509 as best seen in FIG. 26. A slotted cylinder 511 is welded to the tube 501 and includes a slit 513 which is aligned with the slit 503 in the tube 501 prior to welding the tube 501 and the slotted cylinder 511 together. As may be seen through a comparison of FIGS. 25 and 26, the slotted cylinder 511 includes a first portion 515 which includes no slit therein and is completely cylindrical in nature so as to provide a guide mechanism for a slot control rod 517. A further portion 519 of the slotted cylinder 511 includes not only the slit 513, but has 180° of its circumferential extent removed, as best seen in FIG. 26. Accordingly, the rod 517 may be reciprocated in guiding relation with the portion 515 and the end 518 of the rod 517 will overlie adjustable portions of the slit 513 to thereby control the opening thereof.

A plate 521 is provided at one end of the apparatus 500 and has connected thereto the portion 519 of the slotted cylinder 511, one end of the tube 501 and one end of the tube 505. A hole 523 is provided through the end plate 521 for the purpose of inserting therethrough in mounting relation a pyrometer (not shown) which is utilized to measure the radiation within the tube 501 and therefrom to determine the temperature within the tube 501. The pyrometer may be utilized to sense the temperature therein and from this sensed temperature to control the current supplied to the apparatus 500 to thereby control the temperature within the tube 501. An insulator 525, which may, if desired, be made of boron nitride is installed between the tubes 501 and 505 at the end thereof opposite the end plate 521. An electrically conducting plug 527 is inserted into that end of the tube 501 adjacent the insulator 525 and a power lead 529 is electrically attached thereto. Further, an electrically conducting device 531 is attached to the outer tube 505 and a power lead 533 is connected thereto. Accordingly, an electrical circuit is created between the device 531, the tube 505, the end plate 521, the coating material contained within the tube 501 and the electrically conducting plug 527. A mounting bracket 535 is provided which enables the mounting of the apparatus in a suitable location. Further, the end plate 521 has mounted thereto shields 537.

As shown in FIG. 26, in order to operate the apparatus 500, the material 539 which is to be coated on the radiation shields is inserted into the tube 501 in powdered form. In order to ensure proper operation of the device, a continuous line of powder 539 must extend from the end plate 521 to the electrically conducting plug 527 so as to complete the circuit. Thus, the device must be maintained in a level orientation so as to ensure that this electrical circuit is maintained in a complete condition. The slotted cylinder 511 acts as a nozzle with its slit 513 to control the direction of conduction of vapors caused by the evaporation of the powder 539 due to its heating by the electrical current which is supplied across the power leads 529 and 533, and which may be at a current level of approximately 100 amps.

The apparatus 500 is specifically designed so as to enable the coating of the inner surfaces of these cylindrical shields, as well as the outer surfaces thereof. As shown in FIG. 26, a dashed line 543 is intended to be indicative of the shield with its interior surfaces being coated, whereas the dashed line 545 is intended to be indicative of a shield with the outer surfaces thereof being coated by the apparatus 500.

In the operation of the apparatus 500, a source of current of approximately 100 amps is placed across the power leads 529 and 533. The slit controlling rod 517 is adjusted in a lateral fashion so as to enable the exposure of a predetermined longitudinal extend of the slit 513, with this adjustment depending upon the longitudinal extent of the shield which is to be coated by the apparatus 500. The pyrometer (not shown) is inserted into the hole 523 and as the current flows across the circuit melting the powder into a liquid extending between the end plate 521 and the plug 527, and being further heated to form vapors, the pyrometer senses the radiation in the vapors to thereby enable the temperature within the tube 501 to be determined, and control means (not shown) may be utilized to thereby control the current to control the temperature. Further radiation shields 538 are provided in a circumferential direction about the outer tube 505 so as to concentrate the heat formed by the electrical circuit within the tube 501. As the vapors are formed by the melting and evaporating of the powder 539, these vapors escape through the slits 503 and 513 and are guided by the portion 519 of the slotted cylinder 511 onto the surface of the cylindrical shield which is being coated thereby. The surface which is being coated is attached to a device (not shown) which enables the shield to be slowly rotated with respect to the slit 513 to thereby ensure a uniform coating thereof. In a similar manner, the disc portions of the shields may be coated by suspending them over the portion 519 of the slotted cylinder and rotating them with respect to the slit 513 to thereby ensure uniform coating thereof.

Figure 30:
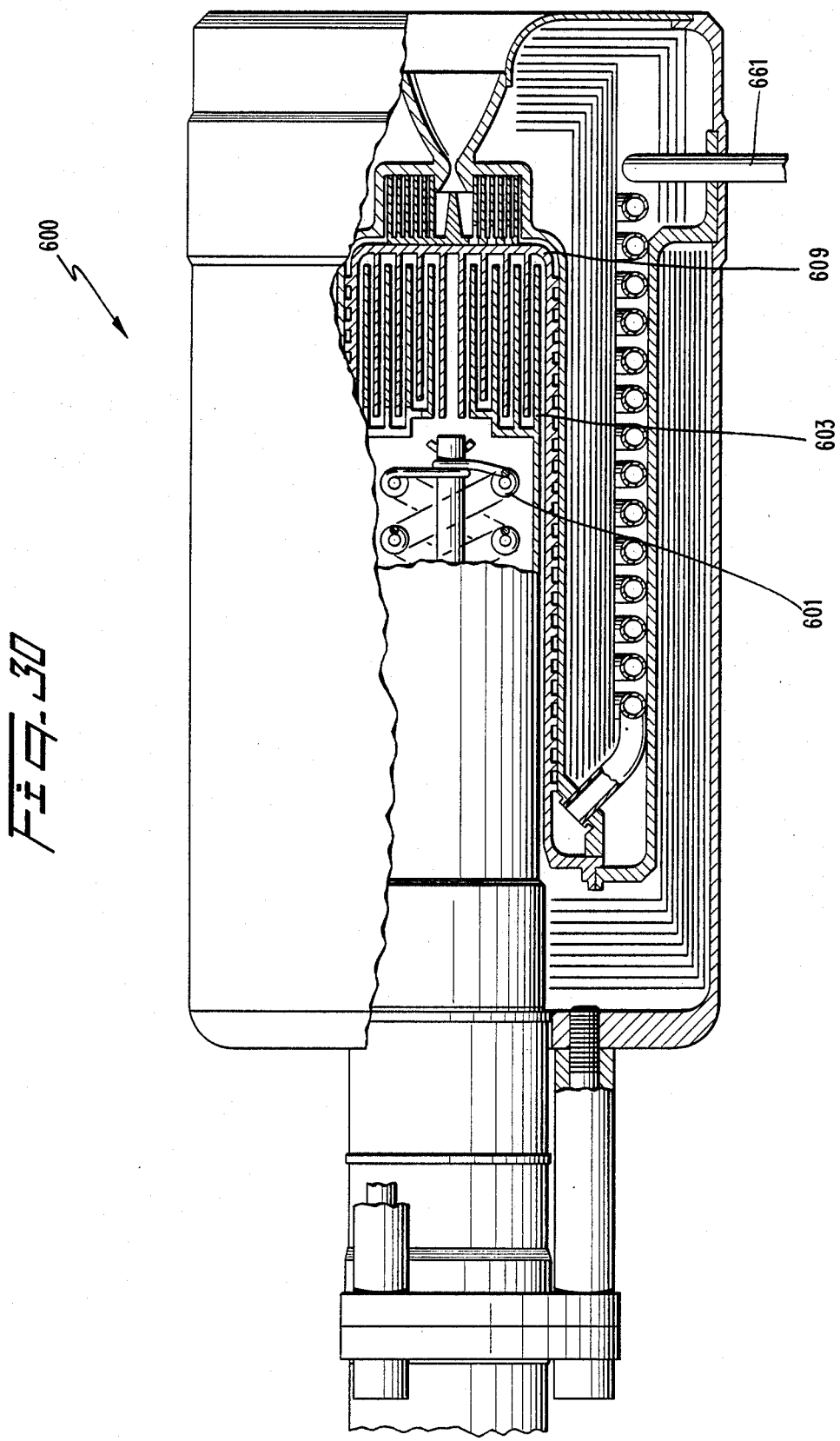
FIG. 30 shows a side view of a further embodiment of the present invention combining radiative and emissive energy transfer.
Figure 33:
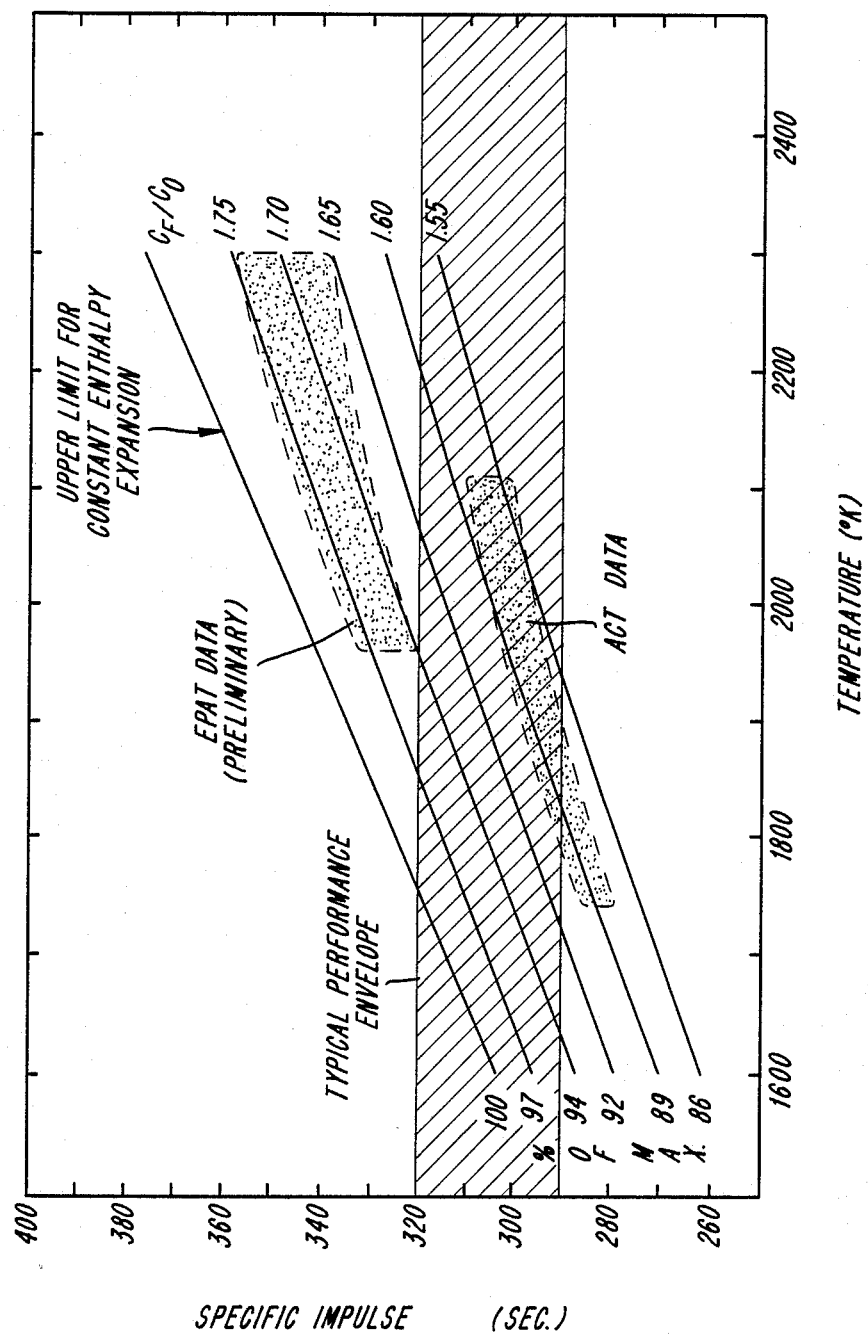
FIG. 33 shows a graph of specific impulse versus average reacted hydrazine gas temperature and the effect of using nozzle design to optimize the thrust coefficient.
Figure 34:
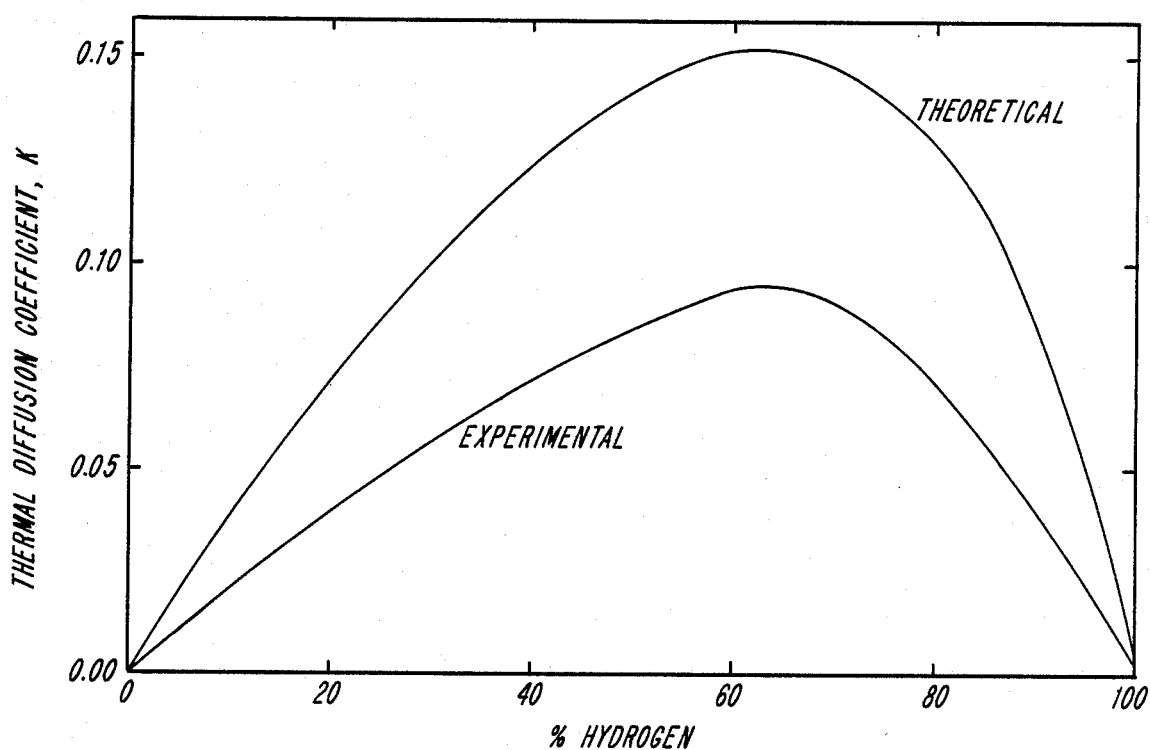
FIG. 34 shows a graph of the thermal diffusion coefficient K versus % hydrogen in mixtures of hydrogen and nitrogen.
Figure 35:
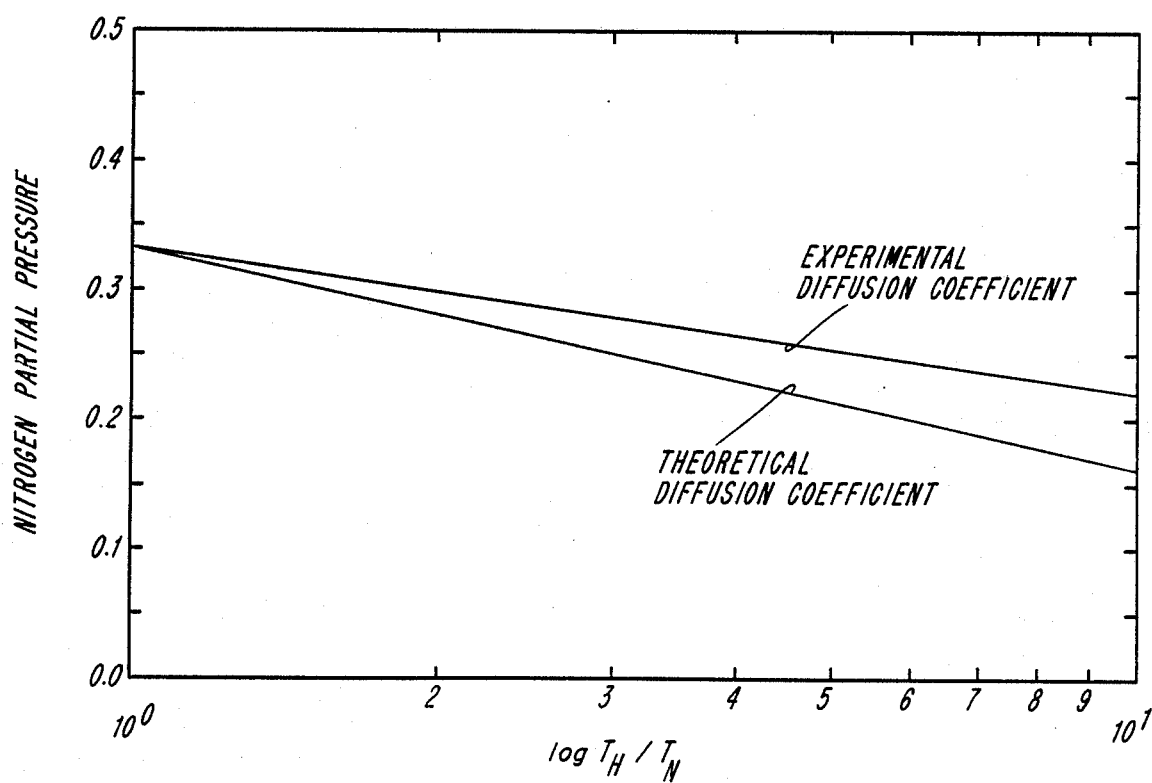
FIG. 35 shows a graph of nitrogen partial pressure versus long $T_H/T_N$ which is indicative of species separation.
Figure 36:
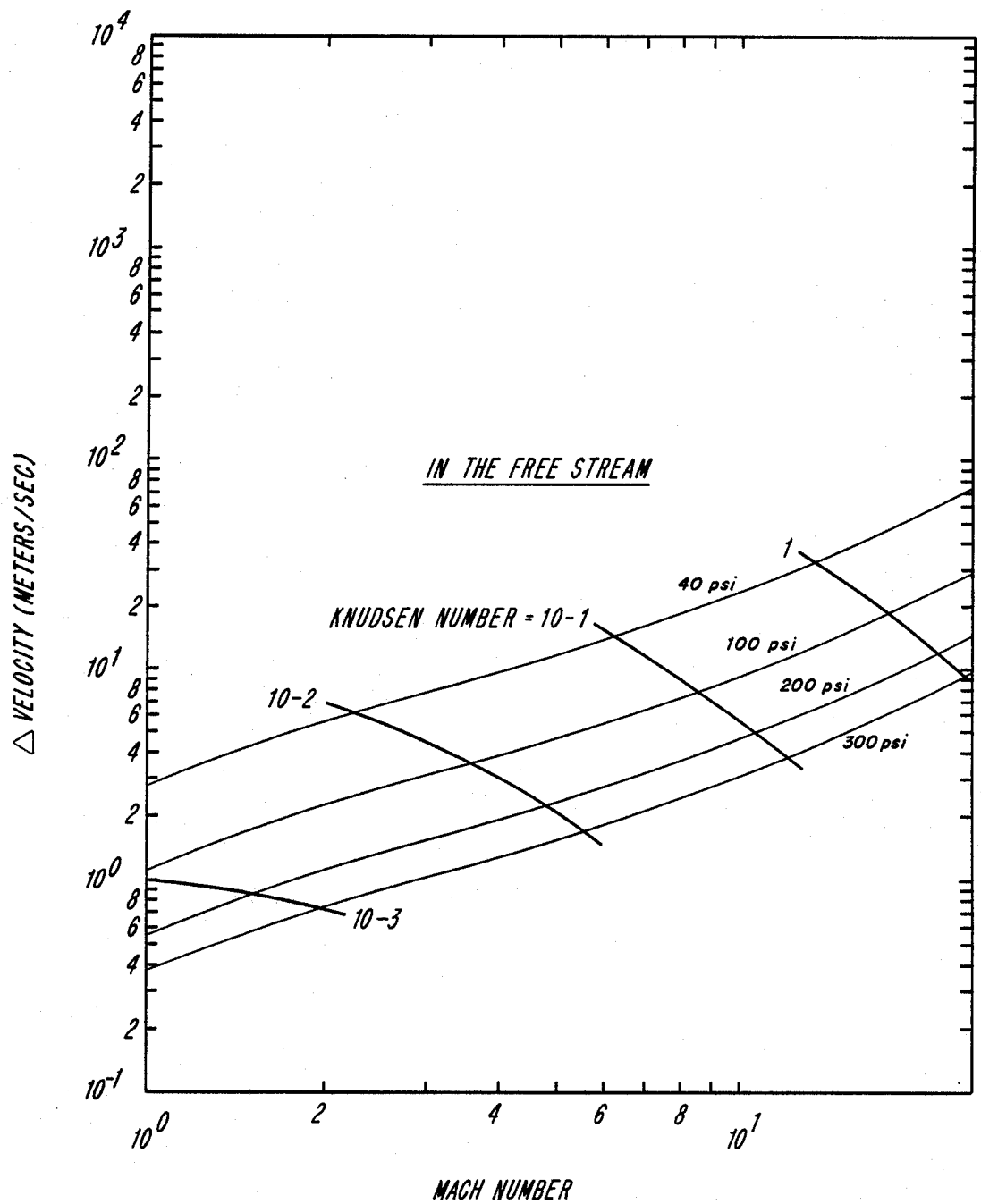
FIG. 36 shows a graph of $\Delta$ velocity in meters per second versus mach number which is indicative of species velocity separation due to pressure diffusion in the free stream.
Figure 37:
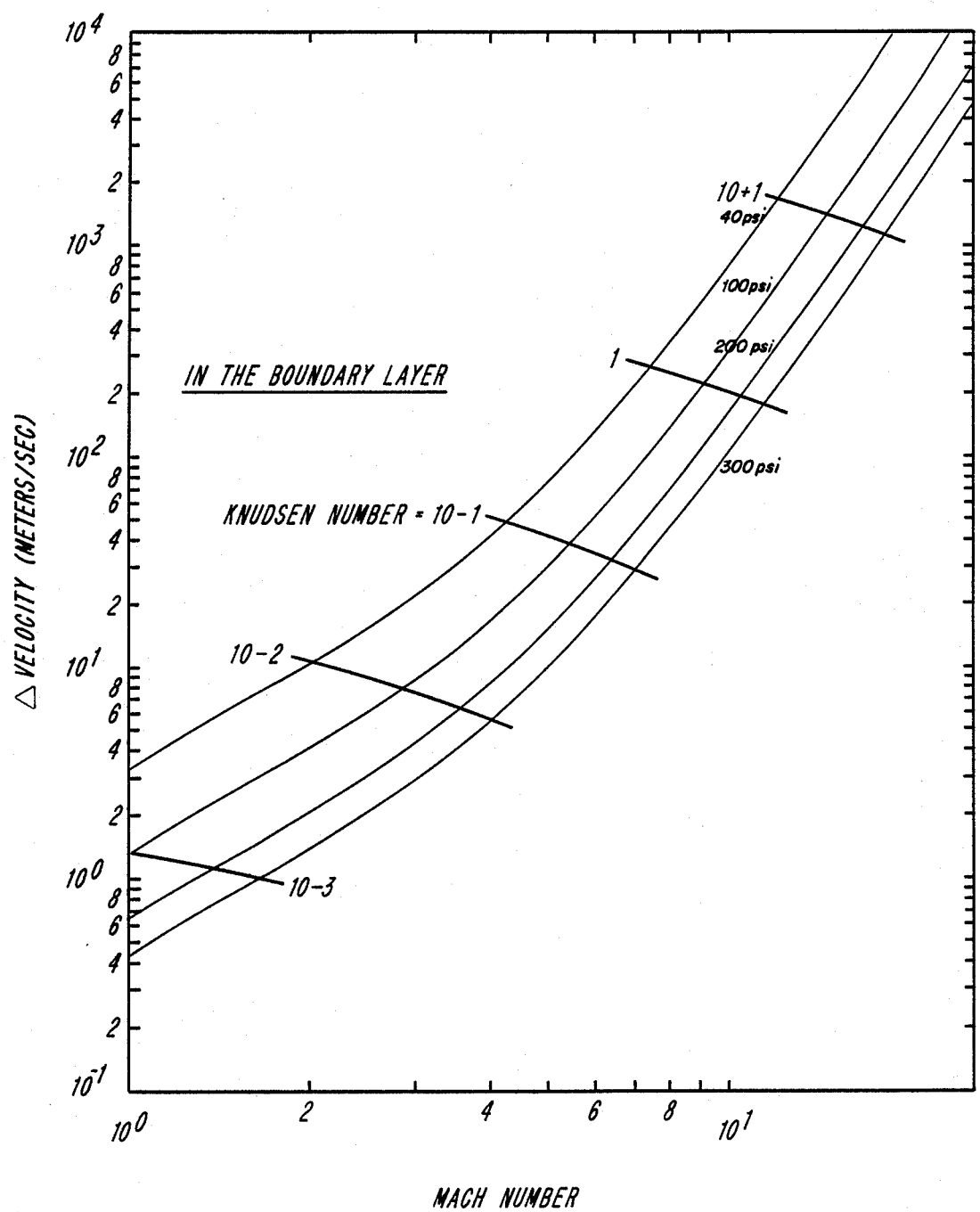
FIG. 37 shows a graph of $\Delta$ velocity in meters per second versus mach number which is indicative of species velocity separation due to pressure diffusion in the free stream.
Figure 41:
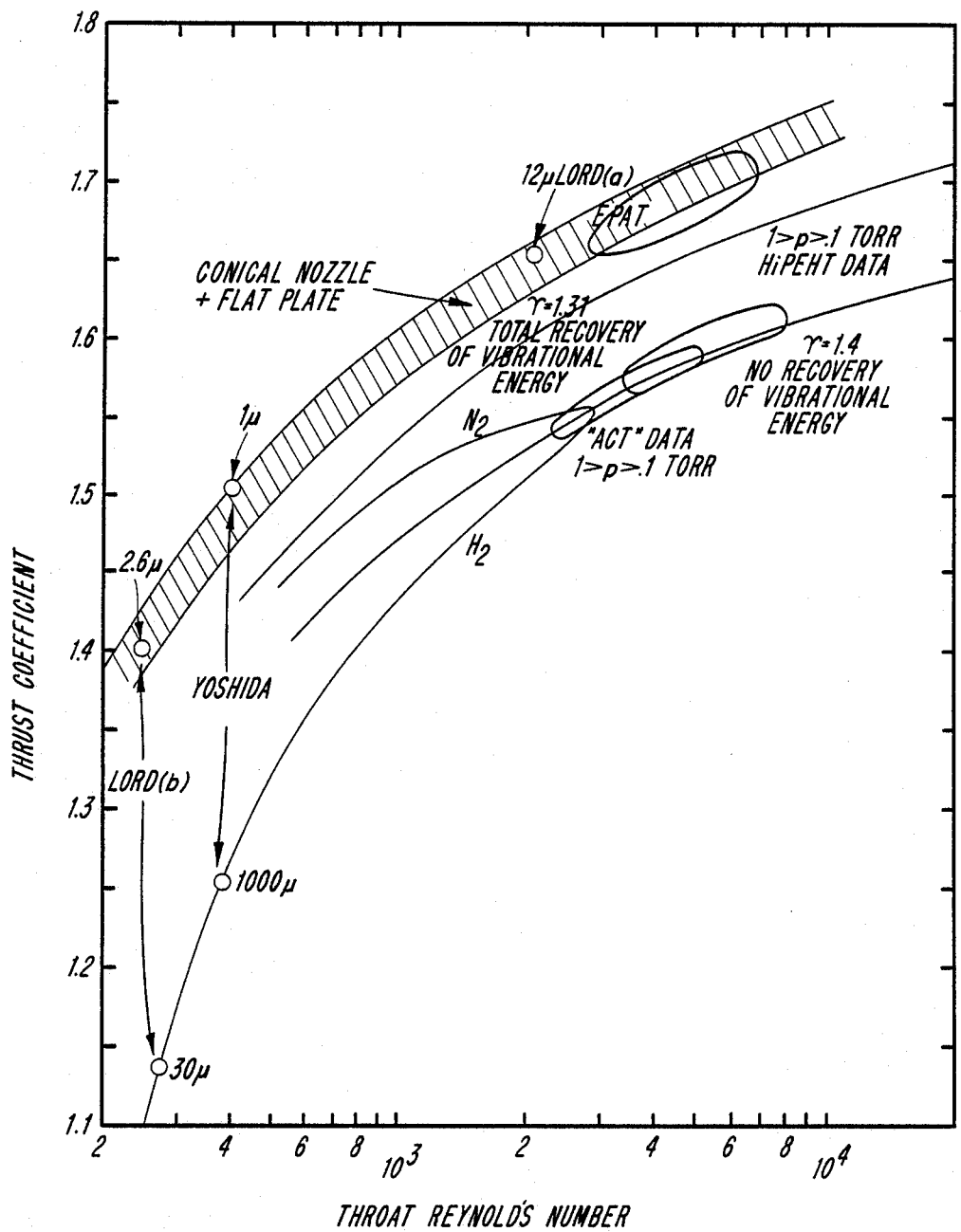
FIG. 41 shows a graph of thrust coefficient versus throat Reynolds number for various tests.

With reference now to FIGS. 30 and 31, a further modification of the concepts taught in the parent file is set forth. A comparison of FIGS. 2 and 12 reveals that the heater depicted in FIG. 2 supplies only radiant heat, whereas the heating element of FIG. 12 provides both radiation and emission. In this vein, the embodiments described herein with regard to FIGS. 16 and 20 may also be modified so as to provide both radiation and emission-type heating. FIG. 30 shows the thruster 600 as including fuel supply passages similar to those shown in FIG. 16. Of course, as desired, the fuel supply passages as depicted in FIG. 20, may be utilized with this particular embodiment. As shown, the thruster 600 includes a radiation heating element 601 and an emissive heating element 603. As shown in FIG. 30, the energy absorber component 609 is comprised of a plurality of substantially concentric cylinders and the emissive heating element 603 is designed to comprise a plurality of concentric cylindrical members which interleave with the cylindrical members in the energy absorber component 609. As shown in FIG. 31, one possible power supply scheme for the heaters of the embodiment of FIG. 30, comprises a common power supply 611 which supplies the radiative heating element 601 via the switch 613 and the emissive heating element 603 via the switch 615. In this manner, easy control of the heating elements is possible. If desired, separate power supplies for each of the radiative heating element 601 and the emissive heating element 603 may be provided. A preferred mode for operating the embodiment illustrated in FIGS. 30 and 31 is as follows:

(1) Power is supplied to the radiative heating element 601 by closing the switch 613 with the switch 615 being in the open position.

(2) The power radiated from the coil 601 heats the thermionic element 603 and the energy absorber component 609 which is included in the circuit for the emissive heating element 603.

(3) Once the temperature of the emissive heating element 603 is above approximately 1650° K. (approximately 2500° F.), the switch 615 may be closed so that great numbers of electrons are emitted by the thermionic emitting material of the emissive heating element 603 which may comprise, for example, thoriated tungsten. The electric field between the emitter 603 and energy absorber component 609 accelerates these electrons toward the energy absorber component 609 where they impact and are absorbed.

(4) This electron flow constitutes an electrical current I which flows across a potential drop V equal to that of the power source, such as a battery, thereby delivering energy to the energy absorber component 609 at at rate given by $P=VI$; virtually all of this energy is deposited in the thermal absorber adjacent to the nozzle.

(5) This power P heats the energy absorber component 609 to temperatures above that of the emissive heating elements 603. Most of this power is transferred to the gas in the heat exchanger near the nozzle, however, some small fraction is radiated back to the emissive heating element 603 thereby supplying the work function energy to maintain the electron emission and temperature of the emissive heating element, which in turn keeps the electric current flowing.

(6) The gaps between the emissive heating elements 603 and the energy absorber component 609 which comprise the interstices between the respective concentric cylindrical portions thereof, are specifically designed to values which control the level of current at the space-charge limited level given by the Child-Langmuir equation as described hereinabove.

(7) Once the design current is flowing and the steady state operational temperature with propellant flowing is established, the switch 613 may be opened to thereby permit the coil to cool down to the temperature of the heat exchanger. Since the coil is used essentially as an initiator, being elevated in temperature for only a few minutes each firing, the coil lifetime may be many hundreds of thruster operational hours before it begins to sag and then touches another thruster component to thereby fail.

(8) When the firing of the thruster is to be terminated, after for example, 40 to 60 minutes, the switch 615 may be opened and the flow of propellant may be stopped by closing a propellant supply valve.

With reference now to FIGS. 28 and 29, a further aspect of the present invention will be described. In prior art thrusters, in order to supply the thruster with vaporized, preheated and/or decomposed fuel, a separate pre-heater or decomposer assembly was necessary upstream of the fuel supply conduit extending through the outer housing of the thruster. A principal problem of the prior art of such assemblies is solved by the device set forth in FIGS. 28 and 29. It is noted that although great care is exercised in the manufacturing and handling of propellants and oxydizers to be used for long missions on spacecraft or satellites, some impurities inevitably are found in the propellant. Some of these are in the form of metallic oxides, carbonates, and/or other compounds that, when deposited on feed tube surfaces, adhere thereto and having a comparatively low vapor pressure, cannot be vaporized off these surfaces or readily removed by other means. These deposited impurity compounds have been known by the term non-volatile residues. If the supply tube temperatures or the injector orifice temperature rises above the boiling point of the propellant and/or oxydizer, then nucleate boiling of the liquid adjacent to the wall will occur. Experience has shown that when nucleate boiling occurs, these non-volatile residues deposit on the hot walls and if the surface area where nucleate boiling occurs is small, such as at the location of a fuel supply injection orifice, then the non-volatile residues will build up and partially or wholly block the propellant or oxydizer supply tube. This process of adherence of non-volatile residues to the supply tubes has been identified by those skilled in the art as the probable cause of blockages which have been observed in the feed tubes of low thrust hydrazine engines of the prior art.

The invention shown in FIGS. 28 and 29 achieves the object of (1) ensuring that the temperature of the injection tubes during propellant flow never exceeds the boiling point of the propellant and/or oxydizer and (2) ensures that a high percentage of the power conducted, convected or radiated to the feed tube is regeneratively returned to the decomposition or reaction chamber with the injected fluid. In this vein, the wires 713 which are welded into the mixing chamber 709, serve several purposes:

(1) The wires intersect all parts of the flow of fuel, thus permitting energy transfer of the total flow of fluid. The wires 713 will also accomplish some mixing of the fluid tending to give the heated fluid a relatively uniform temperature.

(2) The wires 713 increase significantly the surface area available for heat transfer from the metal components to the fluid.

(3) The combination of aspects discussed above in (1) and (2) permit the fluid flow to absorb significant quantities of power, even as much as 20 watts at the lowest flow rates, to thereby reduce the temperature of the metal components of the mixing chamber to values below the boiling point. With no nucleate boiling, there will be little or no non-volatile residue build-up on the walls of the mixing chamber 709 or on the surfaces of the wires 713.

One further feature is noted, to wit, the internal diameter of the injection orifice 705 is specifically sized to get the desired injection velocity of the fluid. Internal radiation shields 721 preferably made of tungsten act to reduce or prevent convective energy transfer from the hot decomposition products or reacted propellant gases to the injection orifice 705.

The liquid mixing and injecting device 700 shown in FIGS. 28 and 29 includes a fluid inlet 701 connected to an outlet 703 via an injection orifice 705. The fluid inlet 701 terminates at a diverging flow passage 707 which leads to a mixing chamber 709 which connects to the injection orifice 705 via a converging flow passage 711. Within the mixing chamber 709, a plurality of wires 713 are welded so as to enhance the heat transfer therein as well as fluid mixing. If desired, the wires 713 may be made of tungsten-rhenium. As best shown in FIG. 29, the wires 713 are oriented in circumferentially staggered relationship with respect to one another so as to provide a tortuous path for fuel flowing therethrough. The outlet 703 of the injector leads to a preheater decomposition chamber 715 which feeds the fuel to a screen pack or other decomposition and/or heat transfer structure 717 which may, if desired, be surrounded by a heater source 719. The screen pack or other decomposition and/or heat transfer structure 717 comprises a decomposition and/or heating structure and the fuel flows through the screen pack or structure 717 and thence into the fuel inlet of the thruster, for example, denoted by reference number 361 in FIG. 16.

Figure 47:
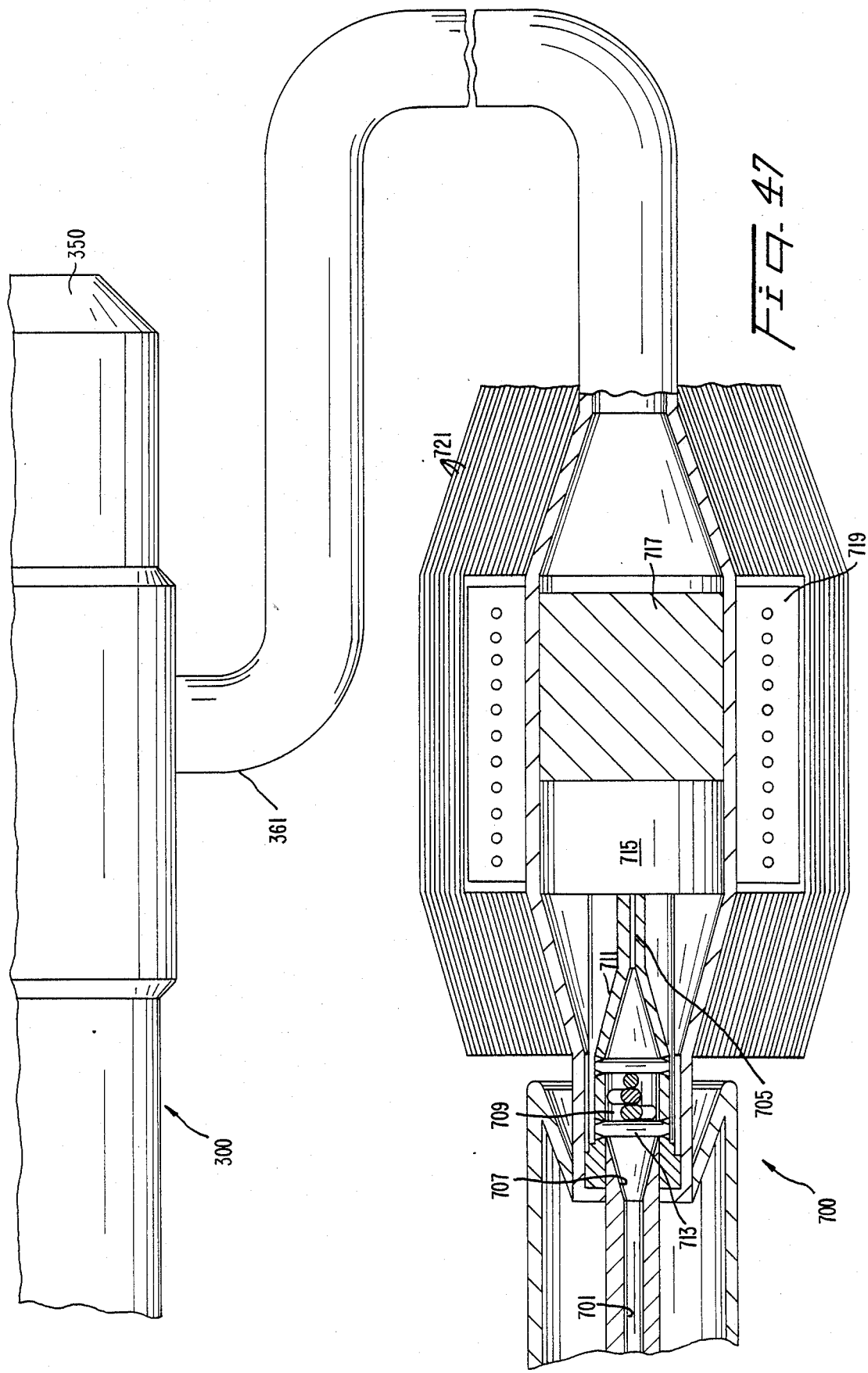
FIG. 47 shows the subject matter of FIGS. 16 and 28, as mounted together.

Accordingly, the device shown in FIGS. 28 and 29 has been developed for attachment to the inlet pipe of the preheater and/or decomposers 715 or directly into the thruster housing which is shown in FIG. 16 with reference numeral 361, in FIG. 20 with reference numeral 361' and in FIG. 25 with reference numeral 661. See, in this regard, FIG. 47.

In the prior art there was little attempt to thermally isolate and achieve optimum energy efficiency from the preheater/decomposer and/or to provide vaporized propellant to the thruster at ideal decomposition or thermal state. This was due to the concern for the blockage problem just discussed and now solved with the feature of the present invention set forth hereinabove. With this solution, optimum designing calls for the preheater to operate with minimum thermal loss from within its self-contained heater source or from the chemical energies released from an exothermic decomposing propellant. This is achieved by thermally isolating the preheater/decomposer 700, FIG. 28 with radiation shielding 721 as shown and by using other standard thermal isolating techniques for this objective.

Further, it is advantageous for optimum augmenter performance to provide as near as possible fully reacted (dissociated) propellant (in the case of hydrazine to have most of the intermediate reaction ammonia dissociated) out of the decomposer. To achieve this, the screen pack or other decomposition element 717 should be sufficiently long and operated at adequate temperatures to achieve this end. This is contrary to operation of typical decomposing thrusters which function without electrical enhancement of performance. Such thrusters minimize ammonia decomposition.

This assembly 200 can also be utilized to provide additional, auxiliary preheating of a propellant such as hydrogen and/or to effect desirable chemical reactions prior to entrance into the high temperature thruster.

NOZZLE DESIGN—PRIOR ART

Most rocket nozzles have been designed for maximum thrust when exhausting to an ambient pressure higher than one Torr. At one Torr the mean free path is of the order of $2 \times 10^{-3}$ cm, several orders of magnitude smaller than the throat diameter, or the boundary layer thickness of the gas near the nozzle exit. When these conditions prevail, the nozzle shape that results in the highest performance is one that has the invisid or "core" flow flowing parallel to the axis of the nozzle at the exit of the nozzle. This, then, results in a "bell-shaped" nozzle as the optimum configuration provided that near the exit:

$$p_w \sin \theta > \tau_w \cos \theta \qquad (26)$$

For example let:

Chamber pressure = $p_c$ = 10 atm.

Area ratio of nozzle = $A_c/A^*$ = 190

From tables $(p_w)_e$ = $1.024 \times 10^{-3}$ atm. =
$1.024 \times 10^{-3}$ newton/m$^2$
= .778 Torr
= wall pressure near the nozzle exit Boundary layer thickness = $\delta = 2.5 \times 10^{-3}$ m Free stream velocity, $w$ = 3000 m/second Viscosity of gas near the wall =

$\mu_w = 5 \times 10^{-5}$ kgm/msec

Then:

$$\tan\theta > \frac{5 \times 10^{-5} \times 3000}{2.5 \times 10^{-3} \times 1.024 \times 10^{+2}}$$

$$> .586$$

or $\theta$ > 30.4°

This indicates that if the expansion half angle of the nozzle, $\theta$, is less than 30° near the exit, then the thrust of the rocket is decreasing as the gas expands further, due to the preponderant effect of the shear stress term $$\tau_w \simeq \frac{\mu_w \omega}{\delta} \tag{27}$$

Most, if not all, nozzles on rockets tend to terminate when some such condition is reached. Also, the angle $\theta$, at the nozzle exit is usually considerably smaller than 30° in order to straighten the "core" flow.

SPACE OPTIMIZED NOZZLE DESIGN

A typical nozzle designed in this manner has a contour similar to that shown in FIG. 45. Also, in the figure, the pressures and area ratios at various positions along the nozzle are indicated. Also, drawn in phantom in FIG. 45 is an example of a nozzle designed in accordance with the present invention. If the ambient gas is much lower than one Torr and the gas in the boundary layer is expanded further to have a mean free path that is comparable with the boundary layer thickness, then a further condition on the angle $\theta$ can be calculated. In this region, the shear stress $\tau_w$ can be written a $$\tau_w = \sqrt{\frac{8\gamma}{\pi}} \, p_w M \tag{28}$$

where:
$\tau_w$ = shear stress at the wall
$\gamma$ = ratio of specific heats of the gas
$p_w$ = gas pressure at the wall
$M$ = Mach number at the inner edge of the boundary layer When the gas is expanded to this extent, then:

$$\tan\theta > \sqrt{\frac{8\gamma}{\pi}} \, M \tag{29}$$

Even if M is only unity and $\gamma = 1.40$
$\tan\theta > 1.89$ $\theta > 62°$

In general, the Mach number M at the edge of the boundary layer will be greater than unity hence the expansion half angle will be greater than 62° in order to increase the thrust by expanding to high area rations.

The above considerations indicate that the nozzle design procedure shold be as follows:

Step I—use conventional design procedure to establish the contour between the throat and the area ratio at which $$p_w \sin\theta = 2\tau_w \cos\theta \tag{30}$$

since $$\frac{\sin\theta}{\cos\theta} = \tan\theta$$

then $$\tan\theta = \frac{2\tau_w}{p_w}$$

i.e., a point at which the thrust gain is twice the shear stress loss (the reason for the "2" on the formula). This point is chosen because shortly beyond this point, thrust loss due to shear stress will dominate over thrust gain due to pressure. This point is shown in FIG. 45.

Step II—continue increasing the angle $\theta$, as needed, to maintain the same ratio between the thrust gain and the shear stress loss, i.e., a ratio of 2/1.

Step III—it may be possible to "fine-tune" the angle $\theta$ as a function of the area ratio in order to get even more thrust.

Step IV—at very large area ratios (greater than 2000) let $\theta = 90°$ and continue this flat plate nozzle out to the largest practical diameter.

As discussed hereinabove, several improvements to the design of nozzles in the thruster art would be helpful in increasing the efficiency and life expectancy of thrusters. In this vein, theoretical aspects of nozzle design and analysis were discussed hereinabove in the Summary of the Invention. With reference now to FIGS. 38, 39 and 40 a few applications of theory with regard to nozzle design for thrusters will be set forth in greater detail.

The nozzle configuration shown in FIG. 38 is specifically designed for continuous heating through $M \simeq 2$. The design criteria for the nozzles shown in FIG. 38 were discussed hereinabove in the Summary of the Invention, and these design criteria are repeated here for convenience as follows:

(1) The stagnation pressure in the heat exchanger should be as high as possible.

(2) The nozzle wall temperature should be operated at a temperature equal to or greater than the recovery temperature in the gas. This must be "optimized⇌ by including considerations of radiation power loss from the nozzle.

The curvature of the nozzle at the throat, $r_c$, is another important parameter of the nozzle design. It appears prominently in the expression for the discharge coefficients $D_d$ in the following form:

$$C_d = 1 - \left(\frac{r_c}{r^*}\right)^{\frac{1}{4}} \frac{f(\gamma)}{\sqrt{Re^*}} \tag{31}$$

where
$C_d$ = discharge coefficient
$r_c$ = radius of curvature of throat
$r^*$ = throat radius
$f(\gamma)$ = a function of the specific heat ratio, $\gamma \simeq 0.97 + 0.86\gamma$ $Re^*$ = flow Reynold's number based on throat diameter
$\gamma$ = ratio of specific heats of the gas How the value of the discharge coefficient affects the thrust coefficient is not immediately obvious. This will be investigated by developing a novel method of computing the thrust coefficient.

The thrust on a rocket, F, operating in a vacuum, can be computed by two methods:

1. Evaluating the integral:

$$F = \int_0^{r_e} (p + \rho w^2) 2\pi r \, dr \tag{32}$$

where p = gas pressure
ρ = gas density
w = gas axial velocity
$r_e$ = radius at nozzle exit
r = radial variable
dr = differential of radial variable
at the nozzle exit or, 2. Integrating the stress tensor over the axial projection of all interior and exterior surfaces.

The approach adopted here will be to compute the thrust that is generated up to the throat using method 1 above, and then to compute the additional thrust in the expanding section using method 2 above. The two components of the thrust coefficient are identified as follows:

$$C_F = F/p_c A^* \quad (33)$$

where
F = thrust
$p_c$ = chamber gas pressure
$A^*$ = throat flow area
where $$C_F = C_F^* + \Delta C_F \quad (34)$$

$$C_F^* = \frac{1}{p_c} A^* \int_0^{r^*} (P^* + \rho^* W^{*2}) 2\pi r \, dr$$

and $$\Delta C_F = \int_{r^*}^{r_e} 2\pi R \sin\theta (p_w \sin\theta - \tau_w \cos\theta) dR \quad (35)$$

Since the velocity $w^*$ is purely axial at the throat, cylindrical coordinates are used in computing $C_F$.

In practice $\Delta C_F$ can be analytically maximized by choosing various configurations (θ as a function of R) and nozzle surface temperature distributions ($\tau_w$) as a function of R) and then using numerical procedures to solve the Navier-Stokes equations in the nozzle. Since the different gases have different thermo-dynamic and transport properties, the nozzle shape may change from gas to gas. Also, since relaxation effects in the gas (e.g, atom-atom recombination) depend upon pressure and residence time of the gas in the nozzle, the best nozzle shape may change for any given gas with the chamber pressure of the gas. As pointed out elsewhere, best nozzle performance will be obtained by making the chamber pressure of the gas as high as possible. In order to obtain the most accurate results for the nozzle design downstream of the throat, equation 35 may be calculated for spaced nozzle wall increments as low as one millimeter or less. Such calculations may be done by computer for greater efficiency and accuracy.

For invisid gas, accelerated at constant enthalpy and with a conical diverging nozzle, the integrals can be evaluated. The results are:

$$C_F^* = 2 \left( \frac{2}{\gamma - 1} \right)^{\frac{1}{\gamma - 1}} \frac{1 + \cos\theta}{2} \quad (36)$$

$$\Delta C_F = \frac{1 + \cos\theta}{2} \left( \frac{2}{\gamma + 1} \right)^{\frac{\gamma + 1}{2(\gamma - 1)}} \left( \frac{\gamma - 1}{2} \right)^{\frac{1}{2}} \left\{ \frac{\frac{2}{\gamma - 1} \frac{2\gamma M_e^2}{\gamma - 1}}{M_e \left( M_e^2 + \frac{2}{\gamma - 1} \right)} - 2\sqrt{\frac{\gamma + 1}{\gamma - 1}} \right\} \quad (37)$$

Further, if $M_e \rightarrow \infty$ $$C_F \rightarrow \frac{1 + \cos\theta}{2} \gamma \left( \frac{2}{\gamma - 1} \right)^{\frac{\gamma + 1}{2(\gamma - 1)}} \left( \frac{2}{\gamma - 1} \right)^{\frac{1}{2}} \quad (38)$$

NOTE: On the above calculations, the flow at the throat has been made spherically symmetric for convenience.

Equations 36 through 38 represent the results of the classical approach to computing the thrust coefficient.

Assuming that the pressure is independent of the radius at the throat, the viscous effect on $C_F^*$ can be computed. The result is:

$$C_F^* = (1 + \gamma C_D^2) \frac{2}{\gamma + 1}^{\frac{\gamma}{\gamma - 1}} \quad (39)$$

The expression indicates that the radius of curvatures at the throat should be small so that $C_D$ is kept as high as possible. This conclusion may be somewhat modified by the desire to continue heating the gas as it accelerates through the throat.

Some indication of the optimum nozzle shape can be determined by using equation 35. Immediately downstream of the throat there will be a negative increment to $C_F$ since $p_w \sin\theta - \tau_w \cos\theta < 0$. Once the expansion angle is increased to make the expression in brackets positive, the angle θ must be adjusted throughout the expansion to ensure that:

$$p_w \sin\theta - \tau_w \cos\theta > 0 \quad (40)$$

Eventually the nozzle angle will approach 90°, becoming a disc perpendicular to the axis of the throat. When the disc is extended out sufficiently far radially, such that substantially no collisions are occurring between propellant particles at the periphery thereof, at that circumferential location, a conical end piece may be provided having an angle with respect to the longitudinal axis of the nozzle designed to maximize deflection of propellant particles in the direction of the nozzle axis. Since the disc part and conical end piece of the nozzle can be made from extremely thin sheet material, the weight thereof can be kept low and the conical end piece should extend to the maximum diameter permitted.

The pressure at the wall $p_w$ is a strong function of $\theta$ and $\tau_w$, a weak function of $\theta$. Both decrease as R is increased. An analysis of the nozzle in accordance with the teachings of the present invention should permit an optimization of the nozzle contour and determine the exit area for the range of operational Reybold's number.

In light of the discussion hereinabove with regard to test data and design implications of nozzles, nozzle configurations worthy of analytical investigation are shown in FIGS. 38, 39 and 40.

TEST PROCEDURE

Figure 42:
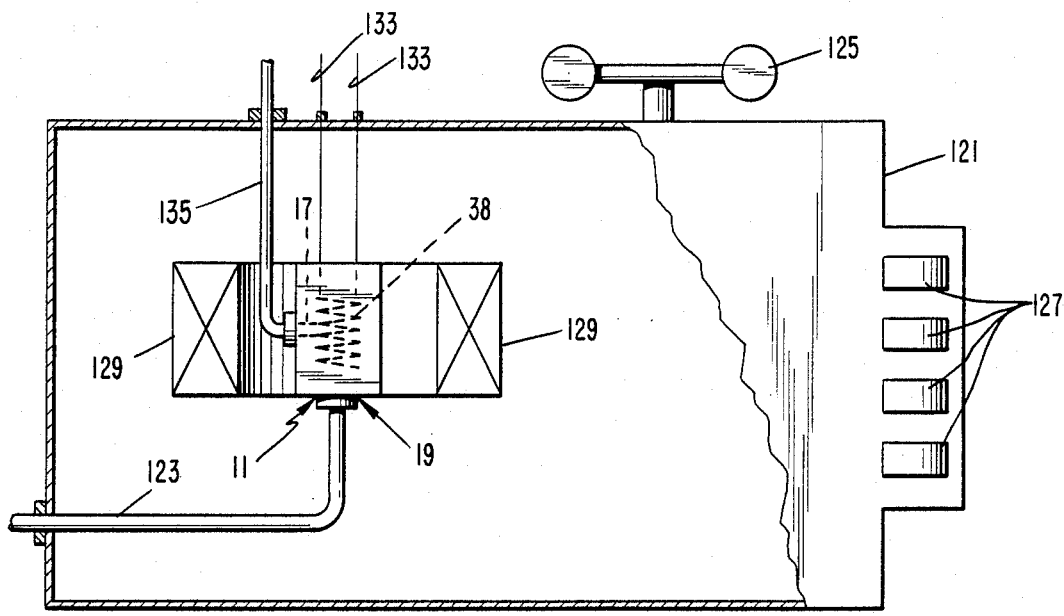
FIG. 42 shows a schematic view of a test bed used for testing the thrusters of the present invention.

Inasmuch as the thruster 11, according to the present invention is designed to operate in an outer space environment, a special test facility is provided for ground testing, as shown in FIG. 42. The thruster 11 is placed in a vacuum enclosure 121, with an outside exhaust duct 123 provided in communication with expansion nozzle 19. It is recognized that the provision of the outside exhaust duct 123 would create a sea-level ambient pressure condition at the expansion nozzle 19 and the fuel passages 17, particularly at times when propellant is not being supplied to the thruster 11. The remainder of the thruster 11 is exposed to a vacuum created by sorption pumps 127 and finally by ion pumps 127 which evacuate the vacuum enclosure 121. Because of the terrestrial gravity environment to which the heater may be rotated at about 30 RPM or greater, repositioned 180 degrees as needed to compensate for any sag of coil 33 or a magnetic coil 129 may be implemented in surrounding relation to the thruster 11. The magnetic coil arrangement 129 serves to support the heater coil 33 to the extent necessary to counteract the force of gravity. Force supplied by the magnetic coil arrangement 129 is calculated to provide a force equal and opposite to that of the acceleration of gravity on the material of the heater coil 33 when it is at appropriate operating temperatures. The magnetic coil arrangement 129 is also modulated to an extent necessary to reflect changes in forces in the coil 33 during conditions of acceleration caused by the thrust of the thruster 11. Other provisions for testing in the vacuum enclosure 121 include special power features 133 and a propellant inlet supply 135. Testing will occur at a pressure of less than $10^{-5}$ Torr.

What has been described are preferred embodiments of the invention. It should be noted that it is possible to provide various other arrangements. For example, while an air vent opening for the heater cavity 18 has been described, it is also possible to seal the heater assembly 13 with the heat exchanger assembly 15 in a vacuum, with a small amount of pressurant being permitted to remain within the heater assembly 13. This pressurant would affect the vaporization rate of material from the heater coil 33. It is also possible to provide various arrangements for the expansion nozzle 19 in accordance with the specific needs and application of the thruster 11.

Further, if the fuel is injected into the thruster 11 in the unreacted liquid state, the heater assembly 13 is used to pre-heat the thruster 11 to a safe temperature above the thermal decomposition temperature, about 1000° K. This internal coupling of the exothermic decomposition and the electrical performance augmentation eliminates the heat losses from an externally mounted decomposition chamber and from the connecting injection tube. The present invention may be utilized with such propellants as $H_2$, $N_2$, $N_2H_2$, $NH_3$, $CO_2$, $CO$, $CH_3$, $H_2O$, etc. Accordingly, the above description is not intended to be limiting, but is, instead, intended to be exemplary in nature.

I claim:

1. An optimized performance thruster assembly comprising:
    (a) a housing including a first opening and a second opening;
    (b) a heating element removably mounted in said first opening;
    (c) a propellant supply conduit extending through wall means defining said housing;
    (d) nozzle means adjacent said second opening;
    (e) propellant supply passageway means conducting propellant from said propellant supply conduit to said nozzle means;
    (f) heat exchange means for transmitting heat generated by said heating element to said propellant in said propellant supply passageway means and in said nozzle means, said heat exchange means isolating said heating element from direct contact with said propellant;
    (g) shielding means substantially surrounding said heating element and focusing the majority of heat generated by said heating element in a direction generally toward said nozzle, said shielding means comprising a plurality of discs mounted on said heating element in spaced relation to one another axially along said heating element, said discs being spaced from one another by at least one rod extending through all of said discs and mounted to said heating element, said at least one rod including resilient biasing means thereon resiliently separating adjacent discs, and cylindrical members attached to at least some of said discs, said cylindrical members extending axially of said heating element; and
    (h) said propellant being expelled out said second opening via said nozzle means to provide thrust.

2. The invention of claim 1, wherein said heating element comprises a coil which generates radiant heat energy.

3. The invention of claim 2, wherein said heating element further includes an emissive stage enabling the generation of emissive heat energy.

4. The invention of claim 1, wherein said propellant supply conduit includes means for maintaining said propellant at a temperature below the vaporization temperature thereof until said propellant enters a decomposition chamber within said propellant supply conduit, said means for maintaining also preventing adherence of residues to said propellant supply passageway means.

5. The invention of claim 4, wherein said means for maintaining comprises:
    (a) a fluid inlet;
    (b) a mixing chamber downstream of said fluid inlet;
    (c) an injection orifice downstream of said mixing chamber; and
    (d) said decomposition chamber downstream of said injection orifice.

6. The invention of claim 5, wherein said mixing chamber includes a plurality of wires mounted therein and extending thereacross, said wires facilitating propellant mixing and carrying heat energy away from said propellant.

7. The invention of claim 6, wherein said wires are made of tungsten-rhenium.

8. The invention of claim 5, wherein said decomposition chamber includes screen pack means for decomposing said propellant, said decomposition chamber connecting said propellant supply conduit with said propellant supply passageway means.

9. The invention of claim 1, wherein said propellant supply passageway means includes a first passageway adjacent said wall means and a second passageway adjacent said heating element but separated therefrom by said heat exchange means, said first and second passageways being fluidly connected with one another.

10. The invention of claim 9, wherein said first passageway is connected to said propellant supply conduit and said second passageway conducts said propellant to said nozzle means.

11. The invention of claim 10, wherein said second passageway comprises:
  (a) a first substantially cylindrical body;
  (b) a screw thread-like open passageway formed in an outer surface of said first body;
  (c) a second substantially cylindrical body concentrically mounted over said first body and having an inner wall; and
  (d) said second passageway being defined by said screw thread-like open passageway and said inner wall.

12. The invention of claim 11, wherein said screw thread-like open passageway defines land means, said land means being brazed to said inner wall.

13. The invention of claim 12, wherein one of molybdenum or iridium is utilized to braze said land means to said inner wall.

14. The invention of claim 11, wherein said first passageway comprises a coiled tube.

15. The invention of claim 11, wherein said screw threads are provided with a radius of curvature designed so as to impart centrifugal force to said propellant of sufficient value at flow rates resulting in laminar flow to thereby create, in addition to the primary axial flow path of propellant therethrough, a secondary flow path of propellant within said screw threads, said secondary flow path being directed in raidal directions in said screw threads and recirculating propellant from central portions of said screw threads to peripheral portions thereof.

16. The invention of claim 14, wherein said coiled tube has interior surfaces thereof coated with one of iridium, tungsten or rhenium.

17. The invention of claim 10, wherein said first passageway comprises a coiled tube and said second passageway comprises a further coiled tube.

18. The invention of claim 17, wherein said coiled tube has interior surfaces thereof coated with one of iridium, tungsten or rhenium.

19. The invention of claim 15, wherein said second passageway comprises a further coiled tube, mounted in said housing substantially concentrically within said first passageway.

20. The invention of claim 19, wherein said further coiled tube has interior surfaces thereof coated with one of iridium, tungsten or rhenium.

21. The invention of claim 18, wherein said coiled tube and said further coiled tube are provided with radii of curvature designed so as to impart centrifugal force to said propellant of sufficient value at flow rates resulting in laminar flow to thereby create, in addition to the primary axial flow path of propellant therethrough, a secondary flow path of propellant directed in radial directions and recirculating propellant from central portions of said coiled tube and said further coiled tube to peripheral portions thereof.

22. The invention of claim 1, wherein said first opening opens to a heating chamber wherein said heating element is mounted, said heating chamber having mounted therein an energy absorbing component forming a part of said heat exchange means which focuses energy transmitted by said heating element to said nozzle means.

23. The invention of claim 22, wherein said energy absorbing component includes a plurality of concentric cylinders brazed to a disc connected to a wall of said heating chamber.

24. The invention of claim 22, wherein said energy absorbing component includes a spiral-like scroll member having an edge thereof brazed to a disc connected to a wall of said heating chamber.

25. The invention of claim 22, wherein said nozzle means includes a nozzle heat exchange component as an integral part thereof which forms a part of said heat exchange means.

26. The invention of claim 25, wherein said nozzle heat exchange component includes a plurality of walls which form a fuel passageway between said propellant supply passageway means and said second opening.

27. The invention of claim 26, wherein said plurality of walls comprises a spiral wall.

28. The invention of claim 26, wherein said plurality of walls comprises a plurality of concentric cylinders with gaps at alternative ends thereof so as to form said fuel passageway.

29. The invention of claim 26, wherein said energy absorbing component is mounted on a chamber wall having one surface facing said heating chamber, said chamber wall having a further surface adjacent said one surface and facing said nozzle means, said nozzle heat exchange component being mounted on said further surface.

30. The invention of claim 1, wherein said shielding means is connected to said heater element in a manner so as to minimize the contact areas therebetween to thereby minimize heat exchange between said shielding means and heater element and to thereby maximize focusing of said heat generated by said heating element onto said heat exchange means.

31. The invention of claim 1, wherein said discs are spaced from one another by a plurality of rods each corresponding to said at least one rod.

32. The invention of claim 31, wherein said biasing means comprises springs mounted on said rods between adjacent discs.

33. The invention of claim 1, wherein said first opening opens to a heating chamber wherein said heating element is mounted, said shielding means extending substantially the full length of said heating chamber.

34. The invention of claim 1, wherein said first opening opens to a heating chamber wherein said heating element is mounted, said heating chamber having mounted therein an energy absorbing component forming a part of said heat exchange means which focuses energy transmitted by said heating element to said nozzle means.

35. The invention of claim 34, wherein said nozzle means includes a nozzle heat exchange component as an integral part thereof which forms a part of said heat exchange means.

36. The invention of claim 35, wherein said energy absorbing component is mounted on a chamber wall having one surface facing said heating chamber, said chamber wall having a further surface adjacent said one surface and facing said nozzle means, said nozzle heat exchange component being mounted on said further surface.

37. The invention of claim 1, further including further shielding means mounted within said housing for reducing power losses from said housing comprising:
 (a) a plurality of concentric cylinder members;
 (b) a disc attached to one end of each said cylinder members; and
 (c) means spacing said discs and cylinder members apart.

38. The invention of claim 37, wherein said spacing means comprises:
 (a) rod means extending through said discs; and
 (b) spacers mounted on said rod means between said discs.

39. The invention of claim 38, wherein said rod means extends through holes formed in said discs, said holes including annular beveled faces converging toward one another to form a substantially circular interface line therebetween which contacts said rod means.

40. The invention of claim 38, wherein each said spacer comprises a ring of substantially circular cross-section, said rings contacting adjacent discs with a line-type contact.

41. The invention of claim 5 wherein said decomposition chamber includes heat exchanger means for preheating said propellant, said decomposition chamber connecting said propellant supply conduit with said propellant supply passageway means.

42. An optimized performance thruster assembly comprising:

(a) a housing including a first opening and a second opening;
 (b) a heating element removably mounted in said first opening;
 (c) a propellant supply conduit extending through wall means defined in said housing and including means for maintaining said propellant at a temperature below the vaporization temperature thereof until said propellant enters a decomposition chamber within said propellant supply conduit, said means for maintaining also preventing adherence of residues to said propellant supply passageway means, said means for maintaining comprising:
  (i) a fluid inlet;
  (ii) a mixing chamber downstream of said fluid inlet and including a plurality of wires mounted therein and extending thereacross, said wires facilitating propellant mixing and carrying heat energy away from said propellant; and
  (iii) said decomposition chamber being located downstream of said injection orifice;
 (d) nozzle means adjacent said second opening;
 (e) propellan supply passageway means conducting propellant from said propellant supply conduit to said nozzle means;
 (f) heat exchange means for transmitting heat generated by said heating element to said propellant in said propellant supply passageway means and in said nozzle means, said heat exchange means isolating said heating element from direct contact with said propellant;
 (g) shielding means substantially surrounding said heating element and focusing the majority of heat generated by said heating element in a direction generally toward said nozzle; and
 (h) said propellant being expelled out said second opening via said nozzle means to provide thrust.

* * * * *